(12) United States Patent
Denise

(10) Patent No.: US 8,538,158 B1
(45) Date of Patent: Sep. 17, 2013

(54) IMAGE ANALYSIS AND COMMUNICATION DEVICE CONTROL TECHNOLOGY

(76) Inventor: Jason Adam Denise, Bowie, MD (US)

( * ) Notice: Subject to any disclaimer, the term of this patent is extended or adjusted under 35 U.S.C. 154(b) by 0 days.

(21) Appl. No.: 13/400,091

(22) Filed: Feb. 19, 2012

Related U.S. Application Data

(63) Continuation of application No. 12/569,880, filed on Sep. 29, 2009, now Pat. No. 8,131,848.

(51) Int. Cl.
*G06K 9/46* (2006.01)

(52) U.S. Cl.
USPC ........... 382/190; 382/199; 382/195; 382/110; 379/265.01; 379/265.02; 379/265.11

(58) Field of Classification Search
USPC ............. 379/265.01, 265.02, 265.11, 202.01, 379/142.01, 142.04, 142.06; 348/140.1, 348/14.08, 14.07; 455/426.1, 414.1, 445, 455/461, 556.1; 382/199, 190, 195, 100
See application file for complete search history.

(56) References Cited

U.S. PATENT DOCUMENTS

| | | | |
|---|---|---|---|
| 5,384,832 A | 1/1995 | Zimmerman et al. |
| 5,818,447 A | 10/1998 | Wolf et al. |
| 5,878,230 A | 3/1999 | Weber et al. |
| 5,892,909 A | 4/1999 | Grasso et al. |
| 5,920,576 A | 7/1999 | Eaton et al. |
| 6,002,763 A | 12/1999 | Lester et al. |
| 6,040,781 A | 3/2000 | Murray |
| 6,073,133 A | 6/2000 | Chrabaszcz |
| 6,073,142 A | 6/2000 | Geiger et al. |
| 6,092,114 A | 7/2000 | Shaffer et al. |
| 6,108,688 A | 8/2000 | Nielsen |
| 6,122,353 A | 9/2000 | Brady et al. |
| 6,185,603 B1 | 2/2001 | Henderson et al. |
| 6,212,553 B1 | 4/2001 | Lee et al. |
| 6,253,075 B1 | 6/2001 | Beghtol et al. |
| 6,272,532 B1 | 8/2001 | Feinleib |
| 6,317,488 B1 | 11/2001 | DePond et al. |
| 6,317,788 B1 | 11/2001 | Richardson |
| 6,353,778 B1 | 3/2002 | Brown |
| 6,396,497 B1 | 5/2002 | Reichlen |
| 6,408,177 B1 | 6/2002 | Parikh et al. |
| 6,449,492 B1 | 9/2002 | Kenagy et al. |
| 6,519,335 B1 | 2/2003 | Bushnell |
| 6,565,608 B1 | 5/2003 | Fein et al. |
| 6,647,108 B1 | 11/2003 | Wurster et al. |
| 6,671,718 B1 | 12/2003 | Meister et al. |
| 6,687,745 B1 | 2/2004 | Franco et al. |
| 6,697,824 B1 | 2/2004 | Bowman-Amuah |
| 6,751,485 B2 | 6/2004 | Ranta |
| 6,760,727 B1 | 7/2004 | Schroeder et al. |
| 6,799,163 B2 | 9/2004 | Nolan |
| 6,816,885 B1 | 11/2004 | Raghunandan |

(Continued)

*Primary Examiner* — Mekonen Bekele

(57) ABSTRACT

Techniques are described for controlling communication devices using image analysis. For instance, when a communication is received by a communication device, the communication device outputs an alert to notify users of the received communication and accesses one or more images of an area proximate to the communication device. The one or more images cover an area proximate to the communication device at a time during which the communication device is outputting the alert. The communication device analyzes the one or more images to determine whether a user is present in the one or more images and in a position to perceive the received communication. The communication device handles at least one aspect of the received communication based on the determination of whether a user is in a position to perceive the received communication.

20 Claims, 28 Drawing Sheets

(56) References Cited

U.S. PATENT DOCUMENTS

| | | |
|---|---|---|
| 6,823,368 B1 | 11/2004 | Ullmann et al. |
| 6,829,348 B1 | 12/2004 | Schroeder et al. |
| 6,859,213 B1 | 2/2005 | Carter |
| 6,871,214 B2 | 3/2005 | Parsons et al. |
| 6,912,564 B1 | 6/2005 | Appelman et al. |
| 6,968,364 B1 | 11/2005 | Wong et al. |
| 6,970,908 B1 | 11/2005 | Larky et al. |
| 7,007,066 B1 | 2/2006 | Malik |
| 7,054,905 B1 | 5/2006 | Hanna et al. |
| 7,092,743 B2 | 8/2006 | Vegh |
| 7,107,276 B2 | 9/2006 | Johnson |
| 7,120,278 B2 | 10/2006 | Sukegawa et al. |
| 7,209,953 B2 | 4/2007 | Brooks |
| 7,231,426 B1 | 6/2007 | Hall et al. |
| 7,233,229 B2 | 6/2007 | Stroupe et al. |
| 7,257,639 B1 | 8/2007 | Li et al. |
| 7,847,815 B2 * | 12/2010 | Patel et al. .................. 348/14.08 |
| 8,131,848 B1 * | 3/2012 | Denise .......................... 709/224 |
| 2001/0034769 A1 | 10/2001 | Rast |
| 2003/0182323 A1 | 9/2003 | Demsky et al. |
| 2004/0054737 A1 | 3/2004 | Daniell |
| 2004/0068545 A1 | 4/2004 | Daniell et al. |
| 2004/0083191 A1 | 4/2004 | Ronnewinkel et al. |
| 2004/0103162 A1 | 5/2004 | Meister et al. |
| 2004/0114747 A1 | 6/2004 | Trandal et al. |
| 2004/0128357 A1 | 7/2004 | Giles et al. |
| 2004/0143596 A1 | 7/2004 | Sirkin |
| 2004/0145652 A1 * | 7/2004 | Yamauchi et al. .......... 348/14.02 |
| 2004/0158607 A1 | 8/2004 | Coppinger et al. |
| 2004/0220925 A1 | 11/2004 | Liu et al. |
| 2004/0249890 A1 | 12/2004 | Fellenstein et al. |
| 2005/0076085 A1 | 4/2005 | Budd et al. |
| 2005/0108336 A1 | 5/2005 | Naick et al. |
| 2005/0132066 A1 | 6/2005 | Heilmann |
| 2005/0197138 A1 | 9/2005 | Kaminsky et al. |
| 2005/0228774 A1 | 10/2005 | Ronnewinkel |
| 2005/0228790 A1 | 10/2005 | Ronnewinkel et al. |
| 2005/0229150 A1 | 10/2005 | Ronnewinkel |
| 2005/0273494 A1 * | 12/2005 | Uchide ......................... 709/204 |
| 2006/0012563 A1 | 1/2006 | Fyke et al. |
| 2006/0031309 A1 | 2/2006 | Luoffo et al. |
| 2006/0031310 A1 | 2/2006 | Lee |
| 2006/0046694 A1 | 3/2006 | Yu |
| 2006/0075228 A1 | 4/2006 | Black et al. |
| 2006/0089972 A1 | 4/2006 | Malik |
| 2006/0126806 A1 | 6/2006 | Trandal et al. |
| 2006/0133590 A1 | 6/2006 | Jiang |
| 2006/0149819 A1 | 7/2006 | Auhagen |
| 2006/0150088 A1 | 7/2006 | Kraft et al. |
| 2006/0168065 A1 | 7/2006 | Martin |
| 2006/0184584 A1 | 8/2006 | Dunn et al. |
| 2006/0248579 A1 | 11/2006 | Gerritsen et al. |
| 2006/0259556 A1 | 11/2006 | Auhagen |
| 2006/0282575 A1 | 12/2006 | Schultz et al. |
| 2007/0001820 A1 | 1/2007 | Luo |
| 2007/0032225 A1 | 2/2007 | Konicek et al. |
| 2007/0037605 A1 | 2/2007 | Logan |
| 2007/0072616 A1 | 3/2007 | Irani |
| 2007/0094217 A1 | 4/2007 | Ronnewinkel |
| 2007/0130369 A1 | 6/2007 | Nayak |
| 2007/0143425 A1 | 6/2007 | Kieselbach et al. |
| 2007/0188465 A1 | 8/2007 | Lee et al. |
| 2007/0250585 A1 | 10/2007 | Ly et al. |
| 2007/0259685 A1 | 11/2007 | Engblom et al. |
| 2007/0271345 A1 | 11/2007 | Callanan et al. |
| 2007/0288575 A1 | 12/2007 | Gillum et al. |
| 2008/0036623 A1 | 2/2008 | Rosen |
| 2008/0057926 A1 | 3/2008 | Forstall et al. |
| 2008/0088698 A1 * | 4/2008 | Patel et al. .................. 348/14.09 |
| 2008/0132290 A1 | 6/2008 | Sharabi et al. |
| 2008/0137913 A1 | 6/2008 | Hildreth |
| 2009/0262914 A1 * | 10/2009 | Khouri et al. ............ 379/202.01 |

* cited by examiner

| Type of User Activity | Communication Handling Action |
|---|---|
| Ignore Call Button | Handle as Definitely Ignored; No Ignored Call Display or Audible Alert |
| Detect User In Position to Perceive Call | Ignored Call Display; No Audible Alert |
| On Other Line | Ignored Call Display; Audible Alert When Other Communication Ends |

Fig. 15

IMAGE ANALYSIS AND COMMUNICATION DEVICE CONTROL TECHNOLOGY

CROSS-REFERENCE TO RELATED APPLICATION(S)

This application is a continuation of U.S. application Ser. No. 12/569,880, filed Sep. 29, 2009, which is incorporated by reference herein in its entirety for all purposes.

FIELD

This document relates to image analysis and communication device control technology.

BACKGROUND

Electronic communication devices may be configured to receive electronic communications and provide output to alert users of received electronic communications. For received electronic communications that are not answered, electronic communication devices may be configured to provide output to indicate that the unanswered electronic communications have been missed and/or have resulted in a message.

SUMMARY

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIG. 15 illustrates an example data structure.

DETAILED DESCRIPTION

Techniques are described for controlling communication devices using, for example, image analysis. For instance, when a communication is received by a communication device, the communication device outputs an alert (e.g., rings, vibrates, etc.) to alert users to the received communication and accesses (e.g., captures) one or more images of an area proximate to the communication device. The one or more images cover an area proximate to the communication device at a time during which the communication device is outputting the alert. The communication device analyzes the one or more images to determine whether a user is present in the one or more images and in a position to perceive the received communication (e.g., in a position to perceive the alert outputted by the communication device). The communication device handles at least one aspect of the received communication based on the determination of whether a user is in a position to perceive the received communication.

In some implementations, in a phone that tracks and displays missed calls, the phone may detect whether the user missed a call because the user did not perceive the call or whether the user intentionally ignored the call. The phone may detect, when an alert associated with the call is being output, whether a user is in an area near the phone (e.g., based on image analysis or a position/proximity sensor), whether a user is holding the phone (e.g., based on a tactile or pressure sensor), whether a user is on the other line, and/or whether a user pressed an ignore call button. Based on the detected information, the phone determines whether the user intentionally ignored a missed call or whether the user did not perceive the missed call. In these implementations, the phone handles ignored missed calls differently than unperceived missed calls. For example, the phone displays an unperceived missed call in a list of missed calls, but does not display an ignored missed call in the list of missed calls. Alternatively, the phone may display an unperceived missed call differently than an ignored missed call in the list of missed calls.

Figure 1:
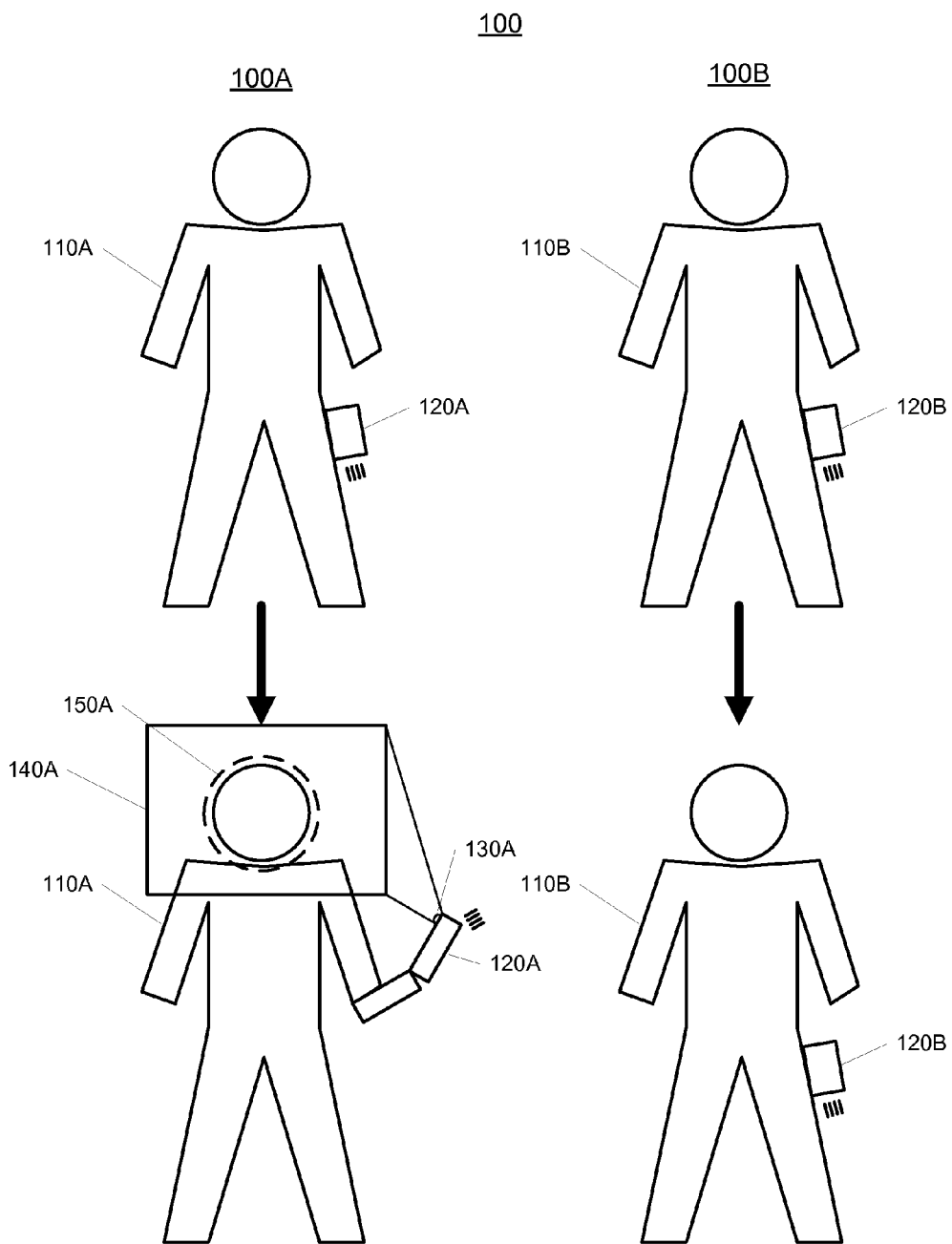
FIGS. 1-4, 8, 11, 13, and 26-28 illustrate examples of contextual diagrams.

Referring to FIG. 1, a contextual diagram 100 illustrates an example of a communication device handling a received communication based on a determination of whether a user is in a position to perceive the received communication. The contextual diagram 100 includes a first example 100A in which a user is determined to be in a position to perceive the received communication and a second example 100B in which a user is determined not to be in a position to perceive the received communication.

In the first example 100A, a user 110A has a communication device 120A that has received an electronic communication and that has activated a ringer to alert the user 110A of the received electronic communication. The communication device 120A may be a handheld device configured to receive various types of electronic communications. For instance, the communication device 120A may be a smart phone and the received electronic communication may be a telephone call, a text (e.g., Short Message Service (SMS)) message, or an electronic mail message.

As shown, the user 110A perceives the activated ringer and manipulates the communication device 120A to perceive the received electronic communication. The communication device 120A includes an image capture device 130A (e.g., a camera) that captures images of an area proximate to the communication device 120A. The communication device 120A may include a display screen (e.g., a liquid crystal display (LCD)) below the image capture device 130A. With this configuration, the image capture device 130A captures images of an area in front of the display screen and, therefore, captures images of users in a position to perceive the display screen. The display screen may provide additional information related to the received electronic communication, such as an identity of a device or person that initiated the communication.

Because the user 110A manipulated the communication device 120A to perceive the received electronic communication, the image capture device 130A captures one or more images of an area 140A proximate to the communication device 120A. The communication device 120A analyzes the one or more images and detects a user's face 150A within the one or more images. The communication device 120A may detect the user's face 150A by identifying facial features within the one or more images, comparing the one or more images to one or more facial templates and detecting a match, or using any type of image analysis technique that enables detection of a face within one or more images. Based on the detection of the user's face 150A within the one or more images, the communication device 120A determines that the user 110A is in a position that enables perception of the received electronic communication.

In the second example 100B, a user 110B has a communication device 120B that has received an electronic communication and that has activated a ringer to alert the user 110B of the received electronic communication. The communication device 120B may be a handheld device configured to receive various types of electronic communications. For instance, the communication device 120B may be a smart phone and the received electronic communication may be a telephone call, a text (e.g., Short Message Service (SMS)) message, or an electronic mail message.

As shown, the user 110B does not perceive (or ignores) the activated ringer and does not manipulate the communication device 120B to perceive the received electronic communication. Because the user 110B did not manipulate the communication device 120B to perceive the received electronic communication, the user 110B is not detected in one or more images of an area proximate to the communication device 120B. In this example, the communication device 120B may not capture any images because the communication device 120B remains closed while providing the alert related to the received electronic communication. Alternatively, the communication device 120B may capture one or more images of an area proximate to the communication device 120B and determine that a user's face is not present in the one or more images. Because the user 110B is not detected in one or more images of an area proximate to the communication device 120B, the communication device 120B determines that the user 110B is not in a position that enables perception of the received electronic communication.

Figure 2:
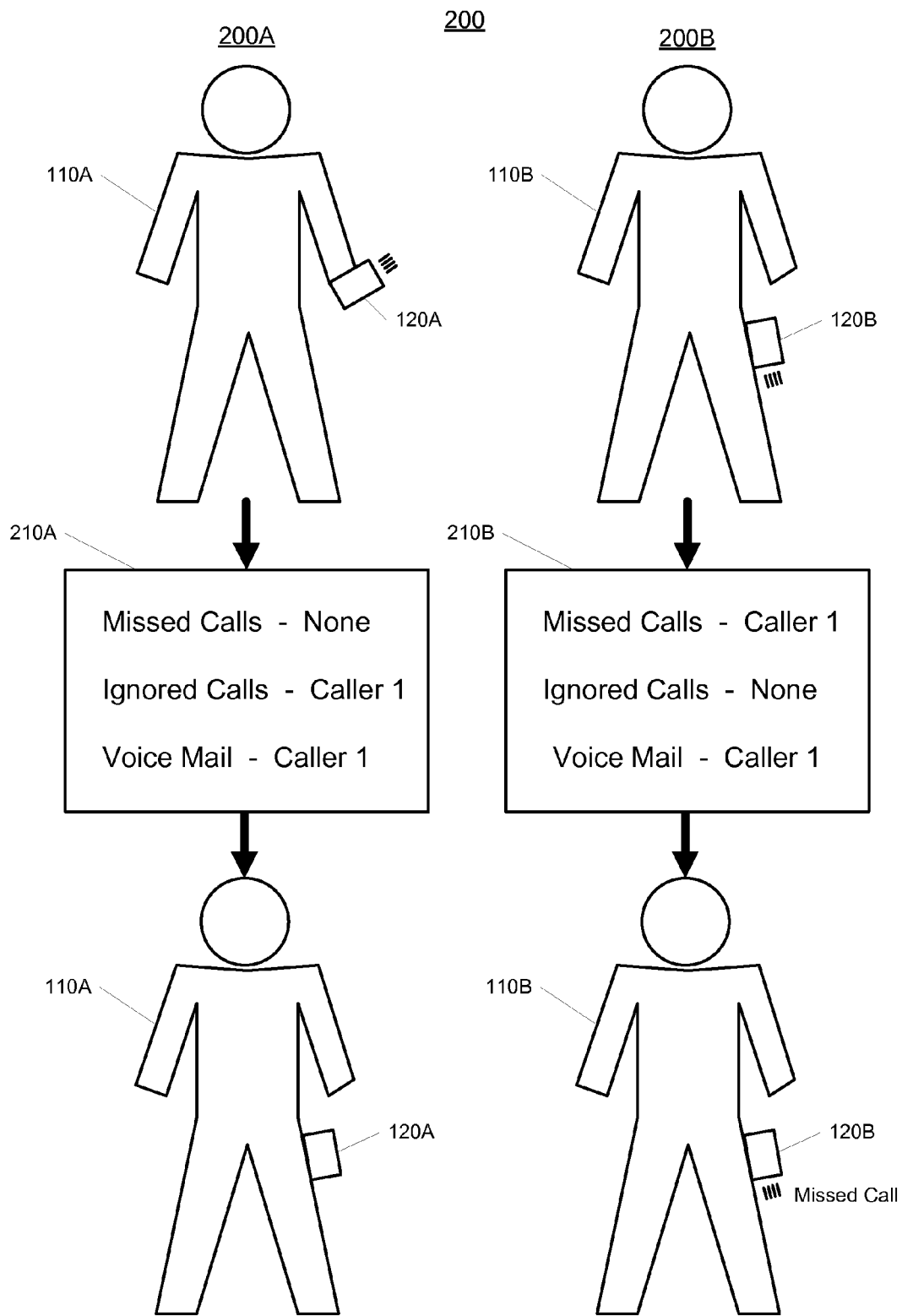

Referring to FIG. 2, a contextual diagram 200 continues the example shown in the contextual diagram 100. The contextual diagram 200 includes a first example 200A related to the first example 100A shown in FIG. 1 and a second example 200B related to the second example 100B shown in FIG. 1. By comparing the examples 100A and 200A against examples 100B and 200B, the difference in handling ignored electronic communications as compared to missed electronic communications may be seen.

In the example 200A, after perceiving receipt of the electronic communication, the user 110A closes the communication device 120A without establishing a communication session based on the received electronic communication (e.g., without connecting a received telephone call) or without fully perceiving the received electronic communication (e.g., without opening a received text message or electronic mail message). In other words, after perceiving receipt of the electronic communication, the user 110A has ignored the received electronic communication. Because the communication device 120A previously determined that the user 110A was in a position that enables perception of the received electronic communication and the user 110A did not establish a communication session based on the received electronic communication or fully perceive the received electronic communication, the communication device 120A determines that the user 110A intentionally ignored the received electronic communication.

Based on the determination that the user 110A ignored the received electronic communication, the communication device 120A handles the received electronic communication as an ignored electronic communication. For instance, when the received electronic communication is a telephone call, the communication device 120A may display an interface 210A that lists status information related to received telephone calls. As shown, the interface 210A lists whether a received call was missed, whether the received call was ignored, and whether the received call resulted in a voice mail message. Because the communication device 120A determined that the user 110A ignored the received call and determined that the received call was from Caller 1, the interface 210A shows no missed calls, shows an ignored call received from Caller 1, and shows that Caller 1 left a voice mail message.

In some implementations, the interface 210A may include more detailed information related to the received call, such as the date and time that the call was received. Also, the interface 210A may include different types of status information. For instance, rather than displaying a list of ignored calls, the interface 210A may only display a list of missed calls where the received call is not displayed as a missed call because it was ignored.

Furthermore, the communication device 120A may handle alerts related to the received communication based on the determination that the user 110A ignored the received electronic communication. For example, the communication device 120A may provide an audible alert (e.g., a beep) to notify the user 110A that the communication device 120A has received an electronic communication that was missed (e.g., did not result in an established communication session). In this example, the communication device 120A does not provide the audible alert for the received communication because the communication device 120A determined that the user 110A ignored the received electronic communication.

Handling the received electronic communication based on the determination that the user 110A ignored the received electronic communication may save the user 110A time in reviewing the received electronic communication. For instance, if the communication device 120A were to provide a visual or audible alert indicating that a communication has been missed based on an ignored communication, the user 110A may waste time checking for a missed communication when the user 110A had actually perceived receipt of the communication and already determined to ignore it. In addition, by not including the ignored communication in a list of missed communications, the user 110A may review the list of missed communication more quickly.

In the example 200B, the user 110B has not perceived receipt of the communication and does not establish a communication session based on the received electronic communication (e.g., not connecting a received telephone call) or does not fully perceive the received electronic communication (e.g., not opening a received text message or electronic mail message). In other words, the user 110B has missed the received electronic communication. Because the communication device 120B previously determined that the user 110B was not in a position that enables perception of the received electronic communication and the user 110B did not establish a communication session based on the received electronic communication or fully perceive the received electronic communication, the communication device 120B determines that the user 110B missed (e.g., did not perceive receipt of) the received electronic communication.

Based on the determination that the user 110B missed, rather than ignored, the received electronic communication, the communication device 120B handles the received electronic communication as a missed electronic communication. For instance, when the received electronic communication is a telephone call, the communication device 120B may display an interface 210B that lists status information related to received telephone calls. As shown, the interface 210B lists whether a received call was missed, whether the received call was ignored, and whether the received call resulted in a voice mail message. Because the communication device 120B determined that the user 110B missed the received call and determined that the received call was from Caller 1, the interface 210B shows a missed call received from Caller 1, shows no ignored calls, and shows that Caller 1 left a voice mail message.

In addition, the communication device 120B may handle alerts related to the received communication based on the determination that the user 110B missed the received electronic communication. For example, the communication device 120B may provide an audible alert (e.g., a beep) to notify the user 110B that the communication device 120B has received an electronic communication that was missed (e.g., did not result in an established communication session). In this example, as shown, the communication device 120B provides the audible alert for the received communication because the communication device 120B determined that the user 110B missed the received electronic communication and did not intentionally ignore the received electronic communication.

Figure 3:
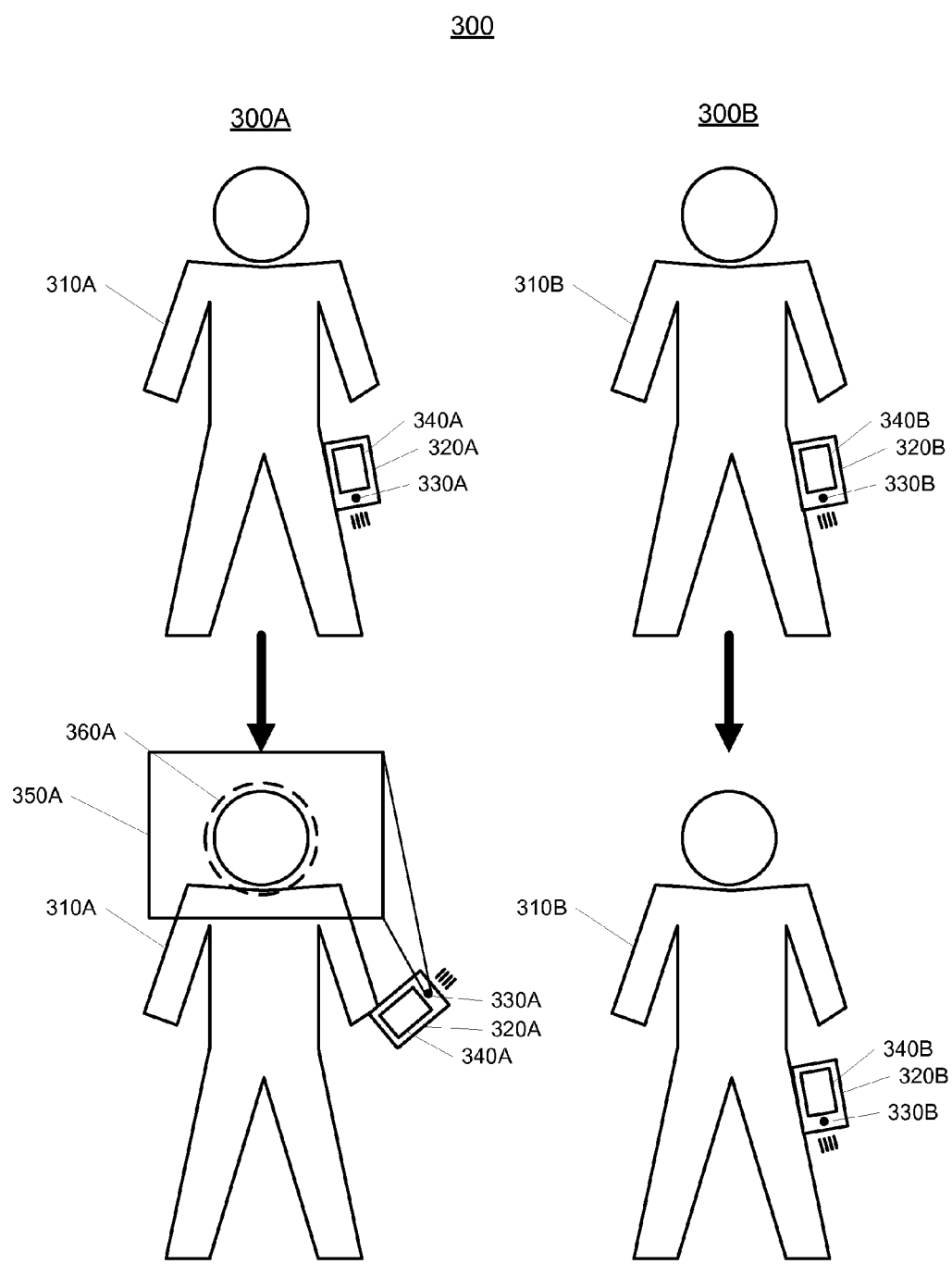

Referring to FIG. 3, a contextual diagram 300 illustrates another example of a communication device handling a received communication based on a determination of whether a user is in a position to perceive the received communication. The contextual diagram 300 includes a first example 300A in which a user is determined to be in a position to perceive the received communication and a second example 300B in which a user is determined not to be in a position to perceive the received communication.

In the first example 300A, a user 310A has a communication device 320A that has received an electronic communication and that has activated a ringer to alert the user 310A of the received electronic communication. The communication device 320A may be a handheld device configured to receive various types of electronic communications. For instance, the communication device 320A may be a smart phone and the received electronic communication may be a telephone call, a text (e.g., Short Message Service (SMS)) message, or an electronic mail message.

As shown, the user 310A perceives the activated ringer and manipulates the communication device 320A to perceive the received electronic communication. The communication device 320A includes an image capture device 330A (e.g., a camera) that captures images of an area proximate to the communication device 320A. The communication device 320A also includes a display screen 340A (e.g., a LCD) below the image capture device 330A. With this configuration, the image capture device 330A captures images of an area in front of the display screen 340A and, therefore, captures images of users in a position to perceive the display screen. The display screen 340A may be capable of providing additional information related to the received electronic communication, such as an identity of a device or person that initiated the communication.

Because the user 310A manipulated the communication device 320A to perceive the received electronic communication, the image capture device 330A captures one or more images of an area 350A proximate to the communication device 320A. The communication device 320A analyzes the one or more images and detects a user's face 360A within the one or more images. The communication device 320A may detect the user's face 360A by identifying facial features within the one or more images, comparing the one or more images to one or more facial templates and detecting a match, or using any type of images analysis technique that enables detection of a face within one or more images. Based on the detection of the user's face 360A within the one or more images, the communication device 320A determines that the user 310A is in a position that enables perception of the received electronic communication.

In the second example 300B, a user 310B has a communication device 320B that has received an electronic communication and that has activated a ringer to alert the user 310B of the received electronic communication. The communication device 320B may be a handheld device configured to receive various types of electronic communications. For instance, the communication device 320B may be a smart phone and the received electronic communication may be a telephone call, a text (e.g., Short Message Service (SMS)) message, or an electronic mail message.

As shown, the user 310B does not perceive (or ignores) the activated ringer and does not manipulate the communication device 320B to perceive the received electronic communication. Because the user 310B did not manipulate the communication device 320B to perceive the received electronic communication, the user 310B is not detected in one or more images of an area proximate to the communication device 320B. In this example, the communication device 320B captures, using an image capture device 330B (e.g., a camera), one or more images of an area proximate to the communication device 320B (e.g., an area in front of the display screen 340B) and determines that a user's face is not present in the one or more images. Because the user 310B is not detected in one or more images of an area proximate to the communication device 320B, the communication device 320B determines that the user 310B is not in a position that enables perception of the received electronic communication.

Figure 4:
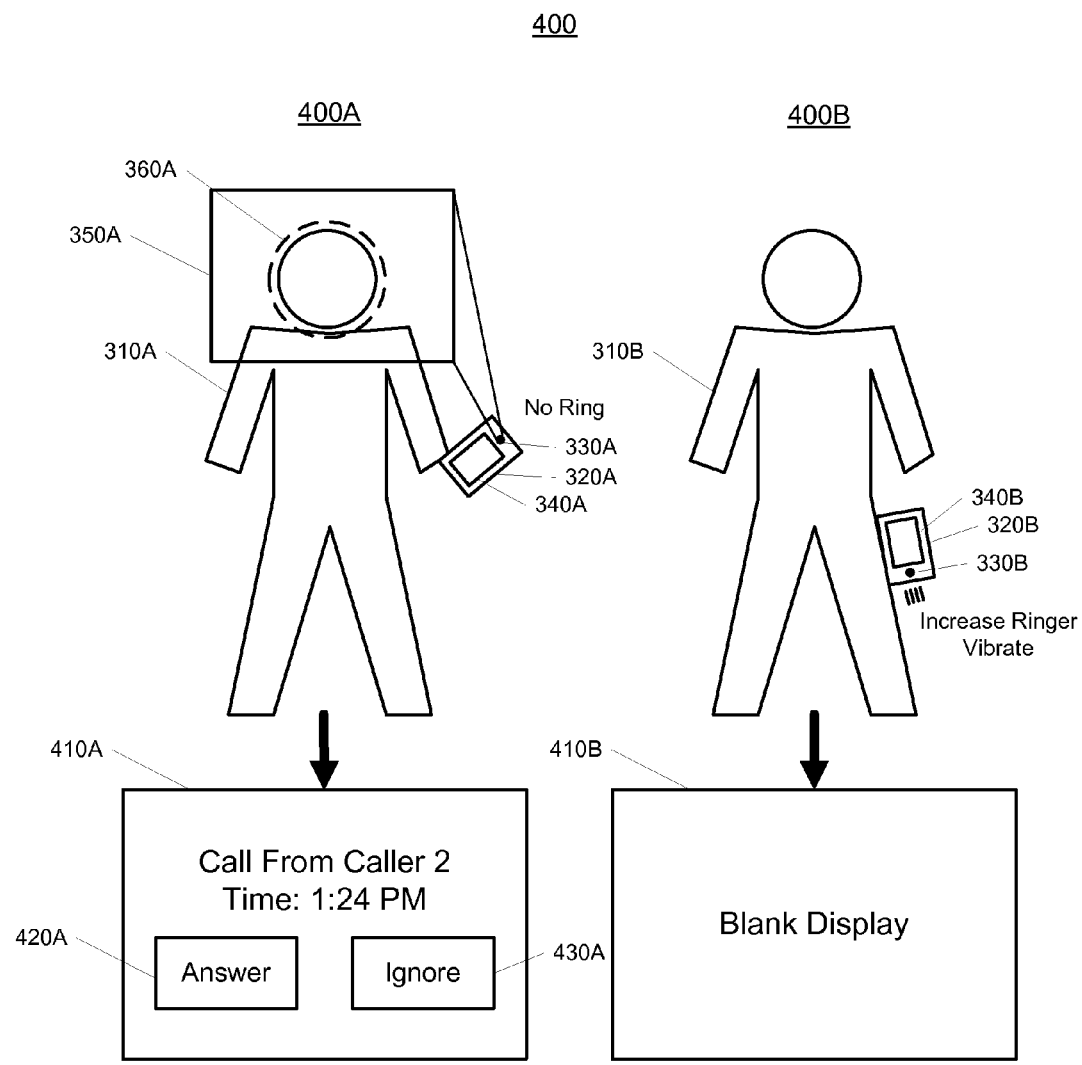

Referring to FIG. 4, a contextual diagram 400 continues the example shown in the contextual diagram 300. The contextual diagram 400 includes a first example 400A related to the first example 300A shown in FIG. 3 and a second example 400B related to the second example 300B shown in FIG. 3. By comparing the examples 300A and 400A against examples 300B and 400B, the difference in handling perceived electronic communications as compared to unperceived electronic communications may be seen.

In the example 400A, after the communication device 320A determines that the user 310A is in a position that enables perception of the received electronic communication, the communication device 320A controls device output settings in accordance with a user perceiving the received electronic communication. For instance, as shown, the communication device 320A automatically, without human intervention, turns off the ringer related to the received electronic communication. Because the communication device 320A has determined that the user 310A has perceived receipt of the electronic communication, the ringer is no longer necessary to alert the user 310A that an electronic communication has been received. Turning off the ringer may enhance user experience in using the communication device 320A because turning off the ringer may reduce user annoyance of the communication device 320A continuing to ring after the ringer has served its purpose and alerted a user to receipt of the electronic communication. In addition, turning off the ringer may enhance user experience in using the communication device 320A because other users may not continue to respond to an activating ringer when receipt of an electronic communication has been perceived by another user. For example, a husband may not run to answer a ringing phone when the husband's wife has perceived the phone call associated with the ring and determined not to answer the phone call because it is from an unsolicited caller.

Furthermore, the communication device 320A controls device output settings by automatically, without human intervention, updating the display screen 340A based on the determination that the user 310A is in a position that enables perception of the received electronic communication. As shown, the communication device 320A controls the display screen 340A to display a call handling interface 410A. The call handling interface 410A shows communication information that indicates the type of received electronic communication (e.g., a phone call), the source of the received electronic communication (e.g., Caller 2), and the time (e.g., 1:24 PM). The call handling interface 410A also includes input controls for handling the received electronic communication. As shown, the call handling interface 410A includes an answer control 420A and an ignore control 430A. The user 310A may answer the received phone call by activating (e.g., pressing) the answer control 420A and the user 310A may ignore the received phone call by activating (e.g., pressing) the ignore control 430A. The call handling interface 410A may include other types of communication information and other types of communication handling controls. In addition, the communication information and controls may vary depending on the type of communication received and characteristics of the user detected.

In the example 400B, after the communication device 320B determines that the user 310B is not in a position that enables perception of the received electronic communication, the communication device 320B controls device output settings in accordance with the received electronic communication not being perceived by a user. For instance, the communication device 320B automatically, without human intervention, increases output settings directed to alerting the user to the received electronic communication. As shown, the communication device 320B automatically, without human intervention, increases output settings by increasing a volume of the ringer and causing the communication device 320B to vibrate. Because the communication device 320B has determined that the user 310B has not perceived receipt of the electronic communication, the volume of the ringer is increased to improve the chances that the user 310B perceives receipt of the electronic communication. Increasing output settings may enhance user experience in using the communication device 320B because the user 310B is less likely to miss a received electronic communication simply because the user 310B was unable to perceive an alert related to the received electronic communication.

Furthermore, the communication device 320B controls device output settings by automatically, without human intervention, controlling the display screen 340B based on the determination that the user 310B is not in a position that enables perception of the received electronic communication. As shown, the communication device 320B controls the display screen 340B to display a blank interface 410B (e.g., no display). The blank interface 410B is displayed because the user 310B is not in a position that enables perception of the display screen 340B and, therefore, displaying a communication handling interface is not necessary. Displaying a blank interface when the user 310B is not in a position that enables perception of the received electronic communication may reduce power consumption (e.g., save battery power) of the communication device 320B because the display screen 340B is not controlled to display information when doing so is not necessary. Also, displaying a blank interface when the user 310B is not in a position that enables perception of the received electronic communication may reduce the chance that the received communication is handled in a manner that is inconsistent with the user's intention. For example, because the interface is blank and communication handling controls are not displayed, the user 310B is less likely to inadvertently activate a control (e.g., by inadvertently pressing a control when manipulating the communication device 320B to perceive the display screen 340B, by inadvertently pressing a control when the communication device 320B is in the user's 310B pocket, etc.) and handle the received communication in a manner that is inconsistent with the user's intention.

Figure 5:
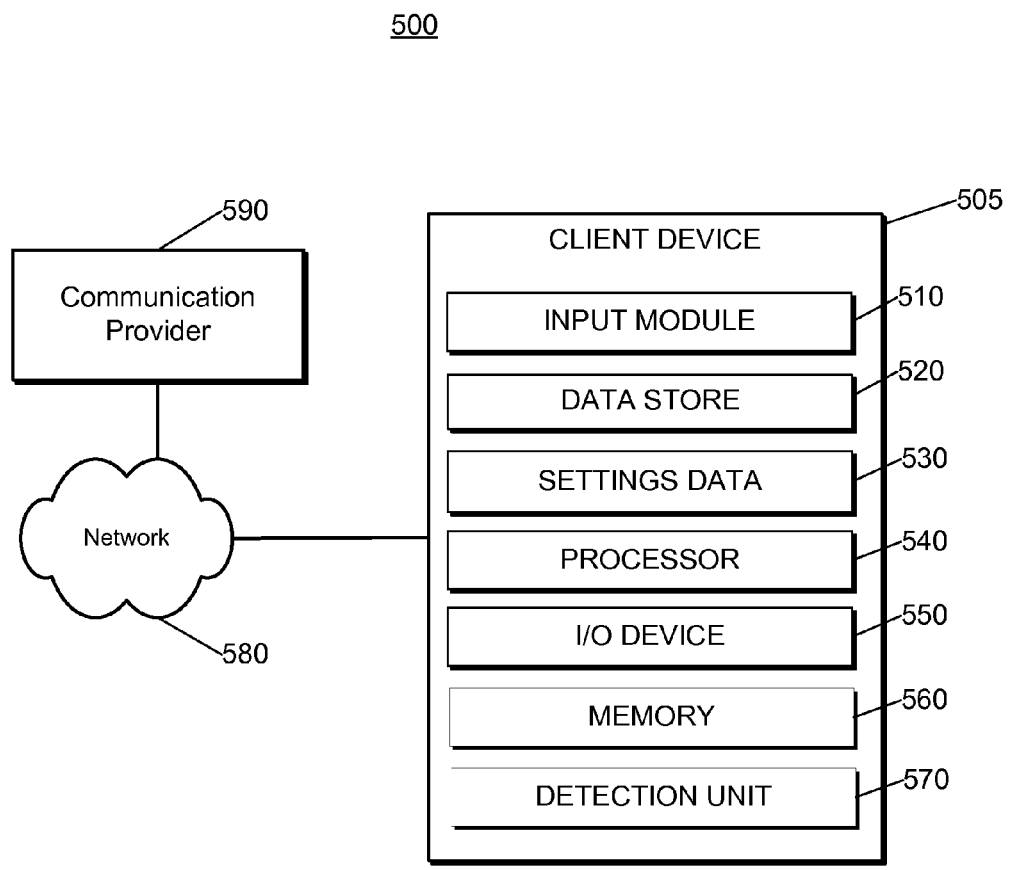
FIG. 5 depicts an example of a system.

Referring to FIG. 5, a block diagram of an electronic communication system 500 is shown. The system 500 includes a client device 505, a network 580, and a communication provider 590. The network 580 enables the client device 505 and the communication provider 590 to exchange electronic communications.

The client device 505 includes an input module 510, a data store 520, settings data 530, a processor 540, an input/output (I/O) device 550, and a memory 560. The client device 505 may be used to process communications for a user. The client device 505 may be a portable device or a desktop computer. The client device 505 may be implemented within hardware or a combination of hardware and software.

The input module 510 imports data associated with communications. The data may include data resulting from a received communication. The data also may include data related to interface settings that are used in displaying communications. The input module 510 may input data from a device (e.g., the communication provider 590) connected to the network 580. In some implementations, the input module 510 reformats and/or transforms the data such that the data may be processed and stored by other components within the client device 505.

The client device 505 also includes a data store 520. In some implementations, data from the input module 510 is stored in the data store 520. The data store 520 may be, for example, a database that logically organizes data into a series of database tables. The data store 520 may be a hard disk drive, non-volatile memory (e.g., Flash memory), or another type of electronic storage device.

The client device 505 also includes settings data 530. The settings data 530 may include data fro handling communications received by the client device 505. The settings data 530 also may include data reflecting the preferences of the user using the client device 505 (e.g., how the user would like to handle missed communications, how the user would like to handle ignored communications, etc.). In some implementations, the settings data 530 may be received, by the client device 505, from the communication provider 590, or may be stored, at least partially, by the communication provider 590.

The client device 505 also includes a processor 540. The processor 540 may be a processor suitable for the execution of a computer program such as a general or special purpose microprocessor, and any one or more processors of any kind of digital computer. Generally, a processor receives instructions and data from a read-only memory or a random access memory or both. The processor 540 receives instructions and data from the components of the client device 505 to, for example, display interfaces related to communications. In some implementations, the client device 505 includes more than one processor.

The client device 505 further includes the I/O device 550, which is configured to allow a user selection. For example, the I/O device 550 may be a mouse, a keyboard, a stylus, a touch screen, a track ball, a toggle control, one or more user input buttons, a microphone, or any other device that allows a user to input data into the client device 505 or otherwise communicate with the client device 505. In some implementations, the user may be a machine and the user input may be received from an automated process running on the machine. In other implementations, the user may be a person.

The I/O device 550 also may include a device configured to output electronic communication interfaces. For instance, the I/O device 550 may include a display device configured to display graphical user interfaces that enable a user to perceive communications and enable a user to interact with the client device 505. The I/O device 550 also may include a speaker configured to provide audible output related to communications (e.g., a voice telephone call or audible alerts related to communications).

The client device 505 also includes a memory 560. The memory 560 may be any type of tangible machine-readable storage medium. The memory 560 may, for example, store the data included in the data store 520. In some implementations, the memory 560 may store instructions that, when executed, cause the client device 505 to, for example, process and display communications using techniques described throughout this disclosure.

The communication system 500 also includes a network 580. The network 580 is configured to enable exchange of electronic communications between devices connected to the network 580. For example, the network 580 may be configured to enable exchange of electronic communications between the client device 505 and the communication provider 590. The network 580 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (DSL)), radio, television, cable, satellite, or any other delivery or tunneling mechanism for carrying data. Network 580 may include multiple networks or subnetworks, each of which may include, for example, a wired or wireless data pathway. The network 580 may include a circuit-switched network, a packet-switched data network, or any other network able to carry electronic communications. For example, the network 580 may include networks based on the Internet protocol (IP) or asynchronous transfer mode (ATM).

The communication provider 590 is an electronic device configured to execute programs and exchange communications with the client device 505 (e.g., multiple client devices) over the network 580. For example, the communication provider 590 may be configured to communication carrier and routing operations. In this example, the communication provider 590 may exchange communications with the client device 505 to receive input associated with communications and provide communication information to the client device 505 for output by the client device 505.

Although the example client device 505 is shown as a single integrated component, one or more of the modules and applications included in the client device 505 may be implemented separately from the device 505, but in communication with the device 505. For example, the data store 520 may be implemented on a centralized server that communicates and exchanges data with the client device 505. In this example, the communication provider 590 may communicate with the client device 505 and perform operations described throughout the disclosure as being performed by the client device 505 or may perform operations that assist in the client device 505 in performing described operations.

FIGS. 6, 7, 9, 10, 12, 14, 16, 18, 20, 22, and 25 illustrate example processes. The operations of the example processes are described generally as being performed by the system 500. The operations may be performed exclusively by the client device 505, may be performed exclusively by the communication provider 590, or may be performed by a combination of the client device 505 and the communication provider 590. In some implementations, operations of the example processes may be performed by one or more processors included in one or more electronic devices.

Figure 6:
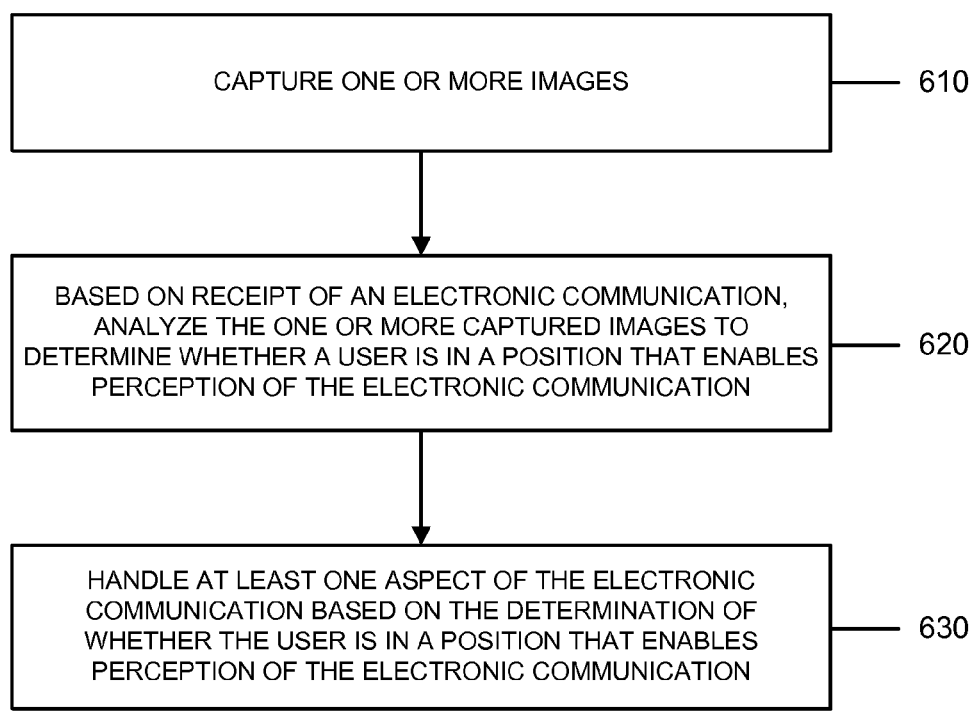
FIGS. 6, 7, 9, 10, 12, 14, 16, 18, 20, 22, and 25 are flowcharts of example processes.

FIG. 6 illustrates an example of a process 600 for handling electronic communications based on image analysis. The system 500 captures one or more images (610). The system 500 may capture a single image or a series of multiple images using a digital camera. The system 500 may capture the images continuously or may be begin capturing images in response to receiving an electronic communication. In the latter example, the system 500 may detect receipt of an electronic communication (e.g., a telephone call, text message, etc.) and capture one or more images in response to detecting receipt of the electronic communication. The system 500 also may begin capturing images in response to user manipulation of an electronic device included in the system 500. For instance, the system 500 may begin capturing images in response to detecting a user opening a cellular telephone that flips open.

The one or more images captured by the system 500 may be of an area proximate to a communication device included in the system 500. In some implementations, the system 500 may include a camera that is separate from the communication device. In these implementations, the camera may be positioned to capture images of an area proximate to the communication device. For example, the communication device may be a telephone (e.g., a landline telephone) sitting on a desk in a user's office. In this example, the camera may be positioned to capture images of an area near the telephone, such as the desk area of the user's office in which the user typically will be located when answering the telephone. The camera may be positioned to capture images of an area covering at least an area in which a typical user can physically reach and control (e.g., answer) the telephone. The area may include at least a three foot radius surrounding the telephone.

In some examples, the communication device included in the system 500 may include a camera. In these examples, the camera may be coupled to, attached to, integrated in, or embedded in the communication device. For instance, the communication device may be a handheld communication device (e.g., a cellular telephone, smart phone, etc.) that includes a camera. The camera may be oriented to capture images of an area in which a user typically will be positioned when using the communication device. The area may be an area in front of a display screen or control interface of the communication device.

In some implementations, the system 500 may include multiple cameras with each capturing one or more images of an area proximate to the communication device. The multiple cameras may be positioned to cover different views (e.g., front, back, and side views) of the area proximate to the communication device. In some examples, a communication device may include multiple cameras that each captures one or more images of an area proximate to the communication device. The multiple cameras in the communication device may be oriented to capture different views (e.g., views of the front and back sides of the communication device). Using images from multiple cameras positioned to cover different views may enhance user detection and user recognition processes described throughout.

Based on receipt of an electronic communication, the system 500 analyzes the one or more captured images to determine whether a user is in a position that enables perception of the electronic communication (620). For instance, the system 500 analyzes the one or more captured images to detect whether a person is present in the one or more images. The system 500 may detect whether a person is present in the one or more images by detecting whether an object in the one or more images has characteristics of a person's face or a person's body. The system 500 may detect whether an object in the one or more images has characteristics of a person's face or a person's body by comparing features from the one or more images to stored features that are representative of a person's face or a person's body (e.g., a facial/body feature database). The system 500 may detect features, such as facial features (e.g., eyes, nose, mouth, etc.), skin color, skin texture, body shape, head shape, and/or any other type of biometric feature that enables detection or recognition of a person in one or more images.

In response to detecting a person in the one or more images, the system 500 further may determine whether the person is in a position to perceive receipt of the electronic communication. For example, when the system 500 detects a person's body in the one or more images, the system 500 may detect whether the person's face is also present in the one or more images and whether the person's face is oriented in a direction that enables the person to see the electronic communication device that received the electronic communication. In this example, when a camera that captures the one or more images is oriented to cover an area in front of a display screen of the communication device, the system 500 may determine that a user is not in a position that enables perception of the electronic communication when the system 500 detects a user's body in the one or more images, but does not detect the user's face. Because the system 500 does not detect the user's face, the system 500 may determine that the user is looking away from the display screen of the communication device and, therefore, not in a position to perceive the electronic communication. Alternatively, when the system 500 detects the user's face, the system 500 may determine that the user is looking at the display screen of the communication device and, therefore, in a position to perceive the electronic communication.

In some implementations, the system 500 may trigger the analysis of the one or more images based on receipt of an electronic communication. For example, the system 500 may continuously or regularly capture images of an area proximate to the communication device that received the electronic communication. In this example, the system 500 may not continuously or regularly analyze captured images, but, instead, trigger analysis of the continuously or regularly captured images in response to receipt of the electronic communication. The system 500 may select images captured after receipt of the electronic communication to analyze. The system 500 also may select a set of images that includes images captured within a threshold period of time prior to receipt of the electronic communication. The set of images may include the images captured within a threshold period of time prior to receipt of the electronic communication and images captured after receipt of the electronic communication and while an alert signaling receipt of the electronic communication (e.g., a phone ring) is being output.

In other examples, the system 500 may trigger the analysis of the one or more images based on receipt of an electronic communication by triggering an image capture process in response to receipt of the electronic communication. The system 500 then may analyze the images captured in the triggered image capture process. The image capture process may capture images after receipt of the electronic communication and while an alert signaling receipt of the electronic communication (e.g., a phone ring) is being output.

The system 500 handles at least one aspect of the electronic communication based on the determination of whether the user is in a position that enables perception of the electronic communication (630). For example, the system 500 may handle post-communication notifications based on the determination of whether the user is in a position that enables perception of the electronic communication. When the electronic communication does not result in a completed communication session (e.g., a completed telephone call or instant messaging session), the system 500 may treat the electronic communication as an ignored electronic communication in response to a determination that the user is in a position that enables perception of the electronic communication. Alternatively, in response to a determination that the user is not in a position that enables perception of the electronic communication, the system 500 may treat the electronic communication as a missed electronic communication. Any of the techniques described throughout the disclosure may be applied in handling ignored electronic communications as compared to missed electronic communications. For instance, when the system 500 tracks missed electronic communications and displays information (e.g., a list) related to missed electronic communications, the system 500 may not include ignored communications in the displayed information or may distinguish ignored communications from missed communications in the displayed information.

In addition, the system 500 may handle post-communication notifications by determining whether or not to provide an alert related to the electronic communication based on the determination of whether the user is in a position that enables perception of the electronic communication. For instance, the system 500 may provide an alert related to the electronic communication in response to a determination that the user is not in a position that enables perception of the electronic communication. Alternatively, the system 500 may not provide an alert related to the electronic communication in response to a determination that the user is in a position that enables perception of the electronic communication. The alert may be an audible alert (e.g., a beep), a physical alert (e.g., a vibration), and/or a visual alert (e.g., a communication missed indicator) indicating a communication has been received.

The system 500 further may control output that alerts users to receipt of the electronic communication based on the determination of whether the user is in a position that enables perception of the electronic communication. For instance, the system 500 may increase a volume of an audible alert and/or provide an additional alert (e.g., vibration) in response to a determination that the user is not in a position that enables perception of the electronic communication. Alternatively, the system 500 may decrease a volume of an audible alert or stop providing an alert in response to a determination that the user is in a position that enables perception of the electronic communication.

The system 500 also may control a display of the communication device based on the determination of whether the user is in a position that enables perception of the electronic communication. For instance, the system 500 may turn off or maintain a display in a blank or off state in response to a determination that the user is not in a position that enables perception of the electronic communication. Alternatively, the system 500 may turn on or maintain a display in an on state (e.g., a state in which information related to the received communication is displayed) in response to a determination that the user is in a position that enables perception of the electronic communication.

Figure 7:
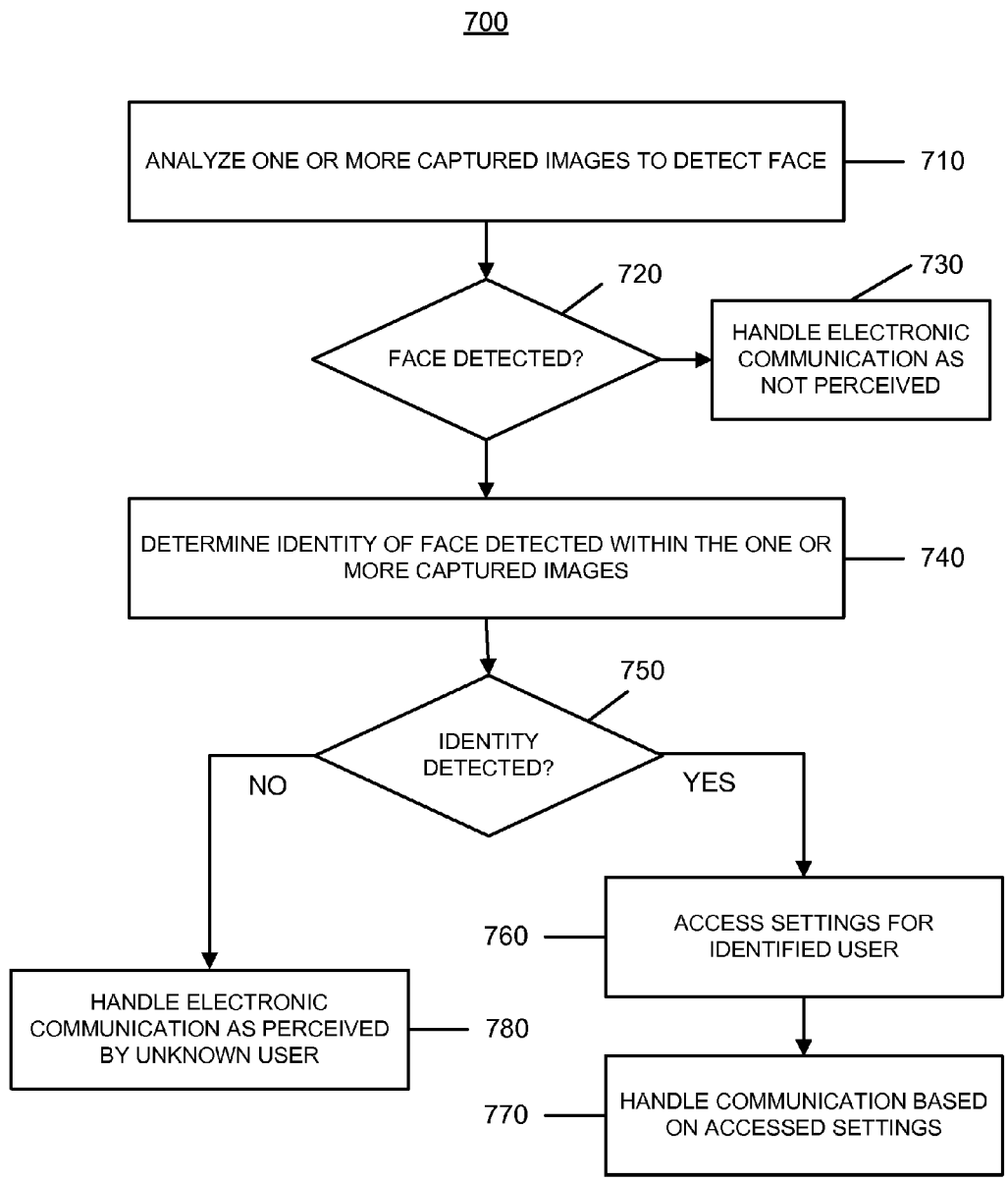

FIG. 7 illustrates an example of a process 700 for handling electronic communications based on identity detection. The system 500 analyzes one or more captured images to detect a face within the one or more images (710). For instance, the system 500 detects whether an object in the one or more images has characteristics of a person's face. The system 500 may compare features from the one or more images to stored features that are representative of a person's face (e.g., a facial feature database). The system 500 may compare features of objects in the one or more images to facial features (e.g., eyes, nose, mouth, etc.), skin color of a face, skin texture of a face, head shape, and/or any other type of biometric feature that enables detection of a person's face in one or more images. The system 500 also may perform an edge detection process and analyzes the detected edges to identify an object that has a size and shape that may correspond to a person's face. The system 500 may perform a more detailed facial feature comparison to objects that have a size and shape that may correspond to a person's face.

The system 500 determines whether a face is present within one or more captured images based on the analysis (720). The system 500 may determine whether a face was detected when analyzing the one or more images. For instance, the system 500 may determine whether a face is present based on results of an edge detection process and/or a facial feature comparison/analysis.

In response to a determination that a face is not present within the one or more captured images, the system 500 handles an electronic communication as not perceived by a user (730). For instance, the system 500 may determine that the user missed the electronic communication because a face was not detected and handle the electronic communication as a missed electronic communication. The system 500 also may control output that alerts users to receipt of the electronic communication in response to the determination of that a face is not present within the one or more captured images (e.g., increase a volume of an audible alert signaling receipt of an electronic communication). Any of the techniques described throughout the disclosure for handling missed or unperceived electronic communications may be used when a face is not detected.

In response to a determination that a face is present within the one or more captured images, the system 500 attempts to determine an identity of the face detected within the one or more captured images (740). For instance, the system 500 may perform a facial recognition process that automatically identifies or verifies a person from one or more digital images or one or more video frames. The system 500 may compare selected facial features from the one or more images to a facial database of registered users. In some implementations, the system 500 may extract landmarks, or features, from an image of the detected face. In these implementations, the system 500 may analyze the relative position, size, and/or shape of the eyes, nose, cheekbones, and jaw. These features are then used to search for other images with matching features. In some approaches, a gallery of face images may be normalized and then the face data may be compressed, only saving the data in the image that is useful for face detection. A captured image may then be compared with the face data. The system 500 may attempt to determine an identity of the face detected within the one or more captured images using eigenface, fisherface, Hidden Markov models, neuronal motivated dynamic link matching, or any other type of facial recognition technique.

The facial feature database of registered users used by the system 500 may include images or facial feature data for a limited number of potential users. For example, the facial feature database may include a reference image or reference feature data for only the user that owns the communication device. In this example, the facial recognition process merely involves determining whether the face detected within the one or more captured images matches the user that owns the communication device. The system 500 may enable a user to register an image of the user's face and associate data with the image of the user's face. The associated data may include personal data as well as personalized settings. In some implementations, the system 500 may enable multiple, different users (e.g., a family that shares a communication device) to register images and associate personal data and personalized settings. In these implementations, the system 500 may detect which of the multiple, different users is perceiving a received communication and handle the received communication based on personalized settings associated with the detected user.

In some examples, the owner of the communication device (e.g., an adult user) may control the settings of registered users. In these examples, the owner may register images of one or more other users and establish settings for the one or more registered users. In this regard, the owner may place controls on how other users use the communication device. For instance, the owner may prevent a first user (e.g., a first child) from answering received calls and may allow a second user (e.g., a second child) to answer received calls, but prevent the second user from accessing voice mail, accessing the Internet, playing games using the communication device, and sending communications using the communication device.

Based on the attempt to determine the identity of the face detected within the one or more captured images, the system 500 determines whether an identity of the face has been detected (750). The system 500 may determine whether a facial recognition process was successful and a match with a sufficient degree of similarity was found. For instance, the system 500 may determine whether features of the face detected within the one or more captured images match features in a reference image of a registered user with more than a threshold degree of similarity.

When the system 500 detects the identity of the face detected within the one or more captured images, the system 500 accesses settings for the identified user (760) and handles an electronic communication based on the accessed settings (770). The system 500 may access, from electronic storage, personalized settings related to the identified user. The personalized settings may relate to incoming communication settings (e.g., ringer volume, vibration settings, display settings, etc.). For instance, the system 500 may control incoming communication alerts and displayed information based on the personalized incoming communication settings. In one example, the system 500 may decrease, but not turn off, a ringer volume for a first identified user, turn off a ringer for a second identified user, and maintain a ringer volume for a third identified user. In another example, the system 500 may display a first set of information related to the incoming communication for a first identified user, display a second set of information related to the incoming communication for a second identified user, and maintain a blank display (e.g., to conserve power) for a third identified user. In this example, the first set of information displayed to the first identified user may be different than the second set of information displayed to the second identified user. For instance, the first user may chose to display a contact name, a telephone number, and a time for an incoming phone call, but the second user may chose to display a contact name, a telephone number, and a time for an incoming phone call as well as additional information, such as past call information related to the contact (e.g., last time contact called), whether the contact is available over other communication mediums (e.g., instant messaging), nearby calendar appointments for the second user, etc.

The personalized settings also may relate to missed communication handling settings (e.g., personalized alerts, missed versus ignored communication handling, etc.). For instance, when the identified user does not answer or open an incoming communication, the system 500 may control post communication alerts and displayed information based on the personalized missed communication handling settings. In one example, the system 500 may list an unanswered phone call as a missed call for a first identified user, may list an unanswered phone call as an ignored call for a second identified user, and may not list an unanswered phone call for a third identified user. In another example, the system 500 may provide a missed communication alert for a first identified user, provide an ignored communication alert which is different than the missed communication alert for a second identified user, and no unanswered or unopened communication alert for a third identified user.

The personalized settings also may relate to control settings established by the owner of the communication device. For instance, the system 500 may control the communication device based on the personalized control settings. In one example, the system 500 may prevent a first identified user from handling any type of electronic communication, may allow a second identified user to handle an incoming phone call, but prevent the second identified user from handling an incoming electronic mail message, and may allow a third identified user to handle any type of communication. In another example, the system 500 may prevent a first identified user from handling electronic communications from any source, may allow a second identified user to handle an incoming communication from friends in a contact list associated with the communication device, but prevent the second identified user from handling incoming communications from other users in the contact list or from unlisted users, and may allow a third identified user to handle communications from any source.

The system 500 further may automatically control volume settings (e.g., a volume of a speaker during a telephone call) and display settings (e.g., type of information displayed, background image, etc.) based on personalized settings of the identified user. In addition, each user may store personalized contact lists and the system 500 may control contact list related features (e.g., which contact list is displayed) based on the personalized contact list of the identified user. Further, each user may store personalized calendar information and the system 500 may control calendar related features (e.g., which calendar is displayed, which reminder alerts are provided, etc.) based on the personalized calendar information of the identified user.

In some implementations, the system 500 may control ability to send outgoing communications based on the personalized settings similar to controlling ability to handle incoming communications as discussed above. The system 500 also may control other functionality of the communication device based on the personalized settings. For instance, the system may allow some users to access voicemail, calendar information, and/or games, but prevent other users from accessing voicemail, calendar information, and/or games.

In some implementations, the system 500 may track data related to which users are handling which communications and display information related to the tracked data. For instance, in a list of received communications, ignored communications, or placed communications, the system 500 may display information (e.g., an icon, a font color, etc.) that indicates which user received, ignored, or placed the corresponding communication in the list. In addition, for alerts provided related to ignored communications, the system 500 may provide information indicating which user ignored the communication in the alert and may tailor or customize the alert provided based on which user ignored the communication. In terms of tailoring or customizing alerts, the system 500 may not provide an alert when the user that ignored the communication is using the communication device, but provide a missed communication alert when another user is using the communication device. For example, when a first user ignores a received communication, the system 500 does not provide an alert related to the ignored communication when the first user is using the communication device, but, when a second user is using the communication device, provides an alert related to the ignored communication. In this example, the alert provided to the second user may indicate that the received communication was missed, provide details related to the received communication, and indicate that the received communication was ignored by the first user.

When the system 500 fails to detect the identity of the face detected within the one or more captured images, the system 500 handles an electronic communication as perceived by an unknown user (780). The system 500 may access default settings and handle the electronic communication using the default settings. In some examples, the system 500 may handle an electronic communication perceived by an unknown user as a missed electronic communication.

The default settings may be set by the owner of the communication device and may reflect how the owner wishes unknown users to be able to handle communications received on the owner's communication device. For instance, the owner may determine that unknown users should not be able to handle received communications at all and the system 500 may prevent unknown users from using the owner's communication device. In other examples, the owner may determine that unknown users should be able to use the owner's communication device, but with limited functionality. In these examples, the owner may establish default settings that allow unknown users to handle electronic communications being received (e.g., answer an incoming telephone call), but prevent unknown users from accessing messages or past communications (e.g., voicemail). The owner also may control types of incoming communications that an unknown user is able to handle, such as allowing unknown users to handle incoming phone calls, but preventing unknown users from handling incoming electronic mail messages. The owner further may limit unknown users to handling incoming communications originated by a particular source. For example, the owner may allow unknown users to handle incoming communications from people in the owner's contact list that are labeled as friends, but prevent unknown users from handling incoming communications from people in the owner's contact list that are labeled as co-workers or clients and from people that are not in the owner's contact list.

The owner also may establish default settings that prevent unknown users from sending outgoing communications or certain types of outgoing communications. For instance, the owner may establish default settings that allow unknown users to place telephone calls using the communication device, but prevent unknown users from sending electronic mail or text messages using the communication device. In addition, the owner may establish default settings that allow unknown users to place communications to people in the owner's contact list that are labeled as friends, but prevent unknown users from placing communications to people in the owner's contact list that are labeled as co-workers or clients and to people that are not in the owner's contact list. The system 500 may allow unknown users to place an emergency call (e.g., 911 call) using the communication device without regard for the owner's settings.

In some implementations, the system 500 provides alerts or notifications to the owner of the communication device that an unknown user is handling or has handled communications using the owner's communication device. For instance, the system 500 may display a notification that a call was received on the communication device and was answered by an unknown user. The notification may be displayed the next time the system 500 detects the owner near the communication device and may include information related to the received call. The system 500 also may, in a list of received communications, display received communications handled by unknowns users differently than communications handled by the owner or other registered users. The system 500 may track received communications handled by unknown users and enable the owner to list received communications handled by unknown users. The system 500 further may provide similar alerts or notifications related to communications placed by unknown users.

In some examples, the system 500 may store one or more captured images of an unknown user that handled a communication (e.g., answered or placed a call) using the owner's communication device. The system 500 may display the stored image of the unknown user as part of the alert or notification provided to the owner. Based on the displayed image, the owner may determine which user handled the communication and communicate with the user that handled the communication as needed or desired. The owner also may register the user that handled the communication and establish personalized settings for the user that handled the communication. For instance, the owner may be upset that the user handled a communication using the owner's communication device and establish settings that prevent the user from handling future communications using the owner's communication device. In this regard, the system 500 may move the stored image of the unknown user to the facial database and associate settings with the stored image of the unknown user that prevent the unknown user from handling future communications using the communication device.

The system 500 also may automatically block an unknown user from perceiving displayed communications on the communication device when the unknown user is detected in an area that enables perception of the displayed communication. For example, when the communication device is lying on a table and is displaying an electronic mail message, the system 500 may remove the displayed electronic mail message and lock the communication device when an unknown user is detected in an image of an area proximate to the communication device. In another example, the system 500 may remove a displayed electronic mail message when an unknown user is detected in an image looking over the shoulder of the owner using the communication device. In this example, the owner may control the communication device to re-display the electronic mail message, even when the unknown user continues to look over the shoulder of the owner using the communication device. As such, the system 500 may control handling of the communication device by unknown users differently when the owner is also present in the one or more captured images in which the unknown user is detected. In this regard, the system 500 may allow an unknown user to handle an electronic communication using the communication device when the owner is detected in the one or more captured images with the unknown user, but prevent the unknown user from handling an electronic communication using the communication device when the owner is not detected in the one or more captured images with the unknown user.

Figure 8:
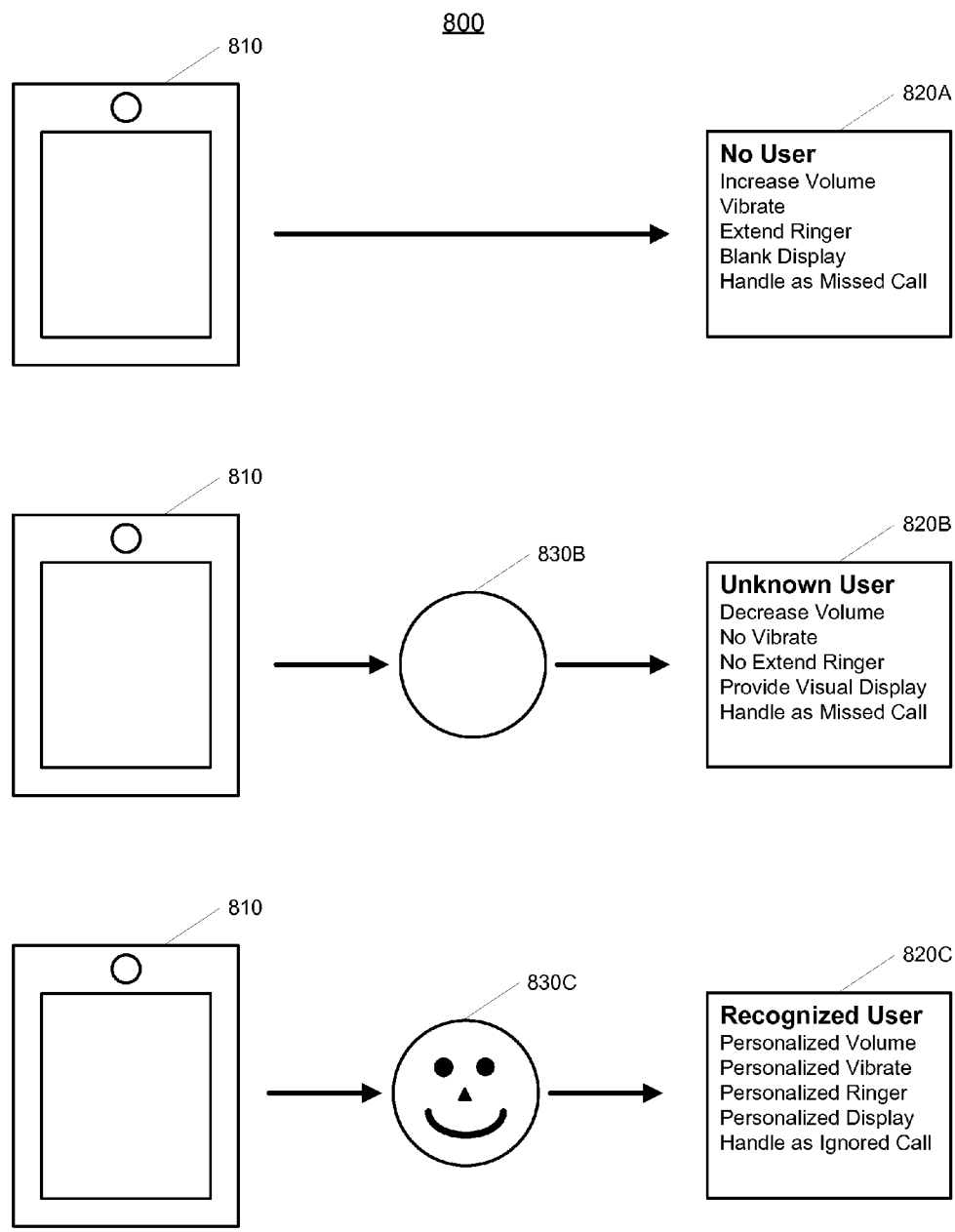

FIG. 8 illustrates a diagram 800 showing examples of a communication device 810 handling a received communication based on detection of a user proximate to the communication device 810 when the communication device 810 receives the communication. The diagram 800 shows an example 820A in which no user is detected as the communication is being received, an example 820B in which an unknown user 830B is detected as the communication is being received, and an example 820C in which a registered user 830C is detected as the communication is being received. As shown, in the example 820A in which no user is detected as the communication is being received, the communication device 810 handles the communication as an unperceived and missed communication. Based on no user being detected, the communication device 810 controls communication alert settings to increase chances of alerting a user to the received communication by, for example, increasing volume of a ringer of the communication device 810, causing the communication device 810 to vibrate, and extending a ringer time of the communication device 810. In the example 820A, the communication device 810 also attempts to conserve power by deactivating features that are unnecessary when a user is not present near the communication device, such as by causing a display of the communication device 810 to be blank (e.g., turning the display off or maintaining the display in a blank state). Further, when the communication is not answered in the example 820A, the communication device 810 handles post communication features as if the communication was missed. For example, the communication device 810 lists the received communication in a list of missed communications, provides missed communication alerts related to the received communication, and/or performs any other type of missed communication operations described throughout this disclosure.

In the example 820B in which the unknown user 830B is detected as the communication is being received, the communication device 810 handles the communication as a perceived and missed communication. The communication device 810 handles the communication as being missed because it was not perceived by a registered user, such as the owner of the communication device 810. Based on the unknown user 830B being detected, the communication device 810 controls communication alert settings to enhance user experience for the user that is perceiving the communication by, for example, decreasing (e.g., turning off) volume of a ringer of the communication device 810, stopping the communication device 810 from vibrating, and determining not to extend a ringer time of the communication device 810. The communication device 810 controls communication alert settings to enhance user experience for the user that is perceiving the communication because the communication alerts have been successful in alerting a user to the received communication. In the example 820B, the communication device 810 also activates features that are helpful only when a user is present near the communication device, such as by causing a display of the communication device 810 to provide visual output related to the received communication. Further, when the communication is not answered in the example 820B, the communication device 810 handles post communication features as if the communication was missed. For example, the communication device 810 lists the received communication in a list of missed communications, provides missed communication alerts related to the received communication, and/or performs any other type of missed communication operations described throughout this disclosure.

In the example 820C in which the known user 830C is detected as the communication is being received, the communication device 810 handles the communication as a perceived and ignored communication. Based on the known user 830B being detected, the communication device 810 controls communication alert settings in accordance with personalized settings for the recognized user by, for example, providing a personalized volume of a ringer of the communication device 810, providing personalized vibration control for the communication device 810, and providing a personalized ringer time of the communication device 810. In the example 820C, the communication device 810 also provides personalized control of features that are helpful only when a user is present near the communication device, such as by providing personalized control and content selection for a display of the communication device 810. For instance, the known user 830C may prefer to save power and decide not to provide a visual display, the known user 830C may prefer a visual display with a relatively limited set of information, or the known user 830C may prefer a visual display with a relatively detailed set of information. Further, when the communication is not answered in the example 820C, the communication device 810 handles post communication features as if the communication was ignored. The communication device 810 handles the communication as being ignored because receipt of the communication was perceived by the known user 830C and the known user 830C chose not to answer the received communication. For example, the communication device 810 does not list the received communication in a list of missed communications, does not provide missed communication alerts related to the received communication, and/or performs any other type of ignored communication operations described throughout this disclosure. In some implementations, the known user 830C sets personalized ignored communication settings and the communication device handles the received communication based on the personalized ignored communication settings.

Figure 9:
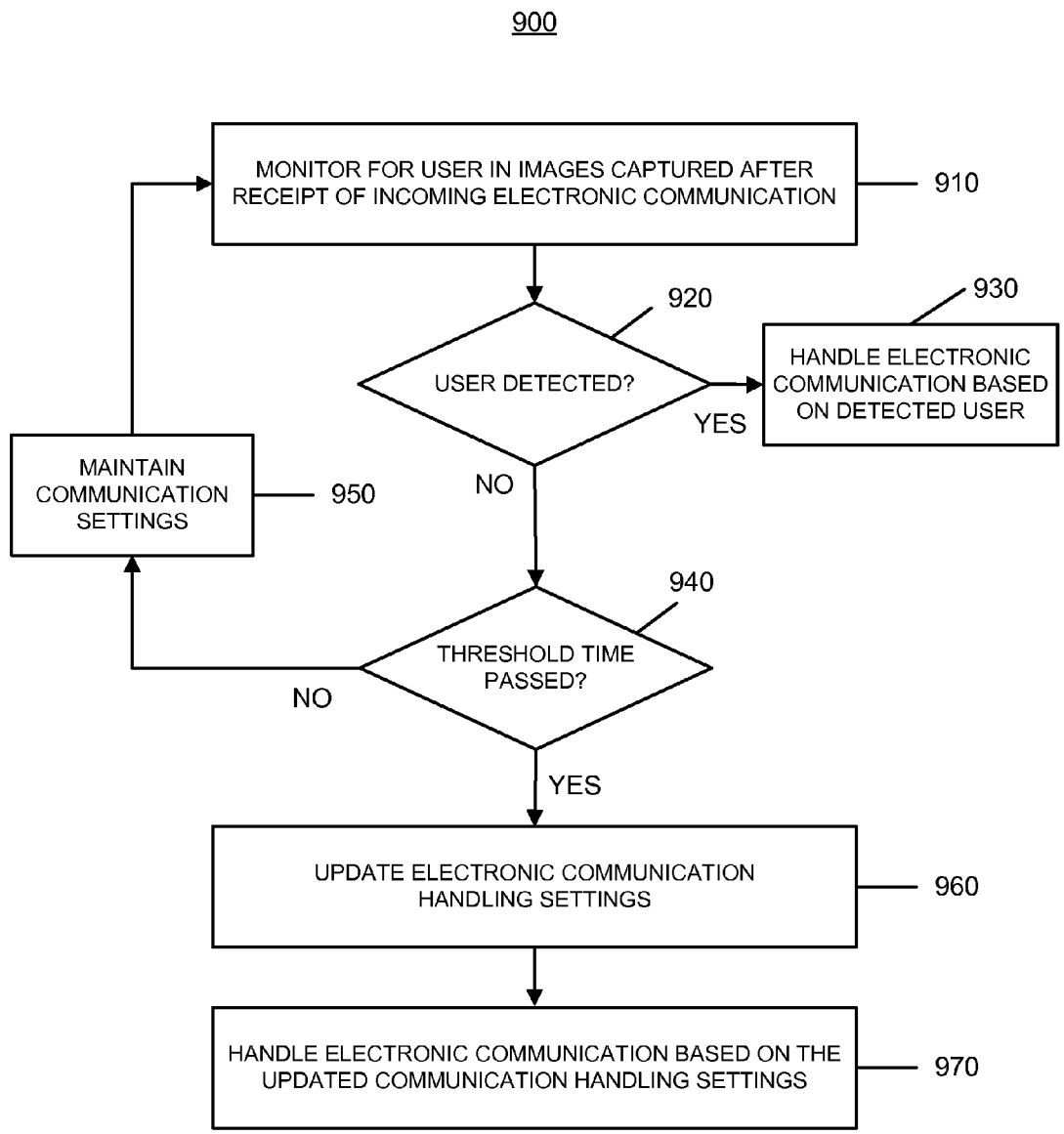

FIG. 9 illustrates an example of a process 900 for handling electronic communications based on communication settings. The system 500 monitors for a user in images captured after receipt of an incoming electronic communication (910). For example, the system 500 captures images after receiving an electronic communication and while outputting an alert that indicates receipt of the electronic communication (e.g., a phone ringer). In this example, the system 500 analyzes the images captured after receipt of the electronic communication to attempt to detect a user in one or more of the images. The system attempts to detect a user by analyzing the images for features that relate to a user's face or a user's body. When an object in an image matches a typical face or body with an acceptable degree of similarity, the system 500 detects a user. In some examples, the system 500 uses facial recognition technology to detect a specific identity of a user in the captured images.

The system 500 determines whether a user is detected within the images based on the monitoring (920). For instance, the system 500 determines whether a user was detected within the one or more images captured after receipt of the electronic communication based on results of the analysis performed.

In response to detection of a user, the system 500 handles the electronic communication based on the detected user (930). For example, the system 500 handles the electronic communication as a perceived electronic communication. In this example, the system 500 may handle the electronic communication using any of the techniques described throughout this disclosure for handling perceived communications. The system 500 may treat the electronic communication as an ignored communication when the system 500 detects that the user does not engage in (e.g., answer) the electronic communication. The system also may adjust communication settings based on detecting the user in one or more images (e.g., reducing a ringer volume, adjusting a display, etc.). Further, in implementations in which the system 500 detects a specific identity of the user using facial recognition technology, the system 500 handles the electronic communication based on personalized settings set for the specific user detected.

In response to failure to detect a user, the system 500 determines whether a threshold period of time has passed since receipt of the electronic communication (940). The system 500 determines whether a threshold period of time has passed since receipt of the electronic communication or since the system 500 began monitoring for users in images captured after receipt of the electronic communication. For example, the system 500 determines a difference between a current time and a start time when the communication was received or when the system 500 began the monitoring. In this example, the system 500 compares the difference to a threshold and determines whether the difference exceeds the threshold based on the comparison. In other examples, the system 500 may initiate a timer when the communication is received or when the system 500 begins monitoring for users in images captured after receipt of the electronic communication. In these examples, the system 500 compares the timer value to the threshold and, based on the comparison, determines whether the timer value exceeds the threshold.

In response to a determination that a threshold period of time has not passed since receipt of the electronic communication, the system 500 maintains communication settings and continues monitoring for a user in images captured after receipt of the electronic communication (950). For instance, the system 500 continues to provide an alert indicating receipt of the electronic communication using the same settings as the system 500 used to originally provide the alert. The system 500 also may control a display or other output device to maintain settings originally used for the electronic communication. In addition, the system 500 continues to capture images and analyze the captured images to determine whether a user is present in the captured images.

In response to a determination that a threshold period of time has passed since receipt of the electronic communication, the system 500 updates electronic communication handling settings (960). For example, the system 500 modifies the current electronic communication handling settings to settings appropriate for situations in which a user has not been alerted to receipt of a communication within a threshold period of time. In this example, the system 500 may update the electronic communication handling settings to settings that increase the chances of alerting a user to receipt of the electronic communication. The updated settings may include an increase in volume of an audible alert (e.g., a ringer volume) or switching to a setting where a device vibrates to increase the chances of alerting a user to receipt of the electronic communication.

The system 500 handles the electronic communication based on the updated communication handling settings (970). For instance, the system 500 applies the updated electronic communication handling settings that are appropriate for situations in which a user has not been alerted to receipt of a communication within a threshold period of time. When the settings include an increase in volume of an audible alert (e.g., a ringer volume) and switching to a setting where a device vibrates, the system 500 increases the volume of the audible alert and causes the device to vibrate.

Figure 10:
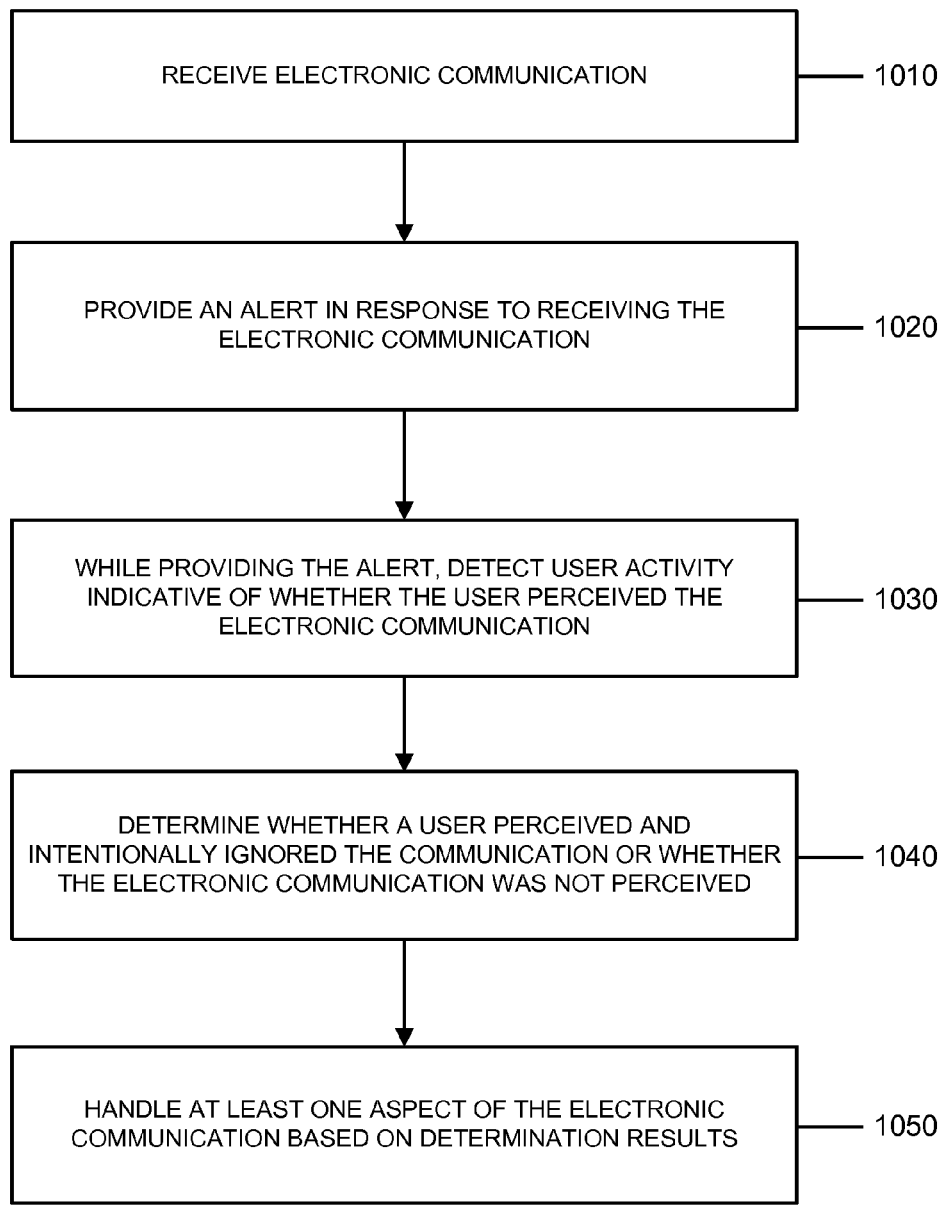

FIG. 10 illustrates an example of a process 1000 for handling electronic communications based on a determination of whether a user ignores an electronic communication. The system 500 receives an electronic communication (1010). For instance, the system 500 receives an electronic communication addressed to a user and initiated by a particular sender. The received electronic communication may be an electronic mail message, a text or SMS message, a telephone call, an instant message, or any other type of electronic message.

The system 500 provides an alert in response to receiving the electronic communication (1020). For example, the system 500 provides output to alert a user to receipt of the electronic communication. The output may be audible output provided by a speaker, such as a beep or a ringer. The output also may be visual output provided by a display or a light indicator, such as blinking and/or a particular color of a light emitting diode (LED) or an alert interface displayed on a display of an electronic device. The output further may be tactile output, such as vibration of a vibration device.

While providing the alert, the system 500 detects user activity indicative of whether the user perceived the electronic communication (1030). For instance, the system 500 detects activity that indicates whether a user has perceived receipt of the electronic communication at a time corresponding to when the alert is being provided to indicate receipt of the electronic communication. The system 500 may use any of the image analysis techniques described throughout this disclosure to detect whether a user is in a position to perceive the alert when the alert is being provided.

The system 500 also may detect whether a user perceives receipt of the electronic communication using other techniques. For example, the system 500 may detect user input received by the electronic device during a time when the alert is being provided. In this example, the system 500 may detect a user providing a user input command to ignore the electronic communication (e.g., pressing an ignore button) or providing a user input command to silence the alert associated with the electronic communication.

The system 500 further may detect whether a user perceives receipt of the electronic communication based on a physical sensor that senses physical control of an electronic device providing the alert associated with the electronic communication. For instance, the electronic device may include a pressure sensor that senses when a user is holding or picks up the electronic device. When the system 500 detects a user holding or picking up the electronic device at a time when the alert is being provided, the system 500 determines that the user perceived receipt of the electronic communication. The system 500 may include a gyroscope and/or an accelerometer that senses movement and/or orientation of the electronic device. When the system 500 detects movement and/or a change in orientation of the electronic device when the alert is being provided, the system 500 determines that the user perceived receipt of the electronic communication.

In addition, the system 500 may detect whether a user perceives receipt of the electronic communication based on whether the user is engaging another communication on the electronic device that receives the electronic communication at a time when the alert is being provided. For instance, the system 500 may detect that a user perceives receipt of the electronic communication when the user is connected to another telephone call at a time when the alert is provided. The system 500 also may consider text (e.g., SMS) messaging, electronic mail messages, and any other types of messaging activity that is indicative of whether the user perceived receipt of the electronic communication, but chose to ignore the electronic communication. In some examples, the system 500 considers multiple types of user activity in combination to determine whether a user perceived receipt of the electronic communication.

Based on the detection of user activity, the system 500 determines whether a user perceived and intentionally ignored the electronic communication or whether the electronic communication was not perceived (1040). The system 500 analyzes the detected activity and determines whether the detected activity is sufficient to infer or confirm that a user perceived receipt of the electronic communication. For instance, in the image analysis context, the system 500 may determine whether a detected user is looking at an electronic device providing the alert or looking away from the electronic device providing the alert. When the detected user is determined to be looking at the electronic device, the system 500 determines that the user perceived and intentionally ignored the electronic communication when the user does not engage (e.g., answer, respond to, read, etc.) the electronic communication. When the detected user is determined to be looking away from the electronic device, the system 500 determines that the user did not perceive receipt of the electronic communication and missed the electronic communication when the user does not engage (e.g., answer, respond to, read, etc.) the electronic communication.

In some implementations, the system 500 may uses multiple types of activity to determine whether the user perceived and intentionally ignored the electronic communication or whether the electronic communication was not perceived. For example, when the user is detected as being engaged in another communication session (e.g., on another telephone call) when the alert is being provided, the system 500 may consider other factors to determine whether the user intentionally ignored the electronic communication or missed the electronic communication. In this example, the system 500 determines whether or not the user moves or changes an orientation of the electronic device when the alert is being provided and the user is engaged in another communication session. When the system 500 detects movement or a change in orientation, the system 500 may determine that the user manipulated the electronic device to perceive receipt of the electronic communication, even though the user is engaged in another communication session. When the system 500 does not detect movement or a change in orientation, the system 500 may determine that the user did not perceive receipt of the electronic communication.

The system 500 handles at least one aspect of the electronic communication based on determination results (1050). For example, the system 500 handles the electronic communication as a perceived electronic communication when a user is detected as perceiving receipt of the electronic communication and handles the electronic communication as an unperceived electronic communication when a user is not detected as perceiving receipt of the electronic communication. In this example, the system 500 may handle the electronic communication using any of the techniques described throughout this disclosure for handling perceived communications (e.g., ignored communications) and unperceived communications (e.g., missed communications). The system 500 may treat the electronic communication as an ignored communication when the system 500 detects that the user does not engage in (e.g., answer) the electronic communication. The system also may adjust communication settings when the system detects the user perceiving the electronic communication (e.g., reducing a ringer volume, adjusting a display, etc.). Further, in implementations in which the system 500 detects a specific identity of the user using facial recognition technology, the system 500 handles the electronic communication based on personalized settings set for the specific user detected.

Figure 11:
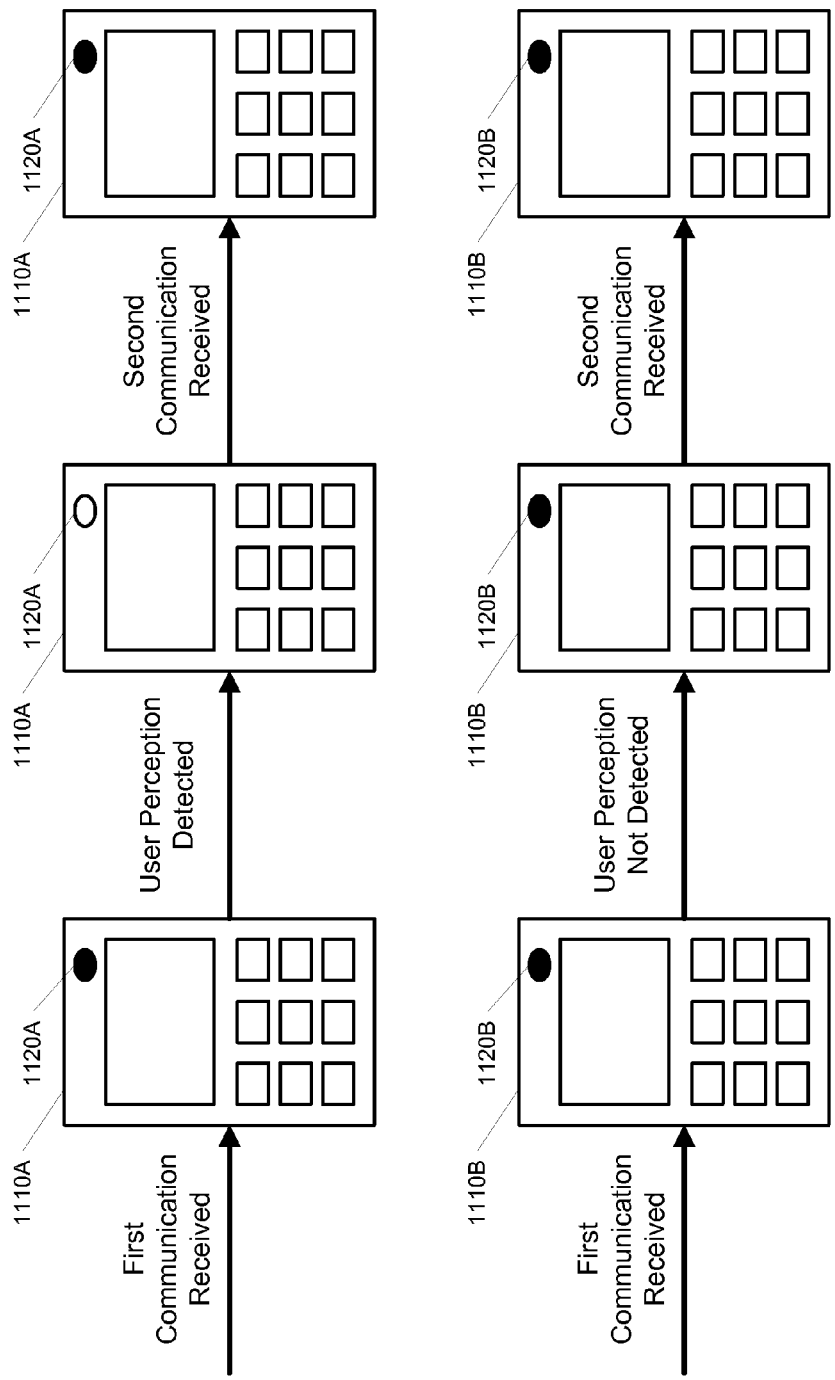

FIG. 11 illustrates a diagram showing examples of a communication device handling alerts provided in response to receiving new electronic communications. In a first example, a communication device 1110A (e.g., smart phone) receives a first electronic communication and the communication device 1110A provides an alert 1120A in response to the receiving the first electronic communication. The alert 1120A indicates that a new electronic communication has been received by communication device 1110A that has not been perceived. For instance, the alert 1120A may be an illumination device (e.g., an LED) that is controlled to illuminate when a new electronic communication has been received and has not yet been reviewed.

The communication device 1110A monitors whether a user perceives receipt of the first electronic communication or the alert 1120A that indicates presence of a new communication. The communication device 1110A may use any of the techniques described throughout this disclosure to determine whether a user perceives the first electronic communication or the alert 1120A. In the first example, the communication device 1110A determines that a user has perceived receipt of the first electronic communication or the alert 1120A. In response to the determination that the user has perceived receipt of the first electronic communication or the alert 1120A, the communication device 1110A stops providing the alert 1120A (e.g., turns off the LED or changes an LED color) even when the user has not actually reviewed the first electronic communication. For instance, the communication device 1110A stops providing the alert 1120A (e.g., turns off the new communication LED indicator) when the communication device 1110A detects that a user is within relatively close proximity to the communication device 1110A or when the communication device 1110A detects that a user has perceived (or has been in a position to perceive) the alert 1120A corresponding to the first electronic communication. By turning off or deactivating the alert 1120A when the communication device 1110A determines that the user has perceived and ignored the alert 1120A, the communication device 1110A may provide enhanced service to the user because the user is not unnecessarily alerted to a new communication when the user has already perceived and ignored the alert.

In the first example, after turning off or deactivating the alert 1120A, the communication device 1110A receives a second electronic communication and the communication device 1110A reactivates or turns on the alert 1120A in response to the receiving the second electronic communication. The reactivation of the alert 1120A may be helpful to the user because the user may determine that another new communication has been received in addition to the first communication the user perceived receipt of and ignored.

In a second example, a communication device 1110B (e.g., smart phone) receives a first electronic communication and the communication device 1110B provides an alert 1120B in response to the receiving the first electronic communication. The alert 1120B indicates that a new electronic communication has been received by communication device 1110B that has not been perceived. For instance, the alert 1120B may be an illumination device (e.g., an LED) that is controlled to illuminate when a new electronic communication has been received and has not yet been reviewed.

The communication device 1110B monitors whether a user perceives receipt of the first electronic communication or the alert 1120B that indicates presence of a new communication. The communication device 1110B may use any of the techniques described throughout this disclosure to determine whether a user perceives the first electronic communication or the alert 1120B. In the second example, the communication device 1110B determines that a user has not perceived receipt of the first electronic communication or the alert 1120B. In response to the determination that the user has not perceived receipt of the first electronic communication or the alert 1120B, the communication device 1110B maintains or continues to provide the alert 1120B. For instance, the communication device 1110B continues to provide the alert 1120B when the communication device 1110B determines that a user has not been within a relatively close proximity to the communication device 1110B or when the communication device 1110B determines that a user has not perceived (or has not been in a position to perceive) the alert 1120B corresponding to the first electronic communication.

In the second example, the communication device 1110B receives a second electronic communication while the communication device 1110B maintains or continues to provide the alert 1120B. In response to the second electronic communication, the communication device 1110B maintains or continues to provide the alert 1120B based on the second electronic communication. For instance, the communication device 1110B may extend a period of time in which the alert 1120B is provided.

Figure 12:
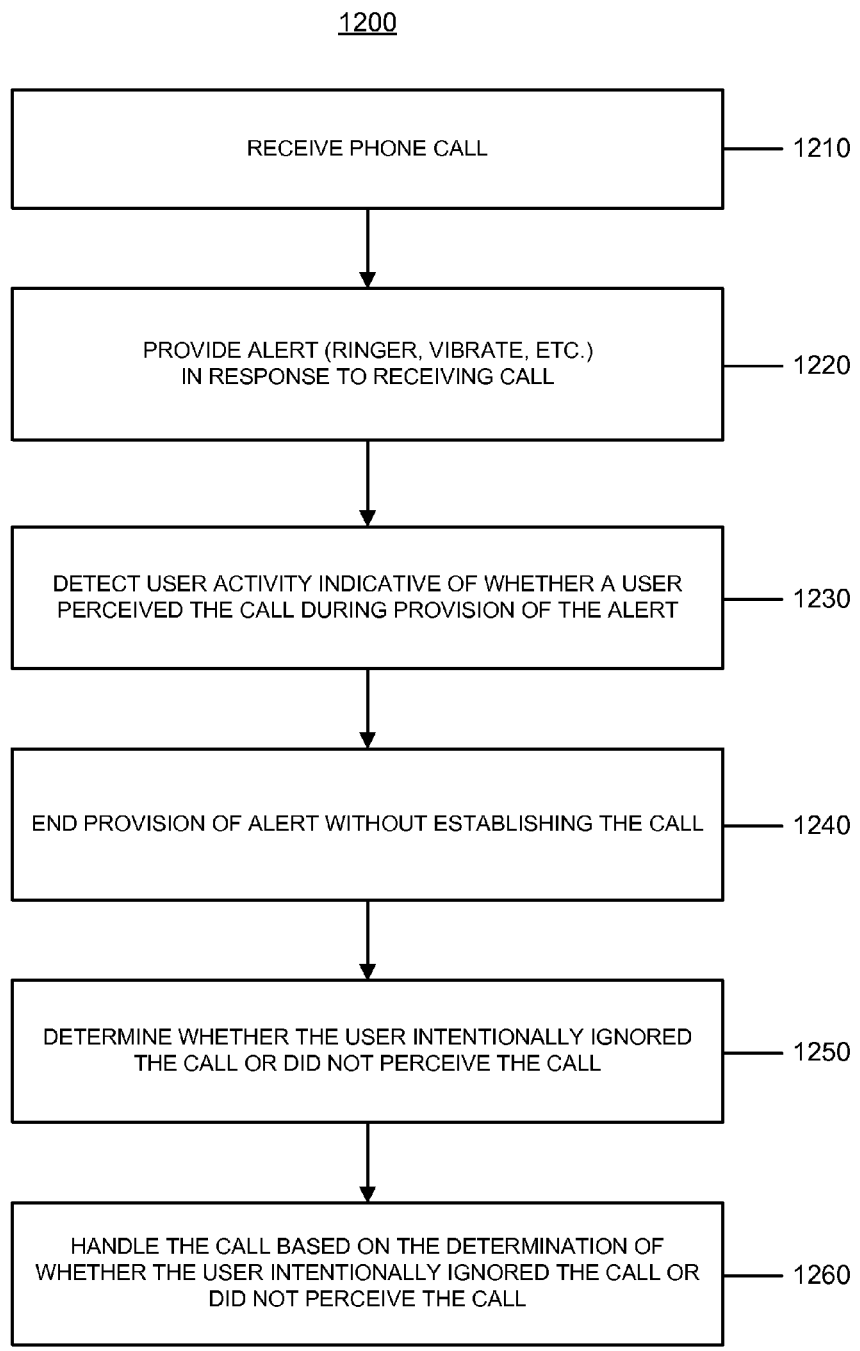

FIG. 12 illustrates an example of a process 1200 for handling telephone calls based on a determination of whether a user ignores a telephone call. The system 500 receives a telephone call (1210). For instance, the system 500 receives a telephone call placed to a telephone number of a user and initiated by a particular caller. The telephone call may be a telephone call over a cellular network, a telephone call voice over an internet protocol (VoIP) network, a telephone call voice over a public switched telephone network (PSTN), or a telephone call voice over another type of voice communication delivery technology.

The system 500 provides an alert in response to receiving the telephone call (1220). For example, the system 500 provides output to alert a user to receipt of the telephone call. The output may be audible output provided by a speaker, such as a beep or a ringer. The output also may be visual output provided by a display or a light indicator, such as blinking and/or a particular color of a light emitting diode (LED) or an alert interface displayed on a display of an electronic device. The output further may be tactile output, such as vibration of a vibration device.

The system 500 detects user activity indicative of whether the user perceived the telephone call during provision of the alert (1230). For instance, the system 500 detects activity that indicates whether a user has perceived receipt of the telephone call at a time corresponding to when the alert is being provided to indicate receipt of the telephone call. The system 500 may detect whether a user was in an area proximate to a telephone when the telephone is ringing to indicate receipt of the telephone call. The system 500 may use any of the image analysis techniques described throughout this disclosure to detect whether a user is in a position to perceive the alert when the alert is being provided.

The system 500 also may detect whether a user perceives receipt of the telephone call using other techniques. For example, the system 500 may detect user input received by the electronic device during a time when the alert is being provided. In this example, the system 500 may detect a user providing a user input command to ignore the telephone call (e.g., pressing an ignore button) or providing a user input command to silence a ringer associated with the telephone call.

The system 500 further may detect whether a user perceives receipt of the telephone call based on a physical sensor that senses physical control of an electronic device providing the alert associated with the telephone call. For instance, the electronic device may include a pressure sensor that senses when a user is holding or picks up the electronic device. When the system 500 detects a user holding or picking up the electronic device at a time when the alert is being provided, the system 500 determines that the user perceived receipt of the telephone call. The system 500 may include a gyroscope and/or an accelerometer that senses movement and/or orientation of the electronic device. When the system 500 detects movement and/or a change in orientation of the electronic device when the alert is being provided, the system 500 determines that the user perceived receipt of the telephone call.

In addition, the system 500 may detect whether a user perceives receipt of the telephone call based on whether the user is engaging another communication on the electronic device that receives the telephone call at a time when the alert is being provided. For instance, the system 500 may detect that a user perceives receipt of the telephone call when the user is connected to another telephone call at a time when the alert is provided. The system 500 also may consider text (e.g., SMS) messaging, electronic mail messages, and any other types of messaging activity that is indicative of whether the user perceived receipt of the telephone call, but chose to ignore the electronic communication. In some examples, the system 500 considers multiple types of user activity in combination to determine whether a user perceived receipt of the telephone call.

The system 500 ends provision of the alert without establishing the telephone call (1240). For instance, the system 500 does not establish a connection for the telephone call, stops attempting to establish a connection, and stops providing an alert signaling availability to connect to the telephone call (e.g., ends a ringer). The system 500 may end provision of the alert after a threshold period of time has passed since the system 500 began attempting to connect the telephone call (e.g., providing the alert).

The system 500 determines whether the user intentionally ignored the telephone call or did not perceive the telephone call (1250). The system 500 analyzes the detected activity and determines whether the detected activity is sufficient to infer or confirm that a user perceived receipt of the telephone call. For instance, in the image analysis context, the system 500 may determine whether a detected user is looking at an electronic device providing the alert or looking away from the electronic device providing the alert. When the detected user is determined to be looking at the electronic device, the system 500 determines that the user perceived and intentionally ignored the telephone call when the user does not answer the telephone call. When the detected user is determined to be looking away from the electronic device, the system 500 determines that the user did not perceive receipt of the telephone call and missed the telephone call when the user does not answer the telephone call.

In some implementations, the system 500 may uses multiple types of activity to determine whether the user perceived and intentionally ignored the telephone call or whether the telephone call was not perceived. For example, when the user is detected as being engaged in another communication session (e.g., on another telephone call) when the alert is being provided, the system 500 may consider other factors to determine whether the user intentionally ignored the telephone call or missed the telephone call. In this example, the system 500 determines whether or not the user moves or changes an orientation of the electronic device when the alert is being provided and the user is engaged in another communication session. When the system 500 detects movement or a change in orientation, the system 500 may determine that the user manipulated the electronic device to perceive receipt of the telephone call, even though the user is engaged in another communication session. When the system 500 does not detect movement or a change in orientation, the system 500 may determine that the user did not perceive receipt of the telephone call.

The system 500 handles at least one aspect of the telephone call based on the determination of whether the user intentionally ignored the call or did not perceive the call (1260). For example, the system 500 handles the telephone call as a perceived telephone call when a user is detected as perceiving receipt of the telephone call and handles the telephone call as an unperceived telephone call when a user is not detected as perceiving receipt of the telephone call. In this example, the system 500 may handle the telephone call using any of the techniques described throughout this disclosure for handling perceived communications (e.g., ignored communications) and unperceived communications (e.g., missed communications). The system 500 may treat the telephone call as an ignored call when the system 500 detects that the user does not answer the telephone call. The system also may adjust communication settings when the system detects the user perceiving the telephone call (e.g., reducing a ringer volume, adjusting a display, etc.). Further, in implementations in which the system 500 detects a specific identity of the user using facial recognition technology, the system 500 handles the telephone call based on personalized call settings set for the specific user detected.

Figure 13:
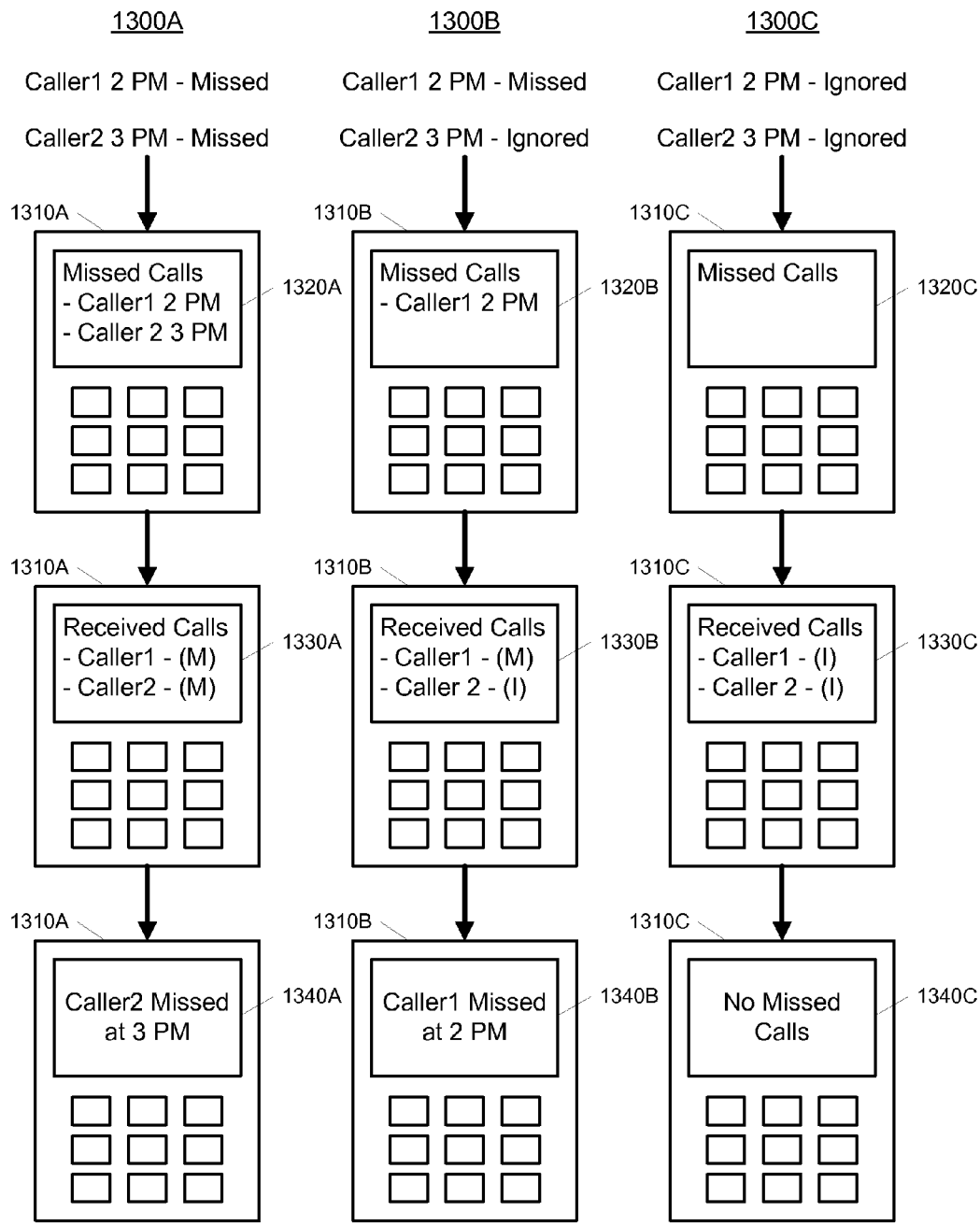

FIG. 13 illustrates a diagram showing examples of a communication device handling calls based on determinations of whether a user intentionally ignored the calls or did not perceive the calls. The diagram shows an example 1300A in which the communication device 1310A receives two calls that a user did not perceive, an example 1300B in which the communication device 1310B receives a first call that a user did not perceive and a second call that a user intentionally ignored, and an example 1300C in which the communication device 1310C receives two calls that a user intentionally ignored. Any of the techniques described throughout this disclosure may be used to detect whether a user did not perceive a call or intentionally ignored a call.

As shown, in the example 1300A in which the communication device 1310A receives two calls that the communication device 1310A detects that a user did not perceive, the communication device 1310A handles the two calls as missed calls. For instance, the communication device 1310A lists both calls in a list of missed calls 1320A displayed by the communication device 1310A. In addition, in a list of received calls 1330A, the communication device 1310A labels or otherwise identifies both calls as missed calls. Further, in an alert interface 1340A of the communication device 1310A, the communication device 1310A lists the second call as the most recent missed call.

In the example 1300B in which the communication device 1310B receives a first call that the communication device 1310B detects that a user did not perceive and a second call that the communication device 1310B detects that a user intentionally ignored, the communication device 1310B handles the first call as a missed call and the second call as an ignored call. For instance, the communication device 1310B lists only the first call in a list of missed calls 1320B displayed by the communication device 1310B. In addition, in a list of received calls 1330B, the communication device 1310B labels or otherwise identifies the first call as a missed call and labels or otherwise identifies the second call as an ignored call. Further, in an alert interface 1340B of the communication device 1310B, the communication device 1310B lists the first call as the most recent missed call, even though the second call was received after the first call.

In the example 1300C in which the communication device 1310C receives two calls that the communication device 1310C detects that a user intentionally ignored, the communication device 1310C handles the two calls as ignored calls. For instance, the communication device 1310C lists none of the calls in a list of missed calls 1320C displayed by the communication device 1310C. In addition, in a list of received calls 1330C, the communication device 1310C labels or otherwise identifies both calls as ignored calls. Further, in an alert interface 1340C of the communication device 1310C, the communication device 1310C indicates that no missed calls have been received, even though the communication device 1310C received two calls that were not connected.

Figure 14:
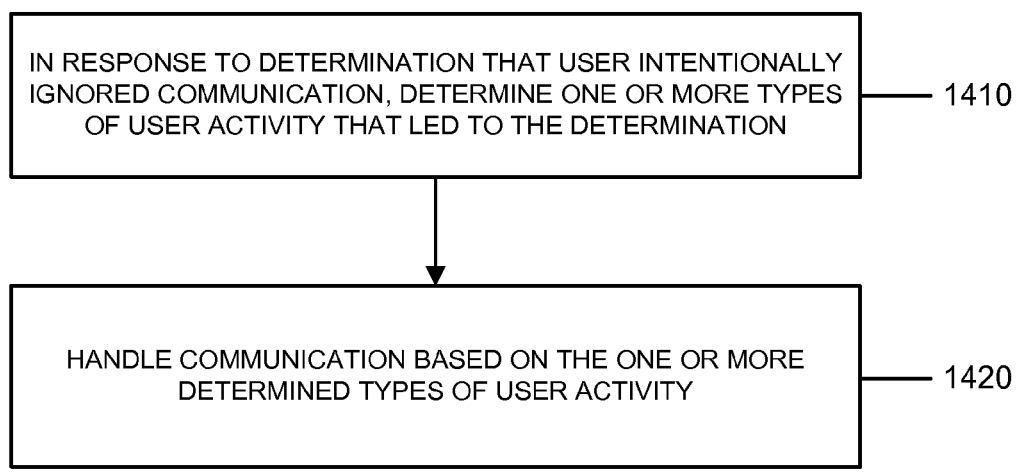

FIG. 14 illustrates an example of a process 1400 for handling telephone calls based on a type of user activity that led to a determination that a user ignored a received electronic communication. In response to a determination that a user intentionally ignored a received electronic communication, the system 500 determines one or more types of user activity that led to the determination (1410). For instance, as discussed above, for example with respect to FIG. 10, multiple types of activity can lead to a determination that a received electronic communication was intentionally ignored. The system 500 determines which of the multiple types of activity caused the determination that the received electronic communication was intentionally ignored. The system 500 may determine that the electronic communication was determined to have been intentionally ignored because a user's face was detected in an image of an area proximate to an electronic device providing an alert indicating receipt of the electronic communication. The system 500 also may determine that the electronic communication was determined to have been intentionally ignored because a user provided an ignore communication input command that explicitly indicates that the communication should be ignored.

The system 500 handles the received electronic communication based on the one or more determined types of user activity (1420). For example, the system 500 may use different weights for different types of user activity that led to a determination that a received electronic communication was intentionally ignored. In this example, the system 500 may place a relatively high weight on activity that explicitly indicates that the electronic communication should be ignored (e.g., a user providing an ignore communication input command). In addition, the system 500 may place a relatively low weight on activity that implicitly indicates that the electronic communication should be ignored (e.g., a user being detected in an image of an area proximate to an electronic device providing an alert indicating receipt of the electronic communication). Further, the system 500 may place a relatively medium weight on certain user activity, such as a combination of detecting a user in an image looking at the electronic device providing the alert indicating receipt of the electronic communication and also detecting a user holding the electronic device.

In some implementations, the system 500 uses the weight associated with the user activity that led to the determination that the electronic communication was intentionally ignored to determine how to handle the electronic communication. In these implementations, the system 500 may handle an explicitly ignored communication (e.g., a communication for which the user provided an ignore communication input command) differently than an implicitly ignored communication (e.g., a communication for which the system determines that the user ignored the communication based on detected presence of the user near the electronic device while the providing an alert related to the communication). Specifically, the system 500 may determine not to provide an alert for the explicitly ignored communication and also determine not to display any indication that the explicitly ignored communication was received. For the implicitly ignored communication, the system 500 may determine not to provide an alert for the implicitly ignored communication, but determine to list the implicitly ignored communication in a list of missed communications. For missed (e.g., unperceived) electronic communications, the system 500 may determine to provide an alert for the missed communications and determine to list the missed communications in a list of missed communications.

FIG. 15 illustrates an example data structure 1500 that includes rules for handling ignored communications based on the type of activity that led to the determination that the communication was intentionally ignored. The rules may be applied in handling a received electronic communication based on one or more determined types of user activity described above with respect to reference numeral 1420. The data structure 1500 includes a first column 1510 that indicates a type of user activity and a second column 1520 that indicates a communication handling action or rule that corresponds to the detected user activity listed in the first column 1510. As shown, the first row 1530 includes an action or rule for a communication determined to be ignored based on a user pressing an ignore call button. In this case, the system 500 handles the communication as definitely ignored and provides no ignored call display or audible alert related to the communication.

The second row 1540 includes an action or rule for a communication determined to be ignored based on a user being detected as in a position to perceive receipt of the communication. In this case, the system 500 handles the communication as probably ignored and includes the communication in an ignored call display, but does not provide an audible alert related to the communication.

The third row 1550 includes an action or rule for a communication determined to be ignored based on a user being on another line (e.g., engaged in another communication session, such as on another telephone call). In this case, the system 500 handles the communication by including the communication in an ignored call display and providing an audible alert related to the communication when the communication session on the other line ends.

Figure 16:
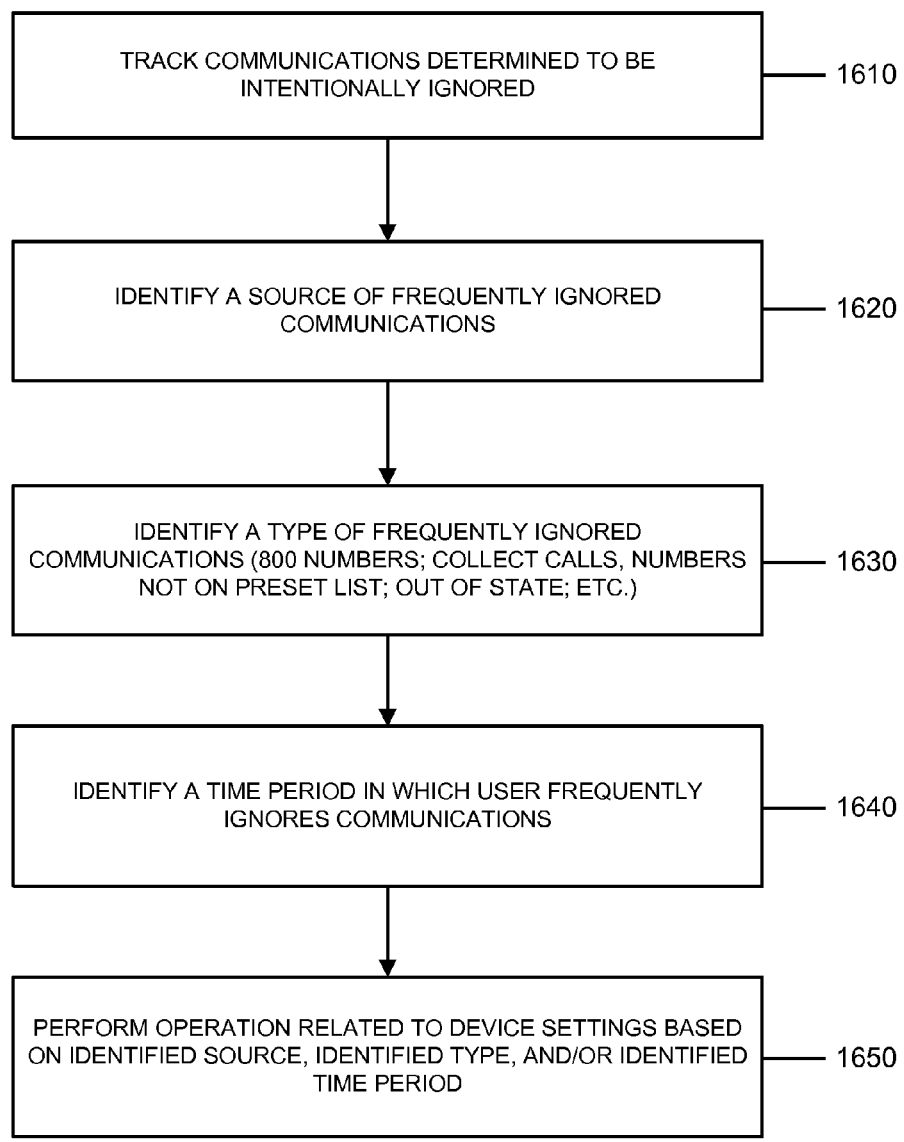

FIG. 16 illustrates an example of a process 1600 for performing an operation related to device settings based on characteristics of ignored communications. The system 500 tracks electronic communications determined to be intentionally ignored (1610). For instance, the system 500 identifies communications that are determined to be intentionally ignored and stores data related to the intentionally ignored communications. The system 500 may store data indicating the source of the intentionally ignored communications, a type of the intentionally ignored communications, and a time when the user ignored the intentionally ignored communications. The system 500 may store the data in an ignored communications log and the system 500 may analyze the stored data to identify patterns related to a type of communication ignored by a particular user and a time during which the particular user ignores communications. The identified patterns may be used to suggest changes in device settings to the particular user or automatically change device settings for the particular user.

The system 500 identifies a source of frequently ignored communications (1620). For example, the system 500 analyzes tracked data related to intentionally ignored communications and identifies a source of communications that the particular user typically ignores (e.g., ignores more than a threshold percentage of the time). In this example, the system 500 may analyze a log of communications and identify a sender whose communications the user frequently ignores. The system 500 may determine a count of total communications received from the sender, determine a count of communications received from the sender and detected as being ignored by the user, and computing a percentage of ignored communications by dividing the count of ignored communications by the count of total communications. The system 500 then may compare the percentage of ignored communications to one or more thresholds to determine whether the user ignores a relatively high percentage of communications received from the sender. The threshold may be a predetermined threshold set by the system 500 or may be a user-defined threshold set by the user.

In some implementations, the system 500 maintains a running count of total communications received from particular senders and a running count of ignored communications received from particular senders. In these implementations, the running counts may be used to compute the percentage of ignored communications, instead of analyzing a communication log.

The system 500 identifies a type of frequently ignored communications (1630). For example, the system 500 analyzes tracked data related to intentionally ignored communications and identifies a type of communication that the particular user typically ignores (e.g., ignores more than a threshold percentage of the time). In this example, the system 500 may analyze a log of communications and identify a type of communication that the user frequently ignores. The system 500 may determine a count of total received communications of a particular type, determine a count of communications of the particular type and detected as being ignored by the user, and computing a percentage of ignored communications of the particular type by dividing the count of ignored communications by the count of total communications. The system 500 then may compare the percentage of ignored communications to one or more thresholds to determine whether the user ignores a relatively high percentage of communications of the particular type. The threshold may be a predetermined threshold set by the system 500 or may be a user-defined threshold set by the user.

In some implementations, the system 500 maintains a running count of total communications of the particular type and a running count of ignored communications of the particular type. In these implementations, the running counts may be used to compute the percentage of ignored communications of the particular type, instead of analyzing a communication log.

The type of communication may refer to any type of communication a system can track. For instance, the type of communication may be communications received from a sender that is not listed on a user's contact list, communications from senders that are on the user's contact list, or communications from senders arranged in specific groups in the user's contact list. The type of communication may be communications where the sender address (e.g., phone number) is private or undisclosed. The type of communication also may be communications from specific types of addresses (e.g., specific area codes or specific ISP addresses). The type of communication further may refer to the communication medium through which the communication is sent (e.g., text (SMS) messages, electronic mail messages, telephone calls, instant messages, etc.). In addition, the type of communication may be communications that are labeled as urgent or non-urgent, communications that are designated as high priority, communications that are reply communications or forwarded communications, and communications of a particular size. The system 500 may track communications of multiple types and may use any combination of the types of communications referred to throughout this disclosure.

The system 500 identifies a time period in which the user frequently ignores communications (1640). For example, the system 500 analyzes tracked data related to intentionally ignored communications and identifies a time period during which the particular user typically ignores communications (e.g., ignores more than a threshold percentage of communications). In this example, the system 500 may analyze a log of communications and identify a time period during which the particular user typically ignores communications. The system 500 may determine a count of total communications received during the time period, determine a count of communications received during the time period and detected as being ignored by the user, and computing a percentage of ignored communications by dividing the count of ignored communications by the count of total communications. The system 500 then may compare the percentage of ignored communications to one or more thresholds to determine whether the user ignores a relatively high percentage of communications received during the time period. The threshold may be a predetermined threshold set by the system 500 or may be a user-defined threshold set by the user.

In some implementations, the system 500 maintains a running count of total communications received during a time period and a running count of ignored communications received during the time period. In these implementations, the running counts may be used to compute the percentage of ignored communications received during the time period, instead of analyzing a communication log.

The time period may be a range of hours or minutes within a day, a particular day of a week, a range of days of the week (e.g., work week vs. weekend), a month or months (e.g., a season) within the year, or any other type of temporal time period. The time period also may have multiple temporal designations, such as a range of hours in a particular day of the week.

The system 500 performs one or more operations related to device settings based on the identified source, the identified type, and/or the identified time period (1650). For instance, the system 500 may automatically adjust or suggest an adjustment to device settings to account for a relatively high number of ignored communications from the identified source, of the identified type, and/or within the identified time period. The adjustment to device settings may be an adjustment to block future communications or automatically ignore future communications received from the identified source, of the identified type, and/or received during the identified time period. The system 500 may use the interfaces displayed in FIG. 17 in performing the operation related to device settings.

In some implementations, the system 500 may wait until a threshold number of communications have been received from a particular source, of a particular type, or during a particular period of time prior to performing an operation related to device settings for the particular source, the particular type, or the particular period of time. In these implementations, the system 500 may wait until a sufficient amount of information is available to accurately assess how a user handles communications from the particular source, of the particular type, or during the particular period of time. For instance, the system 500 may wait until ten or more communications are received to enable the system to detect a pattern of ignoring communications, rather than merely detecting a single instance where a communication was or was not ignored.

Figure 17:
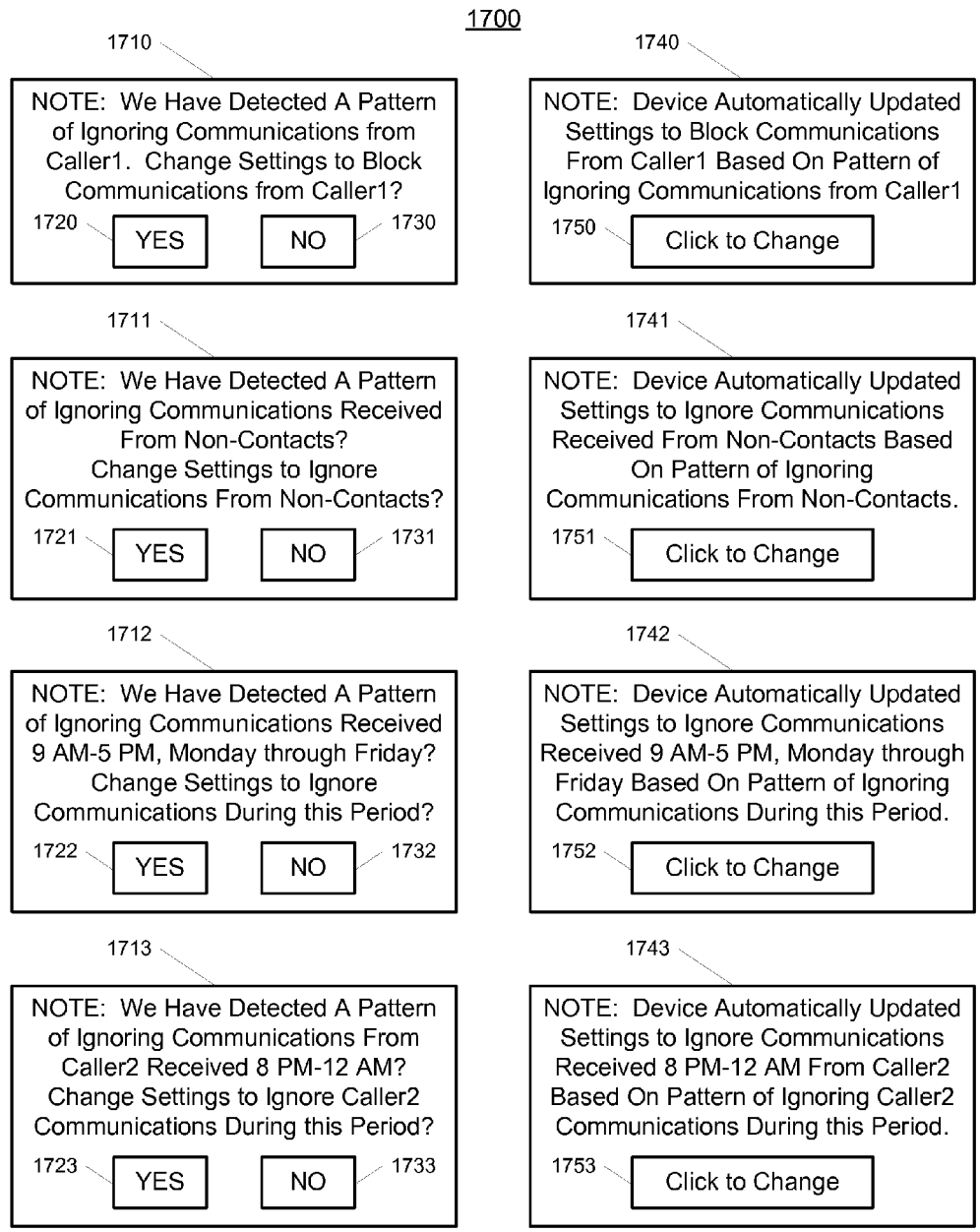
FIGS. 17, 19, 21, 23, and 24 illustrate examples of user interfaces.

FIG. 17 illustrates example user interfaces 1700 that may be displayed in performing an operation related to device settings based on tracking of electronic communications determined to be intentionally ignored. For example, the interface 1710 displays a suggestion to change device settings based on a determination that a user frequently ignores communications from Caller1. In this example, the interface 1710 is displayed when the system 500 determines that the user ignores communications from Caller1 more than a threshold percentage of the time (e.g., ignores communications from Caller 1 more than seventy percent of the time). The suggested change to device settings included in the interface 1710 suggests blocking future communications from Caller 1 (e.g., discarding communications from Caller 1) so that the user is no longer burdened by communications from Caller1, which the user typically ignores in any event. The interface 1710 includes a "Yes" input control button 1720 and a "No" input control button 1730. The "Yes" input control button 1720 enables the user to accept the suggested change and the "No" input control button 1730 enables the user to decline the suggested change.

The interface 1740 displays an indication of an automatic change to device settings made by the system 500. In some implementations, the interface 1740 is displayed when the system 500 automatically updates device settings based on a determination that the user ignores communications from Caller 1 more than a threshold percentage of the time (e.g., ignores communications from Caller1 more than ninety percent of the time). The automatic change to device settings identified in the interface 1740 includes a change to block communications received from Caller1 based on a pattern of ignoring communications from Caller1. The interface 1740 includes a "Click to Change" input control button 1750 that allows a user to change the settings automatically set by the system 500.

The interface 1711 displays a suggestion to change device settings based on a determination that a user frequently ignores communications from senders that are not included in a contact list of the user (e.g., non-contacts). The non-contacts may include solicitors that are not known by the user or incorrectly addressed communications (e.g., wrong phone number telephone calls). In this example, the interface 1711 is displayed when the system 500 determines that the user ignores communications from non-contacts more than a threshold percentage of the time (e.g., ignores communications from non-contacts more than seventy percent of the time). The suggested change to device settings included in the interface 1711 suggests automatically ignoring future communications from non-contacts so that the user is no longer burdened by communications from non-contacts, which the user typically ignores in any event. Automatically ignoring communications may include determining not to provide an alert or ring to indicate receipt of communications from non-contacts and handling the communications using any of the techniques for handling ignored communications described throughout this disclosure (e.g., not providing a missed communication alert, but listing the communication in an ignored communication list). The interface 1711 includes a "Yes" input control button 1721 and a "No" input control button 1731. The "Yes" input control button 1721 enables the user to accept the suggested change and the "No" input control button 1731 enables the user to decline the suggested change.

The interface 1741 displays an indication of an automatic change to device settings made by the system 500. In some implementations, the interface 1741 is displayed when the system 500 automatically updates device settings based on a determination that the user ignores communications from non-contacts more than a threshold percentage of the time (e.g., ignores communications from non-contacts more than ninety percent of the time). The automatic change to device settings identified in the interface 1741 includes a change to automatically ignore communications received from non-contacts based on a pattern of ignoring communications from non-contacts. The interface 1741 includes a "Click to Change" input control button 1751 that allows a user to change the settings automatically set by the system 500.

The interface 1712 displays a suggestion to change device settings based on a determination that a user frequently ignores communications received during a particular period of time. In this example, the interface 1712 is displayed when the system 500 determines that the user ignores communications received during the particular period of time more than a threshold percentage of the time (e.g., ignores communications received during the particular period of time more than seventy percent of the time). The suggested change to device settings included in the interface 1712 suggests automatically ignoring future communications received during the particular period of time so that the user is no longer burdened by communications received during the particular period of time, which the user typically ignores in any event. Automatically ignoring communications may include determining not to provide an alert or ring to indicate receipt of communications received during the particular period of time and handling the communications using any of the techniques for handling ignored communications described throughout this disclosure (e.g., not providing a missed communication alert, but listing the communication in an ignored communication list). In some examples, the system 500 may display a list of communications ignored during the particular period of time when the particular period of time ends. The list may assist the user in handling important communications that were automatically ignored. The interface 1712 includes a "Yes" input control button 1722 and a "No" input control button 1732. The "Yes" input control button 1722 enables the user to accept the suggested change and the "No" input control button 1732 enables the user to decline the suggested change.

The interface 1742 displays an indication of an automatic change to device settings made by the system 500. In some implementations, the interface 1742 is displayed when the system 500 automatically updates device settings based on a determination that the user ignores communications received during a particular period of time more than a threshold percentage of the time (e.g., ignores communications received during the particular period of time more than ninety percent of the time). The automatic change to device settings identified in the interface 1742 includes a change to automatically ignore communications received during the particular period of time based on a pattern of ignoring communications received during the particular period of time. The interface 1742 includes a "Click to Change" input control button 1752 that allows a user to change the settings automatically set by the system 500.

The interface 1713 displays a suggestion to change device settings based on a determination that a user frequently ignores communications received from a particular sender during a particular period of time. In this example, the interface 1713 is displayed when the system 500 determines that the user ignores communications received from the particular sender during the particular period of time more than a threshold percentage of the time (e.g., ignores communications received during the particular period of time more than seventy percent of the time). The suggested change to device settings included in the interface 1713 suggests automatically ignoring future communications received from the particular sender during the particular period of time so that the user is no longer burdened by communications received from the particular sender during the particular period of time, which the user typically ignores in any event. Automatically ignoring communications may include determining not to provide an alert or ring to indicate receipt of communications received from the particular sender during the particular period of time and handling the communications using any of the techniques for handling ignored communications described throughout this disclosure (e.g., not providing a missed communication alert, but listing the communication in an ignored communication list). In some examples, the system 500 may display a list of communications from the particular sender and ignored during the particular period of time when the particular period of time ends. The list may assist the user in responding to the particular sender when it is convenient for the user. The interface 1713 includes a "Yes" input control button 1723 and a "No" input control button 1733. The "Yes" input control button 1723 enables the user to accept the suggested change and the "No" input control button 1733 enables the user to decline the suggested change.

The interface 1743 displays an indication of an automatic change to device settings made by the system 500. In some implementations, the interface 1743 is displayed when the system 500 automatically updates device settings based on a determination that the user ignores communications received from a particular sender during a particular period of time more than a threshold percentage of the time (e.g., ignores communications received from the particular sender during the particular period of time more than ninety percent of the time). The automatic change to device settings identified in the interface 1743 includes a change to automatically ignore communications received from the particular sender during the particular period of time based on a pattern of ignoring communications received from the particular sender during the particular period of time. The interface 1743 includes a "Click to Change" input control button 1753 that allows a user to change the settings automatically set by the system 500.

Figure 18:
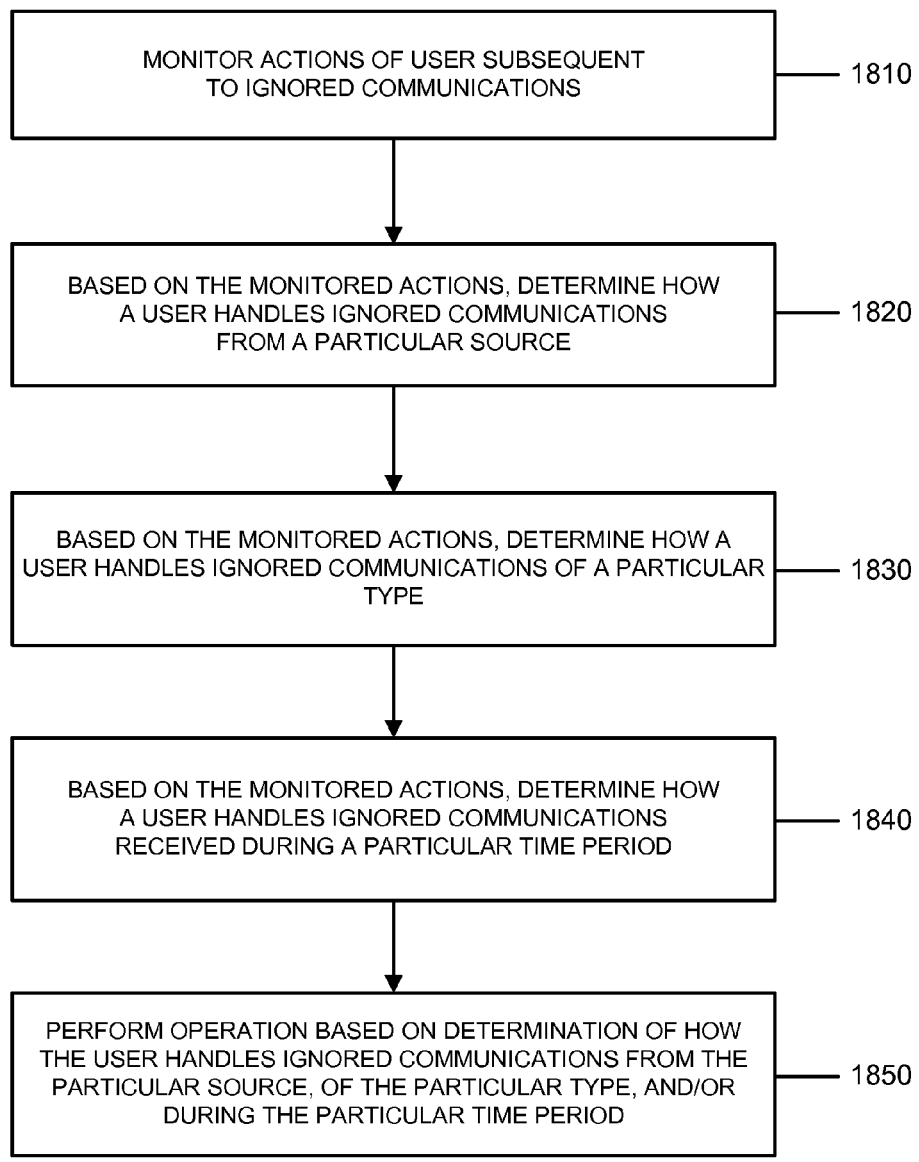

FIG. 18 illustrates an example of a process 1800 for performing an operation based on a determination of how a user handles ignored communications. The system 500 monitors actions of a user subsequent to ignored communications (1810). For instance, the system 500 may track whether or not the user returns an ignored communication. The system 500 also may track whether a user stores an ignored communication or deletes the ignored communication. The system 500 may store the monitored actions in a log of how a user handles a communication subsequent to ignoring the communication.

Based on the monitored actions, the system 500 determines how a user handles ignored communications from a particular source (1820). For example, the system 500 analyzes tracked data related to monitored actions related to ignored communications and determines whether the user typically returns ignored communications from the particular source (e.g., returns ignored communications more than a threshold percentage of the time). In this example, the system 500 may analyze a log of monitored actions and identify a sender whose ignored communications the user frequently returns.

The system 500 may determine a count of total ignored communications received from the sender, determine a count of ignored communications received from the sender to which the user responded, and compute a percentage of ignored communications that the user returns. The system 500 then may compare the percentage of ignored communications that the user returns to one or more thresholds to determine whether the user returns a relatively high percentage of ignored communications received from the sender. The threshold may be a predetermined threshold set by the system 500 or may be a user-defined threshold set by the user.

In some implementations, the system 500 maintains a running count of total ignored communications received from particular senders and a running count of ignored communications received from particular senders to which the user responded. In these implementations, the running counts may be used to compute the percentage of ignored communications that the user returns, instead of analyzing a communication log.

The system 500 also may determine percentages of ignored communications that the user deletes and ignored communications that the user stores (e.g., in a folder) or indexes. These percentages also may be used in determining whether to perform an operation and, if so, which operation to perform.

Based on the monitored actions, the system 500 determines how a user handles ignored communications of a particular type (1830). For example, the system 500 analyzes tracked data related to monitored actions related to ignored communications and determines whether the user typically returns ignored communications of a particular type (e.g., returns ignored communications more than a threshold percentage of the time). In this example, the system 500 may analyze a log of monitored actions and identify ignored communications of a particular type that the user frequently returns. The system 500 may determine a count of total ignored communications of the particular type, determine a count of ignored communications of the particular type to which the user responded, and compute a percentage of ignored communications that the user returns. The system 500 then may compare the percentage of ignored communications that the user returns to one or more thresholds to determine whether the user returns a relatively high percentage of ignored communications of the particular type. The threshold may be a predetermined threshold set by the system 500 or may be a user-defined threshold set by the user.

In some implementations, the system 500 maintains a running count of total ignored communications of the particular type and a running count of ignored communications of the particular type to which the user responded. In these implementations, the running counts may be used to compute the percentage of ignored communications that the user returns, instead of analyzing a communication log.

The system 500 also may determine percentages of ignored communications that the user deletes and ignored communications that the user stores (e.g., in a folder) or indexes. These percentages also may be used in determining whether to perform an operation and, if so, which operation to perform.

Based on the monitored actions, the system 500 determines how a user handles ignored communications received during a particular time period (1840). For example, the system 500 analyzes tracked data related to monitored actions related to ignored communications and determines whether the user typically returns ignored communications received during the particular time period (e.g., returns ignored communications more than a threshold percentage of the time). In this example, the system 500 may analyze a log of monitored actions and identify a time period for which the user frequently returns communications ignored during the time period. The system 500 may determine a count of total ignored communications received during the time period, determine a count of ignored communications received during the time period to which the user responded, and compute a percentage of ignored communications that the user returns. The system 500 then may compare the percentage of ignored communications that the user returns to one or more thresholds to determine whether the user returns a relatively high percentage of ignored communications received during the particular time period. The threshold may be a predetermined threshold set by the system 500 or may be a user-defined threshold set by the user.

In some implementations, the system 500 maintains a running count of total ignored communications received during the time period and a running count of ignored communications received during the time period to which the user responded. In these implementations, the running counts may be used to compute the percentage of ignored communications that the user returns, instead of analyzing a communication log.

The system 500 also may determine percentages of ignored communications that the user deletes and ignored communications that the user stores (e.g., in a folder) or indexes. These percentages also may be used in determining whether to perform an operation and, if so, which operation to perform.

The system 500 performs an operation based on the determination of how the user handles ignored communications from the particular source, of the particular type, and/or during the particular time period (1850). For instance, the system 500 may automatically adjust or suggest an adjustment to device settings to account for relatively high or low percentage of ignored communications for the particular source, the particular type, and/or the particular time period to which the user responded. The adjustment to device settings may be an adjustment to block future communications or automatically ignore future communications received from the particular source, of the particular type, and/or received during the particular time period. The system 500 may use the interfaces displayed in FIG. 19 in performing the operation.

In some implementations, the system 500 may wait until a threshold number of ignored communications have been received from a particular source, of a particular type, or during a particular period of time prior to performing an operation for the particular source, the particular type, or the particular period of time. In these implementations, the system 500 may wait until a sufficient amount of information is available to accurately assess how a user handles ignored communications from the particular source, of the particular type, or during the particular period of time. For instance, the system 500 may wait until ten or more ignored communications are received to enable the system to detect a pattern of handling ignored communications, rather than merely detecting a single instance of handling an ignored communication.

Figure 19:
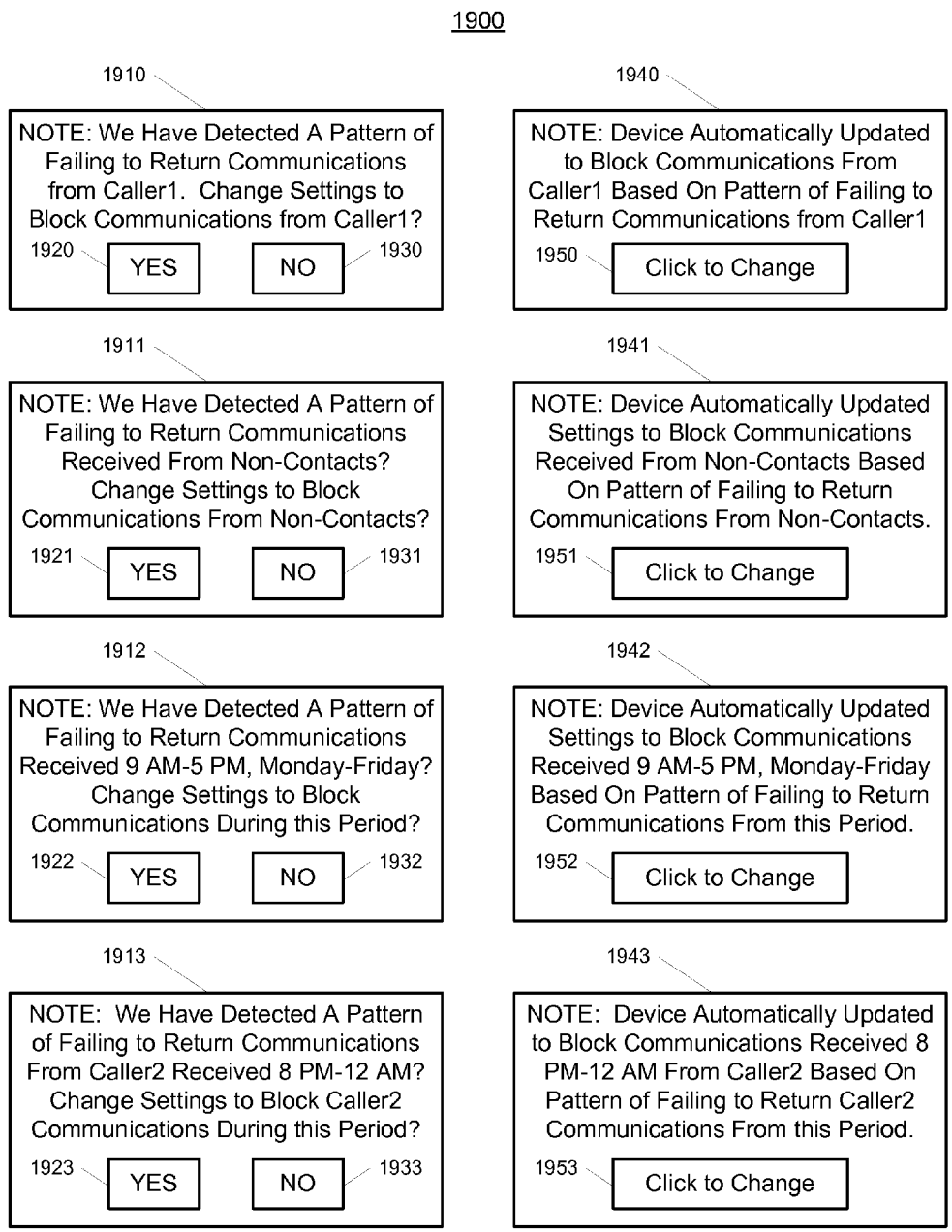

FIG. 19 illustrates example user interfaces 1900 that may be displayed in performing an operation related to device settings based on monitoring actions of a user subsequent to ignoring a communication. For example, the interface 1910 displays a suggestion to change device settings based on a determination that a user frequently fails to return ignored communications received from Caller1. In this example, the interface 1910 is displayed when the system 500 determines that the user fails to return ignored communications received from Caller1 more than a threshold percentage of the time (e.g., fails to return ignored communications received from Caller 1 more than seventy percent of the time). The suggested change to device settings included in the interface 1910 suggests blocking future communications from Caller 1 (e.g., discarding communications from Caller 1) so that the user is no longer burdened by communications from Caller1. The interface 1910 includes a "Yes" input control button 1920 and a "No" input control button 1930. The "Yes" input control button 1920 enables the user to accept the suggested change and the "No" input control button 1930 enables the user to decline the suggested change.

The interface 1940 displays an indication of an automatic change to device settings made by the system 500. In some implementations, the interface 1940 is displayed when the system 500 automatically updates device settings based on a determination that the user fails to return ignored communications received from Caller 1 more than a threshold percentage of the time (e.g., fails to return ignored communications received from Caller 1 more than ninety percent of the time). The automatic change to device settings identified in the interface 1940 includes a change to block communications received from Caller 1 based on a pattern of failing to return ignored communications received from Caller1. The interface 1940 includes a "Click to Change" input control button 1950 that allows a user to change the settings automatically set by the system 500.

The interface 1911 displays a suggestion to change device settings based on a determination that a user frequently fails to return ignored communications received from non-contacts. In this example, the interface 1911 is displayed when the system 500 determines that the user fails to return ignored communications received from non-contacts more than a threshold percentage of the time (e.g., fails to return ignored communications received from non-contacts more than seventy percent of the time). The suggested change to device settings included in the interface 1911 suggests blocking future communications from non-contacts (e.g., discarding communications from non-contacts) so that the user is no longer burdened by communications from non-contacts. The interface 1911 includes a "Yes" input control button 1921 and a "No" input control button 1931. The "Yes" input control button 1921 enables the user to accept the suggested change and the "No" input control button 1931 enables the user to decline the suggested change.

The interface 1941 displays an indication of an automatic change to device settings made by the system 500. In some implementations, the interface 1941 is displayed when the system 500 automatically updates device settings based on a determination that the user fails to return ignored communications received from non-contacts more than a threshold percentage of the time (e.g., fails to return ignored communications received from non-contacts more than ninety percent of the time). The automatic change to device settings identified in the interface 1941 includes a change to block communications received from non-contacts based on a pattern of failing to return ignored communications received from non-contacts. The interface 1941 includes a "Click to Change" input control button 1951 that allows a user to change the settings automatically set by the system 500.

The interface 1912 displays a suggestion to change device settings based on a determination that a user frequently fails to return ignored communications received during a particular period of time. In this example, the interface 1912 is displayed when the system 500 determines that the user fails to return ignored communications received during the particular period of time more than a threshold percentage of the time (e.g., fails to return ignored communications received during the particular period of time more than seventy percent of the time). The suggested change to device settings included in the interface 1912 suggests blocking future communications received during the particular period of time (e.g., discarding all communications received during the particular period of time) so that the user is no longer burdened by communications received during the particular period of time. The interface 1912 includes a "Yes" input control button 1922 and a "No" input control button 1932. The "Yes" input control button 1922 enables the user to accept the suggested change and the "No" input control button 1932 enables the user to decline the suggested change.

The interface 1942 displays an indication of an automatic change to device settings made by the system 500. In some implementations, the interface 1942 is displayed when the system 500 automatically updates device settings based on a determination that the user fails to return ignored communications received during the particular period of time more than a threshold percentage of the time (e.g., fails to return ignored communications received during the particular period of time more than ninety percent of the time). The automatic change to device settings identified in the interface 1942 includes a change to block communications received during the particular period of time based on a pattern of failing to return ignored communications received during the particular period of time. The interface 1942 includes a "Click to Change" input control button 1952 that allows a user to change the settings automatically set by the system 500.

The interface 1913 displays a suggestion to change device settings based on a determination that a user frequently fails to return ignored communications received from a particular user during a particular period of time. In this example, the interface 1913 is displayed when the system 500 determines that the user fails to return ignored communications received from the particular user during the particular period of time more than a threshold percentage of the time (e.g., fails to return ignored communications received from the particular user during the particular period of time more than seventy percent of the time). The suggested change to device settings included in the interface 1913 suggests blocking future communications received from the particular user during the particular period of time (e.g., discarding communications from the particular user only during the particular period of time) so that the user is no longer burdened by communications received from the particular user during the particular period of time. The interface 1913 includes a "Yes" input control button 1923 and a "No" input control button 1933. The "Yes" input control button 1923 enables the user to accept the suggested change and the "No" input control button 1933 enables the user to decline the suggested change.

The interface 1943 displays an indication of an automatic change to device settings made by the system 500. In some implementations, the interface 1943 is displayed when the system 500 automatically updates device settings based on a determination that the user fails to return ignored communications received from the particular user during the particular period of time more than a threshold percentage of the time (e.g., fails to return ignored communications received from the particular user during the particular period of time more than ninety percent of the time). The automatic change to device settings identified in the interface 1943 includes a change to block communications received from the particular user during the particular period of time based on a pattern of failing to return ignored communications received from the particular user during the particular period of time. The interface 1943 includes a "Click to Change" input control button 1953 that allows a user to change the settings automatically set by the system 500.

Figure 20:
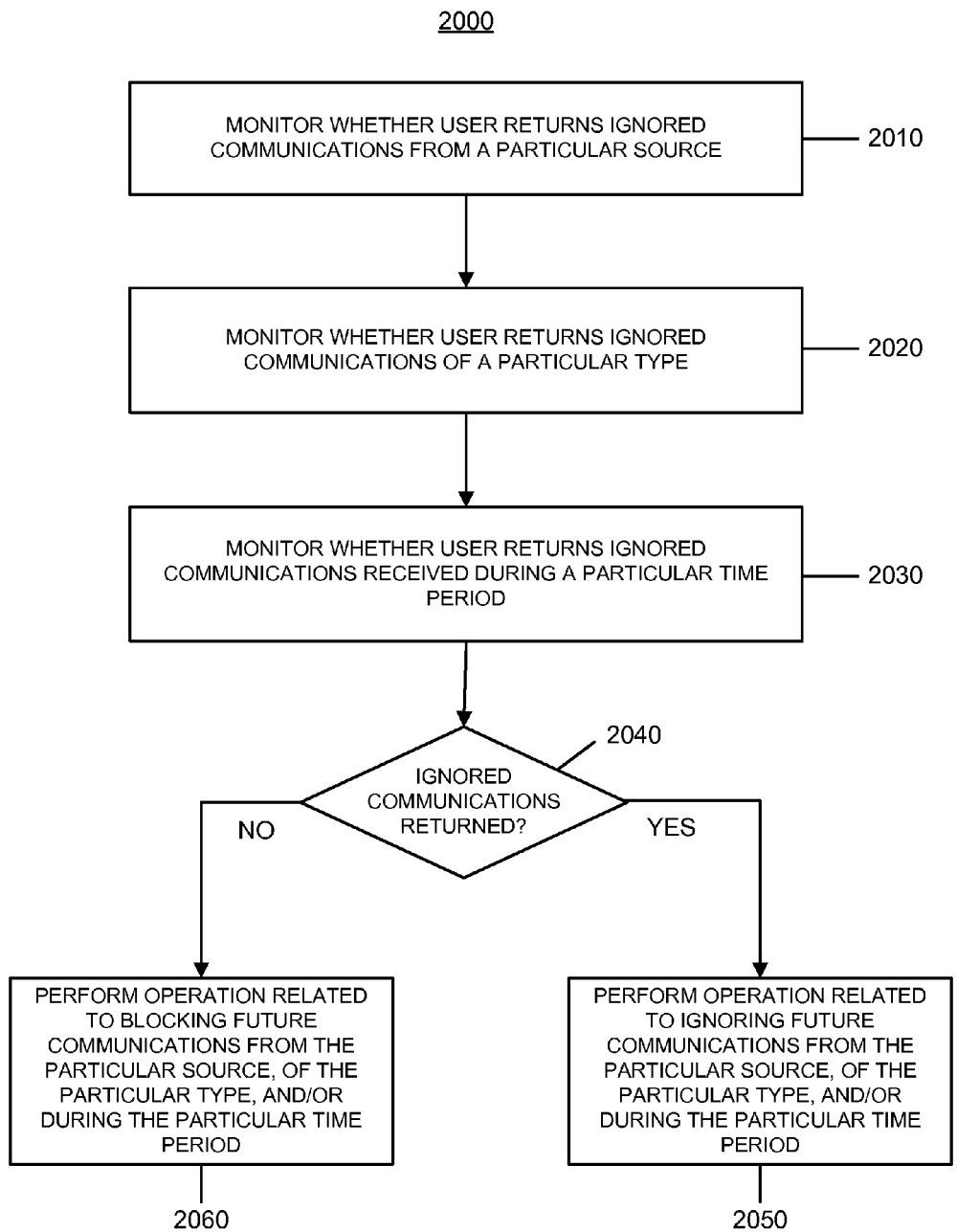

FIG. 20 illustrates an example of a process 2000 for performing an operation related to device settings based on whether a user returns ignored communications. The system 500 monitors whether a user returns ignored communications from a particular source (2010). For instance, the system 500 detects that the user ignored a communication from the particular source and determines whether or not the user responded to the communication. The system 500 tracks data indicating whether or not the user responded to the ignored communication based on the determination of whether or not the user responded to the communication.

The system 500 monitors whether the user returns ignored communications of a particular type (2020). For instance, the system 500 detects that the user ignored a communication of the particular type and determines whether or not the user responded to the communication. The system 500 tracks data indicating whether or not the user responded to the ignored communication based on the determination of whether or not the user responded to the communication.

The system 500 monitors whether the user returns ignored communications received during a particular time period (2030). For instance, the system 500 detects that the user ignored a communication received during the particular time period and determines whether or not the user responded to the communication. The system 500 tracks data indicating whether or not the user responded to the ignored communication based on the determination of whether or not the user responded to the communication.

The system 500 determines whether the user returns ignored communications from the particular source, of the particular type, and/or during the particular time period (2040). For example, the system 500 determines whether or not the user typically responds to ignored communications from the particular source, of the particular type, and/or during the particular time period. In this example, the system 500 may compute a percentage of ignored communications from the particular source, of the particular type, and/or during the particular time period to which the responds. The system 500 may compare the computed percentage to a threshold value to determine whether or not the user frequently responds to ignored communications from the particular source, of the particular type, and/or during the particular time period.

In response to a determination that the user frequently ignores, but returns ignored communications from the particular source, of the particular type, and/or during the particular time period, the system 500 performs an operation related to ignoring future communications from the particular source, of the particular type, and/or during the particular time period (2050). For instance, the system 500 automatically changes or suggests a change to device settings to automatically ignore future communications from the particular source, of the particular type, and/or during the particular time period when the system 500 determines that the user frequently responds to ignored communications from the particular source, of the particular type, and/or during the particular time period. Ignoring communications may include determining not to provide an alert to indicate receipt of the communication, but handling the communication using any of the techniques for handling ignored communications described throughout this disclosure (e.g., listing the communication in an ignored communication list).

In response to a determination that the user frequently ignores and does not return ignored communications from the particular source, of the particular type, and/or during the particular time period, the system 500 performs an operation related to blocking future communications from the particular source, of the particular type, and/or during the particular time period (2060). For instance, the system 500 automatically changes or suggests a change to device settings to automatically block future communications from the particular source, of the particular type, and/or during the particular time period when the system 500 determines that the user does not frequently respond to ignored communications from the particular source, of the particular type, and/or during the particular time period. Blocking communications may include discarding communications such that the user is not made aware of the communications in any way.

Figure 21:
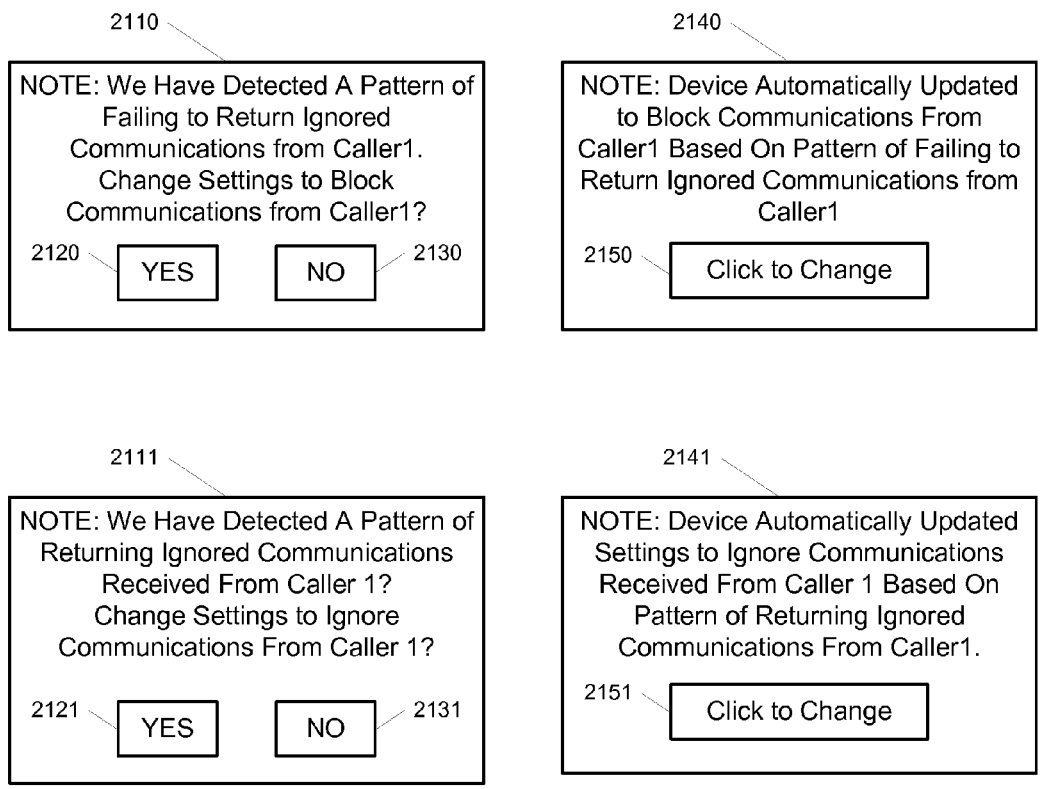

FIG. 21 illustrates example user interfaces 2100 that may be displayed in performing an operation related to device settings based on whether or not a user returns ignored communications. For example, the interface 2110 displays a suggestion to change device settings based on a determination that a user frequently fails to return ignored communications received from Caller 1. In this example, the interface 2110 is displayed when the system 500 determines that the user fails to return ignored communications received from Caller 1 more than a threshold percentage of the time (e.g., fails to return ignored communications received from Caller1 more than seventy percent of the time). The suggested change to device settings included in the interface 2110 suggests blocking future communications from Caller 1 (e.g., discarding communications from Caller 1) so that the user is no longer burdened by communications from Caller1. The interface 2110 includes a "Yes" input control button 2120 and a "No" input control button 2130. The "Yes" input control button 2120 enables the user to accept the suggested change and the "No" input control button 2130 enables the user to decline the suggested change.

The interface 2140 displays an indication of an automatic change to device settings made by the system 500. In some implementations, the interface 2140 is displayed when the system 500 automatically updates device settings based on a determination that the user fails to return ignored communications received from Caller1 more than a threshold percentage of the time (e.g., fails to return ignored communications received from Caller 1 more than ninety percent of the time). The automatic change to device settings identified in the interface 2140 includes a change to block communications received from Caller 1 based on a pattern of failing to return ignored communications received from Caller1. The interface 2140 includes a "Click to Change" input control button 2150 that allows a user to change the settings automatically set by the system 500.

The interface 2111 displays a suggestion to change device settings based on a determination that a user frequently returns ignored communications received from Caller 1. In this example, the interface 2111 is displayed when the system 500 determines that the user typically ignores communications received from Caller1, but returns ignored communications received from Caller 1 more than a threshold percentage of the time (e.g., returns ignored communications received from Caller1 more than fifty percent of the time). The suggested change to device settings included in the interface 2111 suggests ignoring future communications from Caller1. The interface 2111 includes a "Yes" input control button 2121 and a "No" input control button 2131. The "Yes" input control button 2121 enables the user to accept the suggested change and the "No" input control button 2131 enables the user to decline the suggested change.

The interface 2141 displays an indication of an automatic change to device settings made by the system 500. In some implementations, the interface 2141 is displayed when the system 500 automatically updates device settings based on a determination that the user typically ignores communications received from Caller1, but returns ignored communications received from Caller1 more than a threshold percentage of the time (e.g., returns ignored communications received from Caller1 more than ninety percent of the time). The automatic change to device settings identified in the interface 2141 includes a change to ignore communications received from Caller 1 based on a pattern of ignoring, but returning communications received from Caller 1. The interface 2141 includes a "Click to Change" input control button 2151 that allows a user to change the settings automatically set by the system 500.

Figure 22:
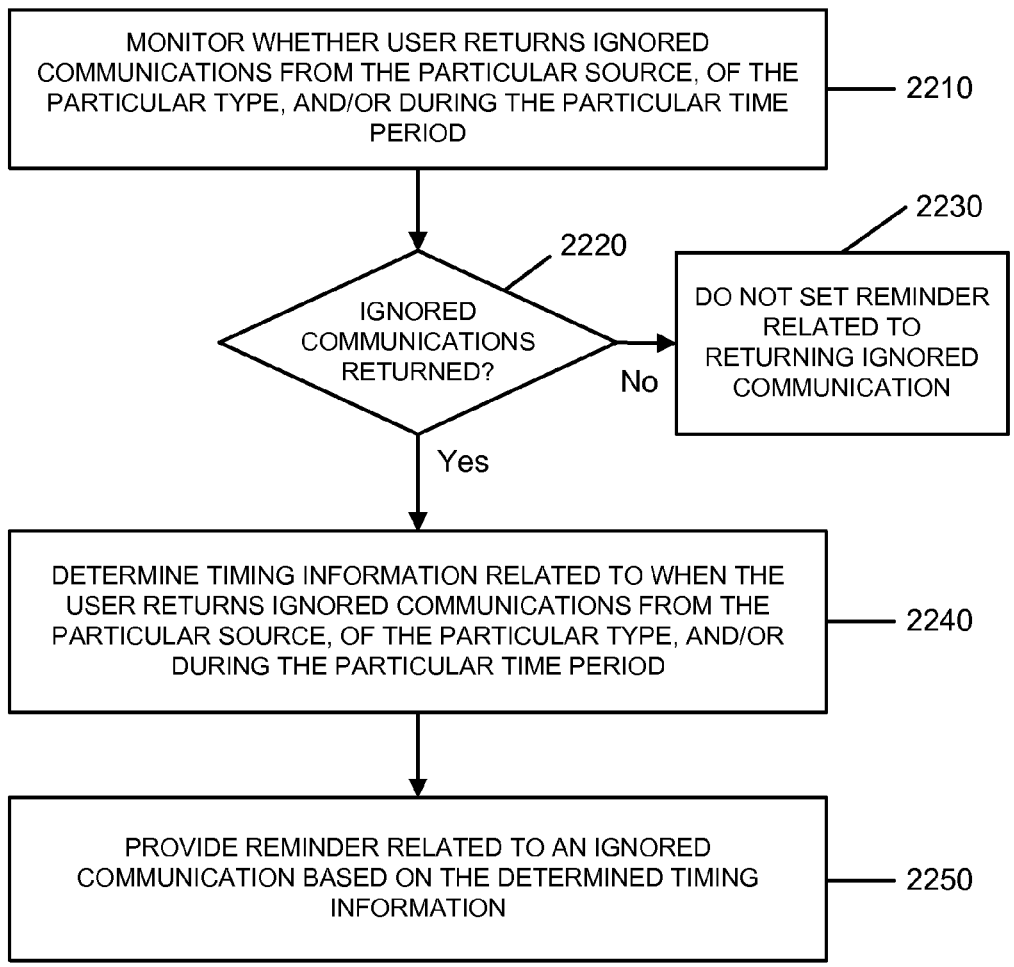

FIG. 22 illustrates an example of a process 2200 for providing a reminder related to ignored communications. The system 500 monitors whether a user returns ignored communications from a particular source, of a particular type, and/or during a particular time period (2210). For example, the system 500 detects user responses to ignored communications and, when the system 500 detects a response to an ignored communication, the system 500 identifies the communication to which the user has responded. In this example, after the system 500 identifies the communication to which the user has responded, the system 500 tracks and stores, in electronic storage, data indicating parameters of the response. For instance, the system 500 may store identifying information for the communication in association with an indication that the user has responded to the communication. In addition, the system 500 may determine and store more detailed information related to the response, such as date/time of the response, how long the user took to respond to the communication, etc. The system 500 may maintain a response log that tracks data for detected user responses to ignored communications. The system 500 also may update the communication logs discussed above to include data indicative of the response. Table 1 below shows an example communication log entry:

TABLE 1

| Message Identifier | Receipt Time | Sender | Medium | Priority | Other Types | Response | Response Time |
|---|---|---|---|---|---|---|---|
| ID Number | Date/Time of Receipt | Sender Identity | Email/IM/ text/SMS | High or Low | . . . | Yes/No | Date/Time of Response |

The system 500 determines whether the user returns ignored communications from the particular source, of the particular type, and/or during the particular time period (2220). For example, the system 500 may determine a total number of communications from the particular source, of the particular type, and/or during the particular time period that the user has ignored and a number of communications from the particular source, of the particular type, and/or during the particular time period to which the user has responded. In this example, the system 500 may divide the number of communications from the particular source, of the particular type, and/or during the particular time period to which the user has responded by the total number of communications of the particular type that the user has ignored and compute a percentage of communications of the particular type to which the user has responded (e.g., a response rate).

In some examples, the system 500 accesses a rate threshold (e.g., 50%, 80%, etc.) from electronic storage and compares the identified or determined response rate data to the rate threshold. The system 500 may access a general rate threshold that applies to all communications or may access a specific rate threshold that applies to only communications from the particular source, of the particular type, or received during the particular time period. The rate threshold may be defined based on user input.

In some implementations, the system 500 may define the rate threshold by tracking the user's reaction to set reminders in the past. In these implementations, the system 500 may determine whether the user cancelled a reminder or whether the user responded to a communication based on the reminder. The system 500 may track the circumstances and types of communications associated with reminders to which the user typically cancels and reminders to which the user typically responds. For instance, when the user typically responds (e.g., more than 50% of the time) to reminders associated with a particular type of communication, the system 500 may lower the response rate threshold associated with the particular type of communication.

The system 500 may determine whether to set a reminder for an ignored communication based on the comparison of the identified or determined response rate data to the rate threshold. For example, when the comparison reveals that the response rate exceeds the response rate threshold, the system 500 determines to set a reminder for the communication. When the comparison reveals that the response rate is less than the response rate threshold, the system 500 determines not to set a reminder for the communication.

In response to a determination that the user does not return ignored communications from the particular source, of the particular type, and/or during the particular time period, the system 500 does not set a reminder related to returning an ignored communication (2230). For instance, the system 500 does not store reminder data for the ignored communication and does not automatically provide a reminder for the ignored communication.

In response to a determination that the user does return ignored communications from the particular source, of the particular type, and/or during the particular time period, the system 500 determines timing information related to when the user returns ignored communications from the particular source, of the particular type, and/or during the particular time period (2240). For example, the system 500 analyzes tracked data for ignored communications and monitored responses to the ignored communications and identifies response patterns for particular communication sources, types, or time periods or combinations of the same. In this example, the system 500 may analyze data included in a communication log (e.g., as shown in Table 1) and/or a response log maintained by the system 500 over a period of time. The analyzed communication and/or response log includes comprehensive data related to past communications received and ignored by the user and how the user has responded to the past communications.

In some implementations, the system 500 determines a response pattern for a particular source, a particular type of communication, and/or a particular time period of communications received by the user in the past. In these implementations, the system 500 identifies and accesses data tracking receipt, for the user, of communications having the particular source, the particular type of communication, and/or the particular time period. The system 500 also identifies and accesses data tracking responses, by the user, to the ignored communications having the particular source, the particular type of communication, and/or the particular time period. Using the tracked receipt data and the tracked response data, the system 500 identifies patterns of the user's past response behavior for ignored communications having the particular source, the particular type of communication, and/or the particular time period.

In some examples, the system 500 determines response timing patterns of the user for communications received from the particular source, the particular type of communication, and/or the particular time period using the tracked receipt data and the tracked response data. For instance, the system 500 may identify each instance in the tracked response data where the user responded to a communication of the particular source, the particular type of communication, and/or the particular time period in the past. For each identified instance, the system 500 may, using the tracked receipt data and the tracked response data, determine a receipt time of the communication and a response time for the communication. Using the receipt time and the response time, the system 500 may compute a difference between the response time and the receipt time and, thereby, determine how long it took the user to respond to the ignored communication. After determining how long it took the user to respond to each of the ignored communications associated with the particular source, the particular type of communication, and/or the particular time period, the system 500 may determine an average response time of the user for communications having the particular source, the particular type of communication, and/or the particular time period by summing the determined differences and dividing the summation result by the total number of ignored communications having the particular source, the particular type of communication, and/or the particular time period to which the user responded.

In some implementations, the system 500 determines time of day/day of week/date response timing patterns of the user for communications of the particular source, the particular type of communication, and/or the particular time period using the tracked receipt data and the tracked response data. For instance, the system 500 may identify each instance in the tracked response data where the user responded to an ignored communication received from the particular source, the particular type of communication, and/or the particular time period in the past. For each identified instance, the system 500 may, using the tracked response data, determine a time of day and a day of the week when the user responded to the communication. Using the determined time of day and day of the week, the system 500 may identify time of day and day of week response patterns of the user for communications received from the particular source, the particular type of communication, and/or the particular time period in the past. For example, the system 500 may determine that 90% of the user's past responses to communications received from the particular source, the particular type of communication, and/or the particular time period in the past have occurred between the hours of 10 PM to 11 PM. In this example, the system 500 determines that the user typically responds to communications received from the particular source, the particular type of communication, and/or the particular time period in the past between the hours of 10 PM to 11 PM. In another example, the system 500 may determine that 42% of the user's past responses to communications of the particular type have occurred on Saturday and that 38% of the user's past responses to communications of the particular type have occurred on Sunday. In this example, system 500 determines that the user typically responds to communications of the particular type over the weekend (e.g., on Saturday or Sunday). Other types of time of day/day of week/date response timing patterns may be determined.

The system 500 may update the response pattern data periodically or each time the user responds to a new communication. In some examples, the system 500 keeps running totals of communication information (e.g., total number of received communications) and updates the response pattern data each time a new communication is received and/or each time a response communication is sent. For instance, the system 500 may maintain a running average response time for ignored communications having a particular type.

The system 500 provides a reminder related to an ignored communication based on the determined timing information (2250). In some implementations, the system 500 determines an anticipated or typical response time for the ignored communication based on the user's past response patterns. For example, the system 500 determines the anticipated or typical response time using an average response time (e.g., an average time between the user ignoring a communication to a time when the user responds to the communication) for past ignored communications to which the user has responded. In this example, the system 500 accesses or determines the average response time for past ignored communications based on the response pattern data. The system 500 then sets a response reminder time by determining a time of receipt or ignoring of the received communication, adding the average response time to the determined time of receipt or ignoring, and automatically setting the response reminder time as a result of adding the average response time to the determined time of receipt or ignoring.

In another example, the system 500 determines the anticipated or typical response time using a time of day and/or day of week pattern of past responses by the user to ignored communications. In this example, if the system 500 determines that the user typically responds to ignored communications between the hours of 10 PM to 11 PM on Monday through Thursday, the system 500 determines an anticipated or typical response time that corresponds to this response pattern. For instance, when the communication is received and ignored on a Wednesday at 2 PM, the system 500 may automatically set the response reminder time for Wednesday at 10 PM. When the communication is received and ignored on a Saturday at 10 AM, the system 500 may automatically set the response reminder time for Monday at 10 PM.

In some examples, the system 500 may set the response reminder before a determined anticipated or typical response time to provide a reminder to the user at a time when the user still has time to generate and send a response by the determined anticipated or typical response time. In these examples, the system 500 may automatically set the response reminder time for fifteen minutes or one hour prior to the determined anticipated or typical response time and periodically provide reminders to the user after the automatically set response reminder time.

Figure 23:
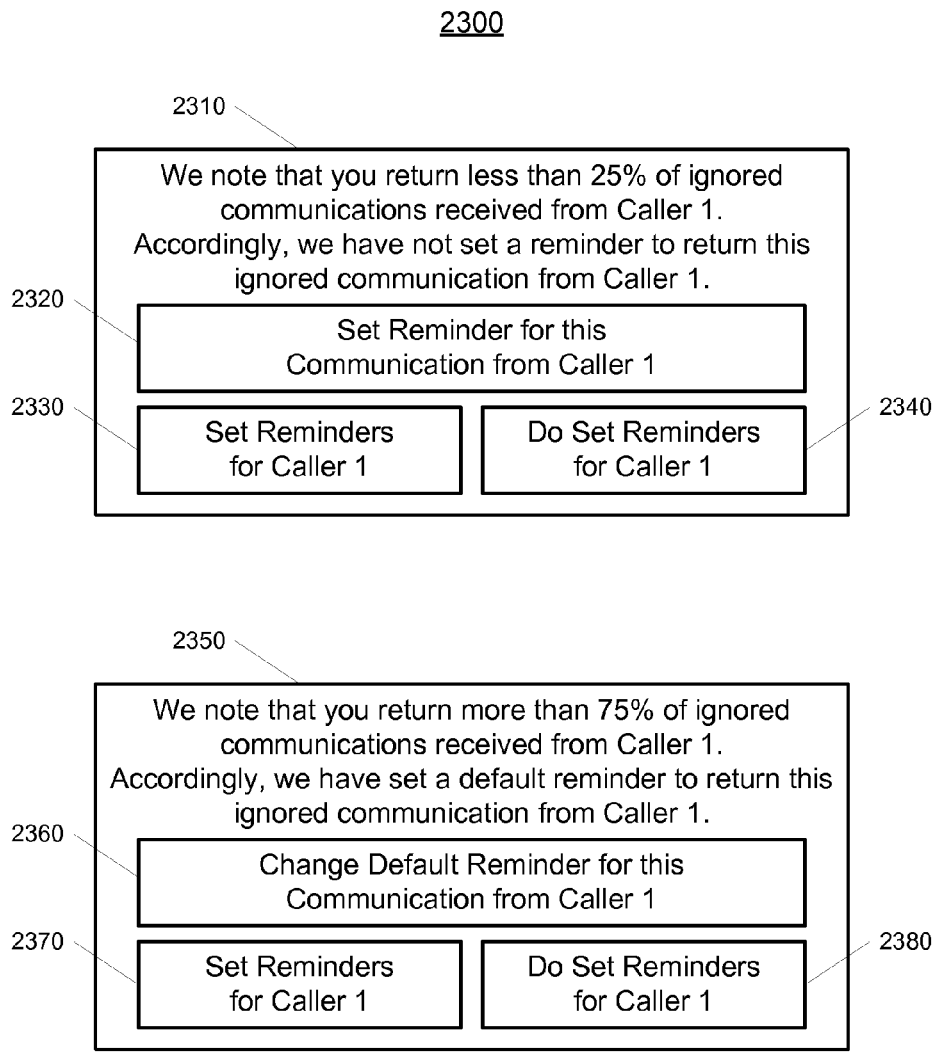

FIG. 23 illustrates example user interfaces 2300 that may be displayed in handling reminders for ignored communications. For instance, an interface 2310 displays an indication that a reminder has not been set for ignored communications received from Caller 1 because the user returns ignored communications received from Caller 1 on average less than a threshold percentage of the time (e.g., less than twenty-five percent of the time). In this example, the interface 2310 is displayed when the system 500 determines that the user returns ignored communications received from Caller 1 on average less than a threshold percentage of the time (e.g., the user returns ignored communications received from Caller1 on average less than twenty-five percent of the time). The interface 2310 includes a "Set Communication Reminder" input control button 2320, a "Set Reminders" input control button 2330, and a "Do Not Set Reminders" input control button 2340. The "Set Communication Reminder" input control button 2320 enables the user to set a reminder for this ignored communication from Caller1, the "Set Reminders" input control button 2330 enables the user to cause reminders to be set for future communications received from Caller1 even if the future communications are ignored, and the "Do Not Set Reminders" input control button 2340 enables the user to cause reminders not to be set for future communications received from Caller 1 regardless of whether the communications are ignored.

The interface 2350 displays an indication that a default reminder has been set for ignored communications received from Caller1 because the user returns ignored communications received from Caller 1 on average more than a threshold percentage of the time (e.g., more than seventy-five percent of the time). In this example, the interface 2350 is displayed when the system 500 determines that the user returns ignored communications received from Caller 1 on average more than a threshold percentage of the time (e.g., the user returns ignored communications received from Caller1 on average more than seventy-five percent of the time). The interface 2350 includes a "Change Default Reminder" input control button 2360, a "Set Reminders" input control button 2370, and a "Do Not Set Reminders" input control button 2380. The "Change Default Reminder" input control button 2360 enables the user to change the default reminder set for this ignored communication from Caller1. For instance, the "Change Default Reminder" input control button 2360 may enable the user to delete the default reminder set for this ignored communication from Caller1 or may enable the user to change a time when the reminder for this ignored communication from Caller1 is provided. The "Set Reminders" input control button 2370 enables the user to cause reminders to be set for future communications received from Caller1 even if the future communications are ignored and the "Do Not Set Reminders" input control button 2380 enables the user to cause reminders not to be set for future communications received from Caller1 regardless of whether the communications are ignored.

Figure 24:
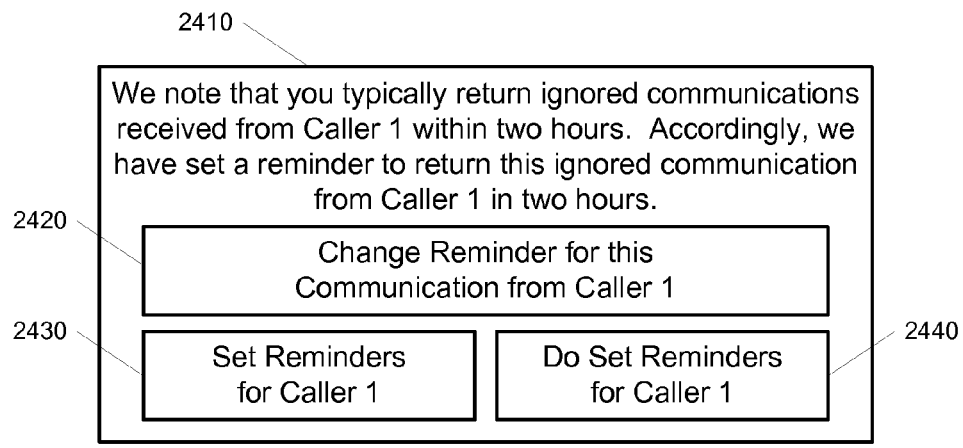

FIG. 24 illustrates example user interfaces 2400 that may be displayed in handling reminders for ignored communications. For instance, an interface 2410 displays an indication that a reminder has been set for a particular period of time from receipt of an ignored communication received from Caller1 because the user returns ignored communications received from Caller1 on average within the particular period of time from receipt (e.g., within two hours of receipt of an ignored communication). In this example, the interface 2410 is displayed when the system 500 determines that the user returns ignored communications received from Caller1 on average within the particular period of time from receipt (e.g., the user returns ignored communications received from Caller1 on average within two hours). The interface 2410 includes a "Change Reminder" input control button 2420, a "Set Reminders" input control button 2430, and a "Do Not Set Reminders" input control button 2440. The "Change Reminder" input control button 2420 enables the user to change the reminder set for this ignored communication from Caller1 (e.g., shorten or extend the time when the reminder is provided), the "Set Reminders" input control button 2430 enables the user to cause reminders to be set for future communications received from Caller1 even if the future communications are ignored, and the "Do Not Set Reminders" input control button 2440 enables the user to cause reminders not to be set for future communications received from Caller1 regardless of whether the communications are ignored.

The interface 2450 displays an indication that a reminder has been set for a particular period of time for an ignored communication received from Caller1 because the user returns ignored communications received from Caller1 on average during the particular period of time (e.g., the user typically returns ignored communications received from Caller 1 during the particular period of time regardless of when the communication was received). In this example, the interface 2450 is displayed when the system 500 determines that the user returns ignored communications received from Caller 1 on average during the particular period of time (e.g., the user typically returns ignored communications received from Caller1 between 8 PM to 10 PM). In some examples, the reminder for this ignored communication is provided on a recurring basis (e.g., every day at 8 PM) until the user returns the communication or cancels the reminder. The interface 2450 includes a "Change Reminder" input control button 2460, a "Set Reminders" input control button 2470, and a "Do Not Set Reminders" input control button 2480. The "Change Reminder" input control button 2460 enables the user to change the reminder set for this ignored communication from Caller 1. For instance, the "Change Reminder" input control button 2460 may enable the user to delete the reminder set for this ignored communication from Caller 1 or may enable the user to change a time when the reminder for this ignored communication from Caller1 is provided. The "Set Reminders" input control button 2470 enables the user to cause reminders to be set for future communications received from Caller1 even if the future communications are ignored and the "Do Not Set Reminders" input control button 2480 enables the user to cause reminders not to be set for future communications received from Caller 1 regardless of whether the communications are ignored.

Figure 25:
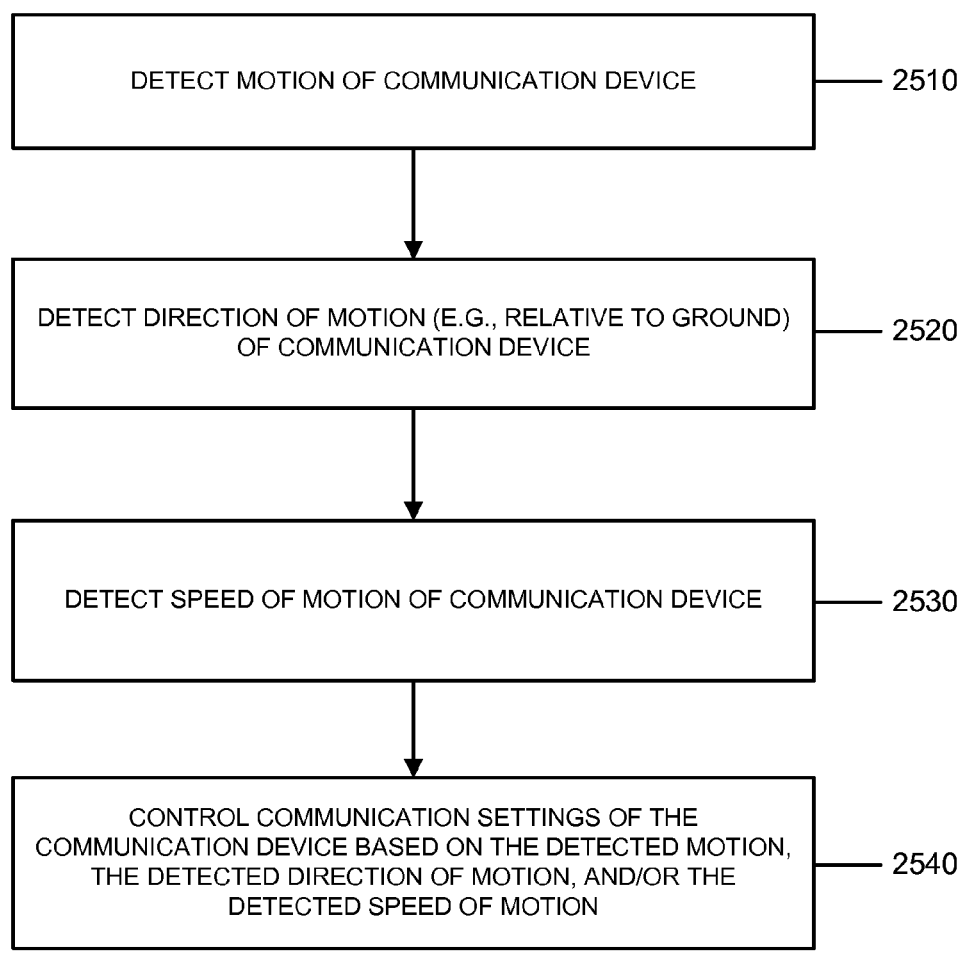

FIG. 25 illustrates an example of a process 2500 for controlling communication settings of a communication device based on motion. The system 500 detects motion of the communication device (2510). The system 500 may detect motion by measuring a change in speed or vector of an object or objects in a field of view. Detecting motion may be achieved either by mechanical devices that physically interact with the field or by electronic devices that quantify and measure changes in a given environment. In some examples, the system 500 may capture a series of images over time and determine whether the object capturing the images is moving using image analysis techniques, such as optical flow. The system 500 also may use accelerometer and/or position sensor data to detect motion.

The system 500 detects a direction of motion (e.g., relative to ground) of the communication device (2520). For instance, the system 500 analyzes the data that led to the detected motion and determines a direction of the motion. The direction may be an upward or downward direction that is measured relative to ground.

The system 500 detects a speed of motion of the communication device (2530). For instance, the system 500 analyzes the data that led to the detected motion and determines a speed of the motion.

The system 500 controls communication settings of the communication device based on the detected motion, the detected direction of motion, and/or the detected speed of motion (2540). For example, the system 500 may automatically lock or unlock a keypad based on the detected motion, the detected direction of motion, and/or the detected speed of motion. The system 500 also may impact other settings based on the detected motion, the detected direction of motion, and/or the detected speed of motion.

Figure 26:
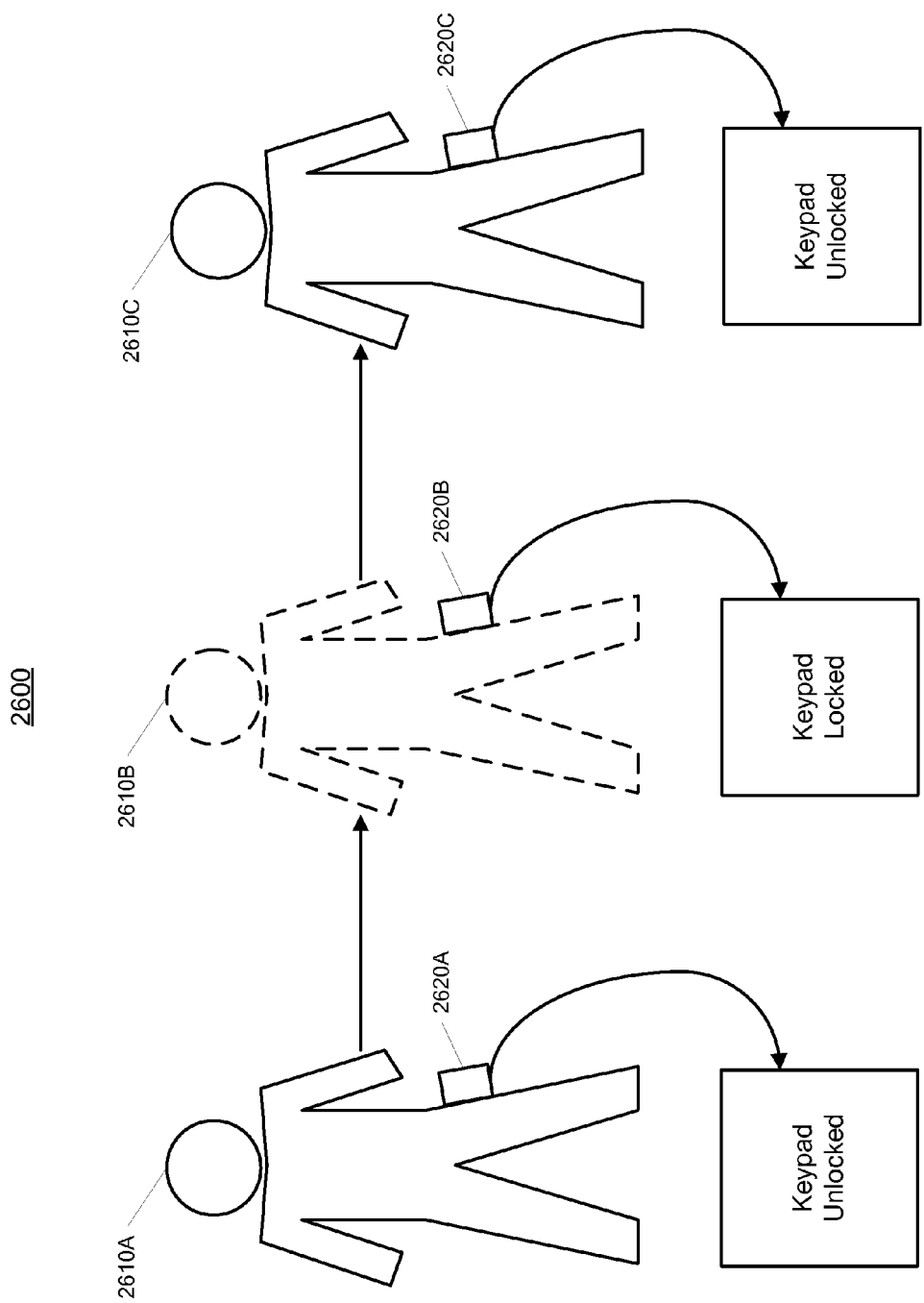

FIG. 26 illustrates an example 2600 of controlling a locking feature of a keypad of a communication device based on whether the communication device is detected as being in motion (or moving at a threshold speed or faster). In the example 2600, at a first point in time, a user 2610A is standing still (i.e., not moving) with a communication device 2620A in the user's pocket. At the first point of time, the keypad of the communication device 2620A is unlocked and the communication device 2620A detects that it is not moving (or moving slower than the threshold speed). At a second point in time, the user 2610B begins moving (e.g., begins walking) and the communication device 2620B detects that it is in motion (or moving at or above the threshold speed). In response to detecting the motion, the communication device 2620B locks the keypad of the communication device 2620B. At a third point in time, the user 2610C stops moving (e.g., stops walking) and the communication device 2620C detects that it is not in motion (or moving slower than the threshold speed). In response to detecting that the motion has stopped, the communication device 2620C unlocks the keypad of the communication device 2620C. By controlling the locking feature of the keypad of the communication device based on whether the communication device is detected as being in motion (or moving at the threshold speed or faster), the likelihood of a command inadvertently being entered to the communication device (e.g., a pocket dial) may be reduced because the keypad is locked during the period of time in which an inadvertent command is most likely (e.g., when the communication device is in motion). By unlocking the keypad when motion ends, the user's experience may not be impacted because the keypad is returned to an unlocked state without the user having to unlock the keypad. In some examples, the keypad may not be controlled to enter the unlocked state when motion ends or is no longer detected.

Figure 27:
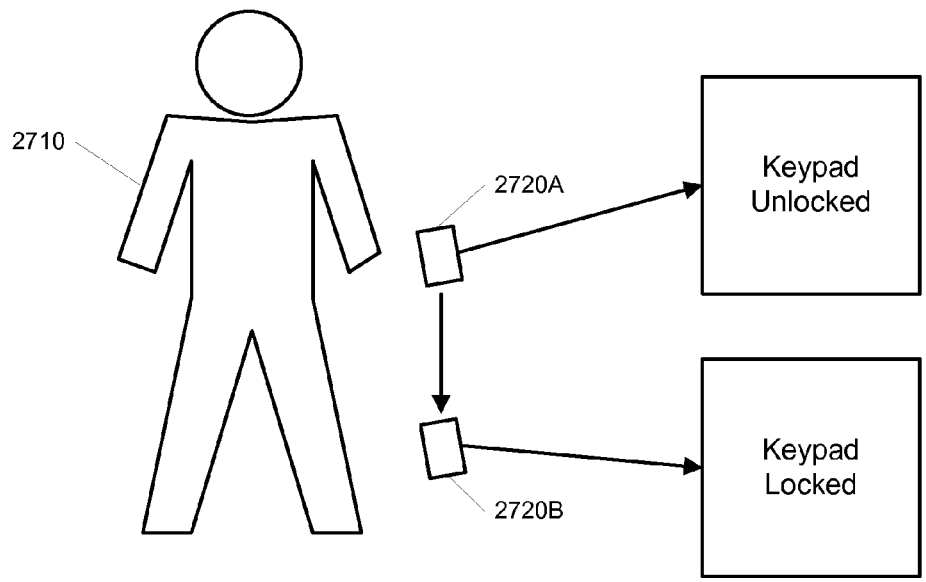
Figure 27:
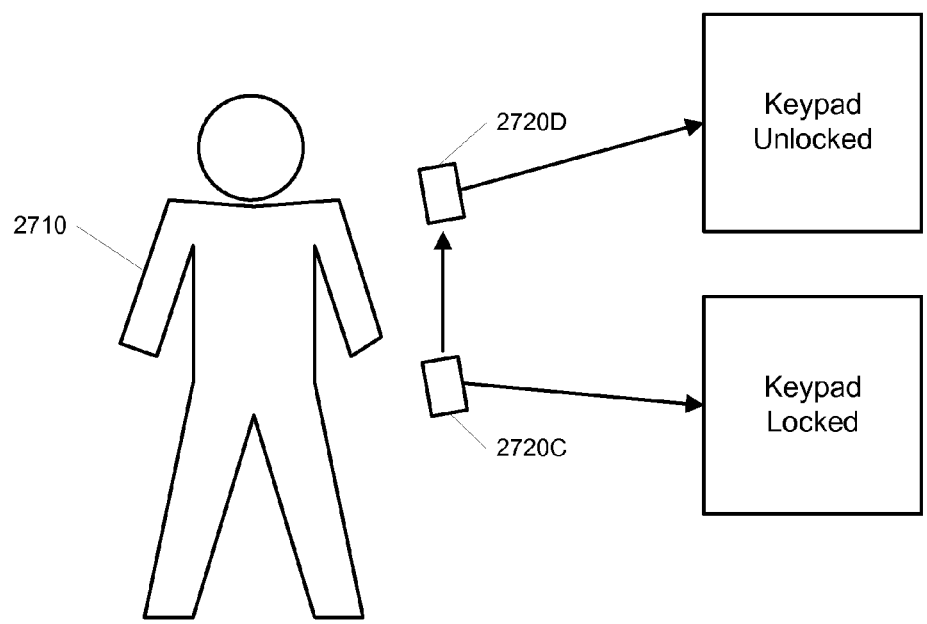

FIG. 27 illustrates an example 2700 of controlling a locking feature of a keypad of a communication device based on a direction of motion of the communication device. In a first example, a user 2710 is holding a communication device 2720A and the keypad of the communication device 2720A is unlocked. In the first example, the user drops the communication device 2720B and, as the communication device 2720B is falling toward the ground, the communication device 2720B detects that it is moving downward toward the ground. In response to detecting the motion downward toward the ground, the communication device 2720B locks the keypad of the communication device 2720B to reduce the possibility of an inadvertent command being input to the communication device 2720B when it hits the ground.

In a second example, a user 2710 is holding a communication device 2720C and the keypad of the communication device 2720C is locked. In the second example, the user raises the communication device 2720D away from the ground and, as the communication device 2720D is being raised (e.g., moving upward and away from the ground), the communication device 2720D detects that it is moving upward and away from the ground. In response to detecting the motion upward and away from the ground, the communication device 2720D unlocks the keypad of the communication device 2720D to enhance the user's convenience in not having to unlock the keypad to begin using the communication device 2720D.

Figure 28:
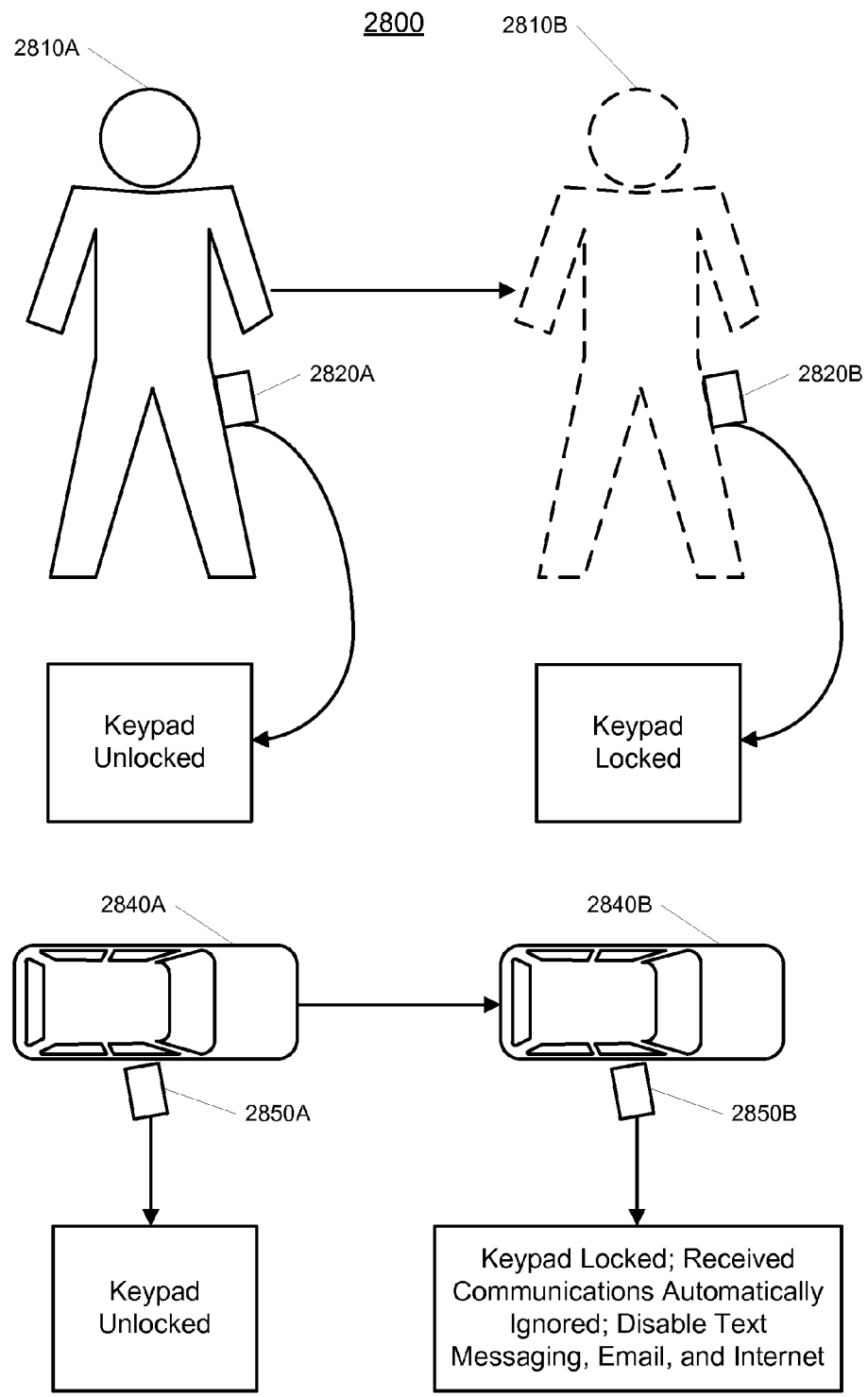

FIG. 28 illustrates an example 2800 of controlling features of a communication device based on a speed of motion of the communication device. In a first example, at a first point in time, a user 2810A is standing still (i.e., not moving) with a communication device 2820A in the user's pocket. At the first point of time, the keypad of the communication device 2820A is unlocked and the communication device 2820A detects that it is not moving (or moving at a relatively slow speed).

For instance, the communication device 2820A detects that it is moving slower than a first threshold speed that indicates relatively medium speed and slower than a second threshold speed that indicates relatively fast speed. At a second point in time, the user 2810B begins moving (e.g., begins walking) and the communication device 2820B detects that it is in motion at a relatively medium speed. For instance, the communication device 2820B detects that it is moving faster than the first threshold speed, but slower than the second threshold speed. In response to detecting the relatively medium speed of motion, the communication device 2820B locks the keypad of the communication device 2820B. In this example, other features of the communication device 2820B remain unchanged during the relatively medium speed of motion.

In a second example, at a first point in time, a vehicle 2840A is stationary (i.e., not moving) with a communication device 2850A in the vehicle. At the first point of time, the keypad of the communication device 2850A is unlocked and the communication device 2850A detects that it is not moving (or moving at a relatively slow speed). For instance, the communication device 2850A detects that it is moving slower than a first threshold speed that indicates relatively medium speed and slower than a second threshold speed that indicates relatively fast speed. At a second point in time, the vehicle 2840B begins moving (e.g., begins driving) and the communication device 2850B detects that it is in motion at a relatively fast speed. For instance, the communication device 2850B detects that it is moving faster than the first threshold speed and faster than the second threshold speed. In response to detecting the relatively fast speed of motion, the communication device 2850B changes device settings to lock the keypad of the communication device 2850B, to automatically ignore received communications, and to disable text (SMS) messaging, electronic mail, and Internet-related features of the communication device 2850B. Changing the device settings in this manner may help reduce the use of communication devices while a user is driving and, thereby, increase the safety of using communication devices. In some examples, carriers that provide communication services for the communication device 2850B may prevent communications from being sent and received by the communication device 2850B when the communication 2850B is detected as moving at the relatively fast speed.

The described systems, methods, and techniques may be implemented in digital electronic circuitry, computer hardware, or in combinations of these elements and software. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method of using image analysis to control an electronic communication device, the method comprising:
   receiving, at an electronic communication device, an incoming electronic communication for a recipient;
   capturing, using at least one image capture device, one or more images of an area proximate to the electronic communication device;
   based on receipt of the incoming electronic communication by the electronic communication device, analyzing, using at least one processing device, the one or more captured images to determine whether a face is present within the one or more captured images;
   in response to a determination that a face is not present within the one or more captured images, handling the incoming electronic communication as not being perceived by the recipient;
   in response to a determination that a face is present within the one or more captured images:
      detecting the face within the one or more captured images;
      determining whether an identity of the face detected within the one or more captured images is known or unknown;
      in response to a determination that the identity of the face detected within the one or more captured images is unknown, handling the incoming electronic communication as being perceived by an unknown recipient; and
      in response to a determination that the identity of the face detected within the one or more captured images is known:
         accessing, from electronic storage, personalized electronic communication handling settings for the identified recipient, and
         handling the incoming electronic communication based on the personalized electronic communication handling settings for the identified recipient.

2. The method of claim 1, wherein handling the incoming electronic communication as not being perceived by the recipient comprises determining that the recipient missed the incoming electronic communication because a face was not detected and handling the incoming electronic communication as a missed electronic communication.

3. The method of claim 1, wherein handling the incoming electronic communication as not being perceived by the recipient comprises controlling output that alerts users to receipt of the incoming electronic communication in response to the determination that a face is not present within the one or more captured images.

4. The method of claim 3, wherein controlling output that alerts users to receipt of the incoming electronic communication in response to the determination that a face is not present within the one or more captured images comprises increasing a volume of an audible alert signaling receipt of the incoming electronic communication in response to the determination that a face is not present within the one or more captured images.

5. The method of claim 1, wherein handling the incoming electronic communication as being perceived by the unknown recipient comprises preventing the unknown recipient from using the electronic communication device.

6. The method of claim 1, wherein handling the incoming electronic communication as being perceived by the unknown recipient comprises allowing the unknown recipient to handle the incoming electronic communication being received and preventing the unknown recipient from accessing messages and past communications.

7. The method of claim 1, wherein handling the incoming electronic communication as being perceived by the unknown recipient comprises allowing the unknown recipient to handle incoming phone calls, but preventing the unknown recipient from handling incoming electronic mail messages.

8. The method of claim 1, wherein handling the incoming electronic communication as being perceived by the unknown recipient comprises displaying a notification that a call was received on the electronic communication device and was answered by an unknown recipient.

9. The method of claim 1, wherein handling the incoming electronic communication based on the personalized electronic communication handling settings for the identified recipient comprises handling the incoming electronic communication based on personalized electronic communication handling settings related to at least one of ringer volume, vibration settings, and display settings.

10. The method of claim 1, wherein handling the incoming electronic communication based on the personalized electronic communication handling settings for the identified recipient comprises displaying a first set of information related to the incoming electronic communication for a first identified recipient, displaying a second set of information related to the incoming electronic communication for a second identified recipient, and maintaining a blank display for a third identified recipient, the first, second, and third identified recipients being different recipients.

11. The method of claim 1, wherein handling the incoming electronic communication based on the personalized electronic communication handling settings for the identified recipient comprises controlling communication alerts and displayed information based on the personalized electronic communication handling settings for the identified recipient.

12. The method of claim 1, wherein handling the incoming electronic communication based on the personalized electronic communication handling settings for the identified recipient comprises listing an unanswered phone call as a missed call for a first identified recipient, listing an unanswered phone call as an ignored call for a second identified recipient, and determining not to list an unanswered phone call for a third identified recipient, the first, second, and third identified recipients being different recipients.

13. The method of claim 1, wherein handling the incoming electronic communication based on the personalized electronic communication handling settings for the identified recipient comprises providing a missed communication alert for a first identified recipient, providing an ignored communication alert which is different than the missed communication alert for a second identified recipient, and withholding an unanswered or unopened communication alert for a third identified recipient, the first, second, and third identified recipients being different recipients.

14. The method of claim 1, wherein handling the incoming electronic communication based on the personalized electronic communication handling settings for the identified recipient comprises preventing a first identified recipient from handling any type of electronic communication, allowing a second identified recipient to handle an incoming phone call, but preventing the second identified recipient from handling an incoming electronic mail message, and allowing a third identified recipient to handle any type of communication, the first, second, and third identified recipients being different recipients.

15. The method of claim 1, wherein handling the incoming electronic communication based on the personalized electronic communication handling settings for the identified recipient comprises automatically controlling volume settings and display settings based on the personalized electronic communication handling settings for the identified recipient.

16. The method of claim 1, further comprising tracking data related to which users are handling which communications and displaying information related to the tracked data, the displaying including displaying, in a list of communications, information that indicates which user received, ignored, or placed the corresponding communication in the list.

17. The method of claim 1, further comprising, for an alert related to an incoming communication, providing information indicating which recipient ignored the incoming communication in the alert and tailoring the alert based on which recipient ignored the incoming communication.

18. The method of claim 1, wherein tailoring the alert based on which recipient ignored the incoming communication comprises withholding the alert when the recipient that ignored the incoming communication is using the communication device, but providing a missed communication alert when another user is using the communication device.

19. The method of claim 1, wherein handling the incoming electronic communication based on the personalized electronic communication handling settings for the identified recipient comprises providing an alert indicating that the incoming electronic communication was missed, providing details related to the incoming electronic communication, and indicating that the incoming electronic communication was ignored by a first recipient.

20. An electronic communication device comprising:
at least one image capture device; and
at least one processing device configured to perform operations comprising:
receiving an incoming electronic communication for a recipient;
capturing, using the at least one image capture device, one or more images of an area proximate to the electronic communication device;
based on receipt of the incoming electronic communication, analyzing the one or more captured images to determine whether a face is present within the one or more captured images;

in response to a determination that a face is not present within the one or more captured images, handling the incoming electronic communication as not being perceived by the recipient;

in response to a determination that a face is present within the one or more captured images:

detecting the face within the one or more captured images;

determining whether an identity of the face detected within the one or more captured images is known or unknown;

in response to a determination that the identity of the face detected within the one or more captured images is unknown, handling the incoming electronic communication as being perceived by an unknown recipient; and in response to a determination that the identity of the face detected within the one or more captured images is known:

accessing, from electronic storage, personalized electronic communication handling settings for the identified recipient, and handling the incoming electronic communication based on the personalized electronic communication handling settings for the identified recipient.

* * * * *